(12) United States Patent
Fujimura et al.

(10) Patent No.: US 11,315,081 B2
(45) Date of Patent: Apr. 26, 2022

(54) RESOURCE RESERVATION SYSTEM, TERMINAL SETTING METHOD, AND INFORMATION PROCESSING APPARATUS

(71) Applicant: Ricoh Company, Ltd, Tokyo (JP)

(72) Inventors: Natsumi Fujimura, Kanagawa (JP); Tsuyoshi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 189 days.

(21) Appl. No.: 16/572,912

(22) Filed: Sep. 17, 2019

(65) Prior Publication Data

US 2020/0104804 A1 Apr. 2, 2020

(30) Foreign Application Priority Data

Sep. 28, 2018 (JP) .............................. JP2018-186002
Nov. 29, 2018 (JP) .............................. JP2018-224197
Jun. 28, 2019 (JP) .............................. JP2019-122466

(51) Int. Cl.
*G06Q 10/10* (2012.01)
*G06F 21/31* (2013.01)
(Continued)

(52) U.S. Cl.
CPC ......... *G06Q 10/1095* (2013.01); *G06F 21/31* (2013.01); *G06F 21/44* (2013.01);
(Continued)

(58) Field of Classification Search
CPC ............. G06Q 10/02; G06Q 10/06314; G06Q 10/1095; G06F 21/31; G06F 21/44; G06F 21/602
See application file for complete search history.

(56) References Cited

U.S. PATENT DOCUMENTS 8,887,262 B1 * 11/2014 Turner .................. H04W 12/06
726/10
2005/0010464 A1 1/2005 Okuno et al.
(Continued)

FOREIGN PATENT DOCUMENTS

GB   2 346 984 A   8/2000
JP   2001-350884   12/2001
(Continued)

OTHER PUBLICATIONS

U.S. Appl. No. 16/295,346, filed Mar. 7, 2019, Tsuyoshi Yamada, et al.

(Continued)

*Primary Examiner* — Mehmet Yesildag
*Assistant Examiner* — Ayanna Minor
(74) *Attorney, Agent, or Firm* — Xsensus LLP

(57) ABSTRACT

A resource reservation system includes an information processing apparatus configured to manage reservation information of one or more resources, and an information processing terminal configured to acquire the reservation information from the information processing apparatus. The information processing apparatus includes first circuitry configured to provide information necessary for transmitting the reservation information to the information processing terminal. The information processing terminal includes second circuitry configured to receive the information provided by the first circuitry. The information processing terminal can acquire the reservation information from the information processing apparatus by using the information received by the second circuitry.

17 Claims, 27 Drawing Sheets

(51) Int. Cl.
*G06F 21/44* (2013.01)
*G06F 21/60* (2013.01)
*G06Q 10/06* (2012.01)
*G06Q 10/02* (2012.01)

(52) U.S. Cl.
CPC ........... *G06F 21/602* (2013.01); *G06Q 10/02* (2013.01); *G06Q 10/06* (2013.01)

(56) References Cited

U.S. PATENT DOCUMENTS

| | | |
|---|---|---|
| 2009/0027432 A1 | 1/2009 | Watanabe et al. |
| 2012/0075068 A1* | 3/2012 | Walker ................. G06Q 10/109 340/10.1 |
| 2014/0257883 A1* | 9/2014 | Thompson ............. G06Q 10/02 705/5 |
| 2015/0082222 A1 | 3/2015 | Yamada |
| 2016/0070557 A1 | 3/2016 | Yamada |
| 2016/0227162 A1* | 8/2016 | Bargetzi .............. G06F 3/04842 |
| 2016/0261769 A1 | 9/2016 | Yamada |
| 2017/0099570 A1 | 4/2017 | Yamada |
| 2018/0015755 A1 | 1/2018 | Yamada |
| 2018/0020120 A1 | 1/2018 | Yamada |
| 2018/0352407 A1 | 12/2018 | Yamada |
| 2019/0012614 A1 | 1/2019 | Yamada et al. |
| 2020/0028852 A1* | 1/2020 | Sakamoto ............... G06F 9/455 |

FOREIGN PATENT DOCUMENTS

| | | |
|---|---|---|
| JP | 2006-330781 | 12/2006 |
| JP | 2008-027157 | 2/2008 |
| JP | 2008-152540 | 7/2008 |
| JP | 2009-217706 | 9/2009 |
| JP | 2013-105487 | 5/2013 |
| JP | 2016-143140 | 8/2016 |
| JP | 2016-148920 | 8/2016 |
| JP | 2017-138688 | 8/2017 |

OTHER PUBLICATIONS

Extended European Search Report dated Oct. 24, 2019 in European Patent Application No. 19196124.2, 9 pages.

* cited by examiner

FIG. 9

| | MEETING ROOM NAME | MEETING ROOM ID | MEETING ROOM TERMINAL CONNECTION STATUS | OPERATION GROUP | IMAGE CODE | NUMBER OF REGISTRABLE TERMINALS |
|---|---|---|---|---|---|---|
| ☑ | MEETING ROOM A | K-001 | BEFORE SETUP | GENERAL MEETING ROOM | DISPLAY OF IMAGE CODE | 1 |
| ☑ | MEETING ROOM B | K-002 | CONNECTING | GENERAL MEETING ROOM | DISPLAY OF IMAGE CODE | 1 |
| ☑ | MEETING ROOM C | K-003 | CONNECTING | RECEPTION ROOM | DISPLAY OF IMAGE CODE | 2 |
| ☑ | MEETING ROOM D | K-004 | DISCONNECTED | RECEPTION ROOM | DISPLAY OF IMAGE CODE | 1 |
| ☐ | MEETING ROOM E | K-005 | BEFORE SETUP | TRAINING ROOM | DISPLAY OF IMAGE CODE | 3 |
| ☐ | MEETING ROOM F | K-006 | BEFORE SETUP | TRAINING ROOM | DISPLAY OF IMAGE CODE | 1 |
| ☐ | MEETING ROOM G | K-007 | BEFORE SETUP | GENERAL MEETING ROOM | DISPLAY OF IMAGE CODE | 2 |

FIG. 10

| | MEETING ROOM NAME | MEETING ROOM ID | MEETING ROOM TERMINAL CONNECTION STATUS | OPERATION GROUP | IMAGE CODE | NUMBER OF REGISTRABLE TERMINALS |
|---|---|---|---|---|---|---|
| ☑ | MEETING ROOM A | K-001 | BEFORE SETUP | GENERAL MEETING ROOM | DISPLAY OF IMAGE CODE | 1 |
| ☑ | MEETING ROOM B | K-002 | CONNECTING | GENERAL MEETING ROOM | DISPLAY OF IMAGE CODE | 1 |
| ☑ | MEETING ROOM C | K-003 | | | DISPLAY OF IMAGE CODE | 2 |
| ☑ | MEETING ROOM D | K-004 | | | DISPLAY OF IMAGE CODE | 1 |
| ☐ | MEETING ROOM E | K-005 | | | DISPLAY OF IMAGE CODE | 3 |
| ☐ | MEETING ROOM F | K-006 | | | DISPLAY OF IMAGE CODE | 1 |
| ☐ | MEETING ROOM G | K-007 | SETUP | ROOM | DISPLAY OF IMAGE CODE | 2 |

FIG. 20

| TIMES | TERMINAL ID |
|---|---|
| 1 | T-001 |
| 2 | T-001 |
| 3 | T-002 |
| 4 | T-001 |
| 5 | T-001 |
| 6 | T-002 |
| 7 | T-002 |
| 8 | T-001 |
| 9 | T-001 |
| 10 | T-001 |

FIG. 26

| URL REQUEST URL | https://example.com/settings/ |
|---|---|
| MANAGEMENT ID | XXXXXXXXX |

FIG. 27

| | | |
|---|---|---|
| 1501 | MANAGEMENT ID | XXXXXXXXX |
| 1502 | URL RESULT URL | https://example.com/result/ |
| 1503 | NUMBER OF MEETING ROOMS | 4 |
| 1504 | FINISHED NUMBER i | 0 |
| 1505 | Room1name | MEETING ROOM A |
| | Room1URL | https://example.com/kaigiAxxxx.xxxx |
| 1505 | Room2name | MEETING ROOM B |
| | Room2URL | https://example.com/kaigiBxxxx.xxxx |
| 1505 | Room3name | MEETING ROOM C |
| | Room3URL | https://example.com/kaigiCxxxx.xxxx |
| 1505 | Room4name | MEETING ROOM D |
| | Room4URL | https://example.com/kaigiDxxxx.xxxx |

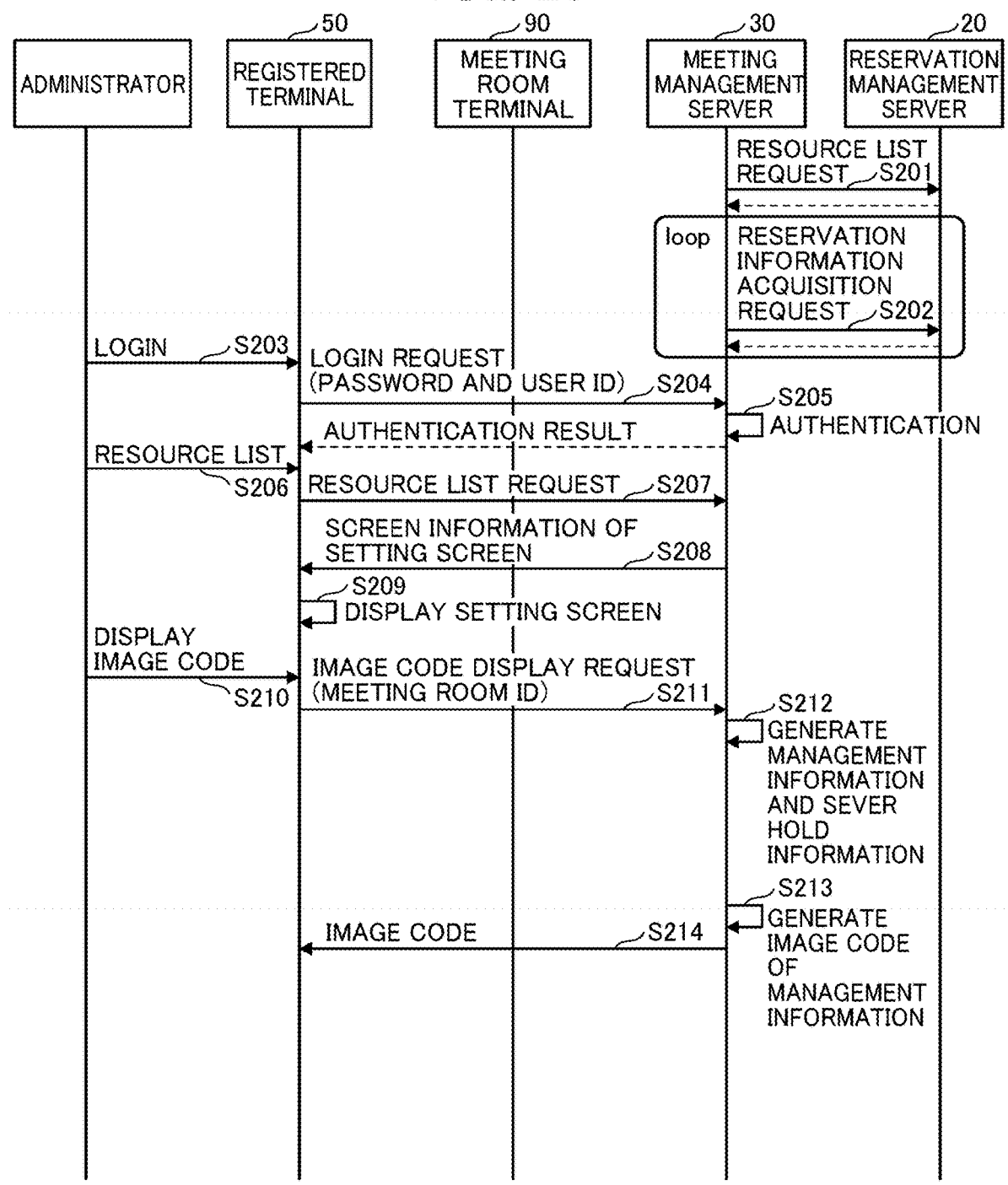

RESOURCE RESERVATION SYSTEM, TERMINAL SETTING METHOD, AND INFORMATION PROCESSING APPARATUS

CROSS-REFERENCE TO RELATED APPLICATIONS

This patent application is based on and claims priority pursuant to 35 U.S.C. § 119(a) to Japanese Patent Application Nos. 2018-186002, filed on Sep. 28, 2018, 2018-224197, filed on Nov. 29, 2018, and 2019-122466, filed on Jun. 28, 2019 in the Japan Patent Office, the entire disclosures of which are incorporated herein by reference.

BACKGROUND

Technical Field

The present disclosure relates to a resource reservation system, a terminal setting method, and an information processing apparatus.

Description of the Related Art

There is a case where an operation of registering an information processing terminal to an information processing apparatus on a network is performed. For example, when the information processing terminal is a printing apparatus, an operator registers the printing apparatus to the information processing apparatus such that the information processing apparatus monitors the state of the printing apparatus and the remaining amount of supplies.

A technology for reducing the burden on such a job has is known. For example, a registration method is known in which a mobile terminal reads a code printed on a packaging box of a relay device and communicates with an information processing apparatus, and the information processing apparatus registers the relay device when authentication is successful.

SUMMARY

According to an embodiment, a resource reservation system includes an information processing apparatus configured to manage reservation information of one or more resources, and an information processing terminal configured to acquire the reservation information from the information processing apparatus. The information processing apparatus includes first circuitry configured to provide information necessary for transmitting the reservation information to the information processing terminal. The information processing terminal includes second circuitry configured to receive the information provided by the first circuitry. The information processing terminal can acquire the reservation information from the information processing apparatus by using the information received by the second circuitry.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating an example of a setting screen displayed by the registration terminal, according to an embodiment of the present disclosure;

FIG. 10 is a diagram illustrating a setting screen on which an image code is superimposed, according to an embodiment of the present disclosure;

FIG. 20 is a diagram illustrating an example of terminal ID records of the past ten times, according to an embodiment of the present disclosure;

FIG. 24 is a diagram illustrating an example of a setting screen displayed by the registration terminal, according to an embodiment of the present disclosure;

FIG. 25 is a diagram illustrating a setting screen on which an image code is superimposed, according to an embodiment of the present disclosure;

FIG. 26 is a diagram illustrating an example of management information, according to an embodiment of the present disclosure;

FIG. 27 is a diagram illustrating an example of server holding information, according to an embodiment of the present disclosure;

FIG. 28 is a sequence diagram illustrating an example of a procedure of initial setting of the meeting room terminal in the resource reservation system, according to an embodiment of the present disclosure;

Figure 1:
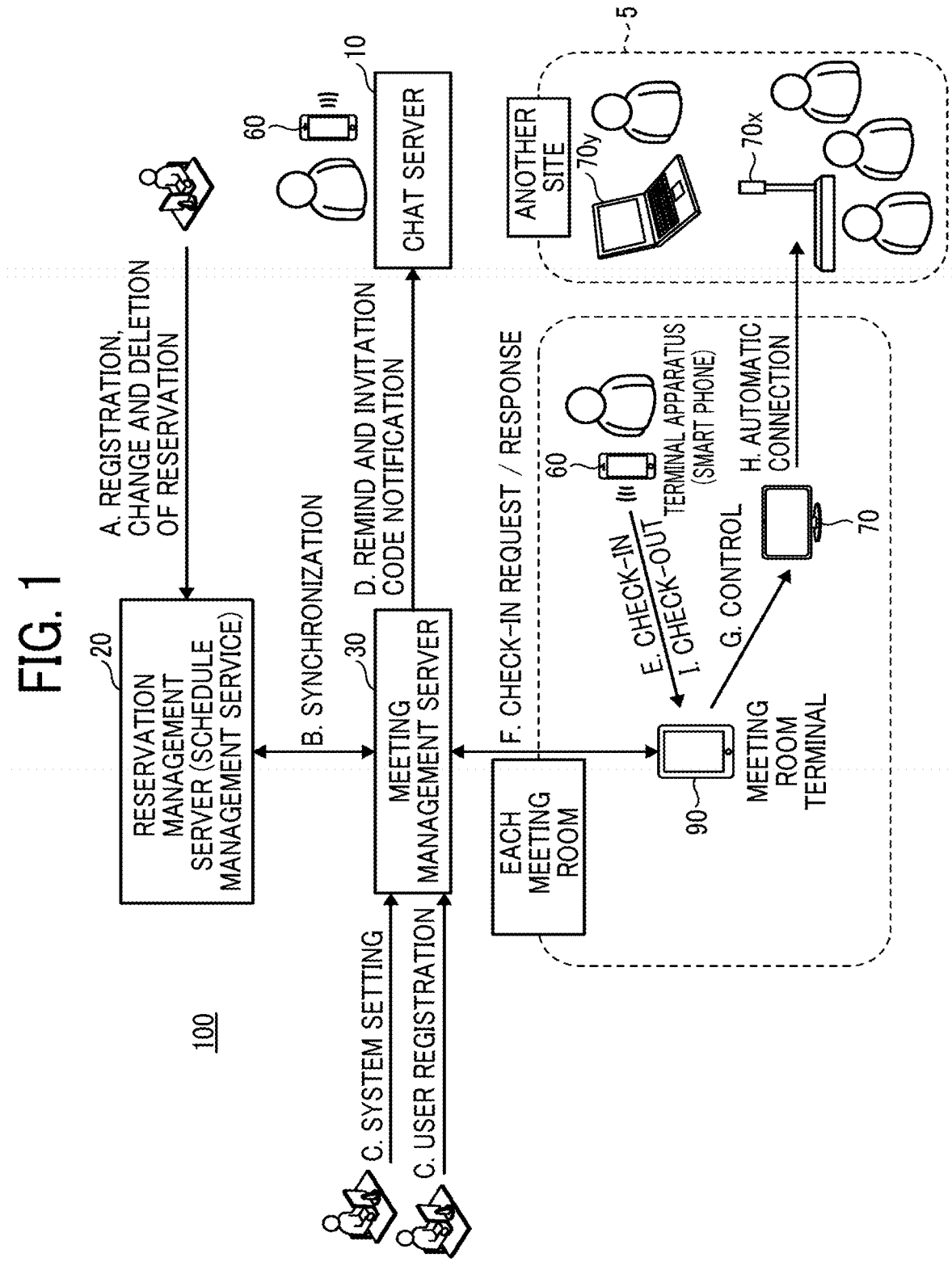
FIG. 1 is a diagram illustrating an example of an outline of the overall operation of a resource reservation system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of an aspect for carrying out the present disclosure, a resource reservation system 100 and a terminal setting method performed by the resource reservation system 100 will be described with reference to the drawings.

<Outline of Resource Reservation System>

First, an outline of a resource reservation system 100 will be described with reference to FIG. 1. FIG. 1 is a diagram illustrating an example of an outline of the overall operation of the resource reservation system.

A. A reservation person operates his/her terminal apparatus to communicate with a reservation management server 20, and reserves a meeting room. The reservation management server 20 is a general-purpose cloud service (Office365, G Suite, (both are registered trademark), etc.), and registers a meeting room owned by an organization such as a company to which the reservation person belongs.

B. A meeting management server 30 is a server that controls the entirety of the resource reservation system 100 based on the reservation state of the meeting room. The meeting management server 30 appropriately communicates with the reservation management server 20 to acquire the reservation information, to synchronize the reservation information with the reservation management server 20.

C. The resource reservation system 100 or an administrator on the organization side can perform user registration and various settings with respect to the meeting management server 30. The user registration means to register a user who is a target of various notifications using a chat server 10 (slack, Line, Microsoft Teams (all are registered trademarks)). Further, since the notifications are carried out via a bot which transmits a message as the meeting management server 30, the bot provided by the chat server is also registered. The various settings include registration of the meeting room terminal 90 (initial setting described later), and setting of a timing of a reminder.

D. When the current time is a certain time before the start time of a meeting in the reservation information, the meeting management server 30 reminds the reservation person to hold the meeting. Thus, empty reservation of meeting rooms can be eliminated or reduced. The "empty reservation" refers to reserving a meeting room that is not actually used. The meeting management server 30 notifies the user of an invitation code as necessary. By receiving the reminder, the meeting reservation person stores information (meeting identification information) for checking in the meeting room in the terminal apparatus 60. The "check-in" refers to starting the use of the meeting room.

E. A meeting room terminal 90 is located in each meeting room 6, and the meeting room terminal 90 periodically downloads reservation information for a meeting held in the corresponding meeting room. The meeting room terminal 90 can display the meeting schedule on the day or the latest and so on, and allows the participants of the meeting to confirm the schedule. When the time is slightly earlier than the start time of the meeting, the reservation person of the meeting room goes to the meeting room 6 and checks-in. For example, the reservation person inputs the meeting identification information to the meeting room terminal 90, or holds the terminal apparatus 60 over the meeting room terminal 90 (to cause the meeting room terminal 90 to read the meeting identification information, to cause the meeting room terminal 90 and the terminal apparatus 60 to communicate with each other, etc.).

F. The meeting room terminal 90 transmits a check-in request to the meeting management server 30. If the meeting management server 30 authenticates the meeting room terminal 90 with the meeting identification information, the meeting room terminal 90 receives a response from the meeting management server 30 that the check-in has been completed. The meeting room terminal 90 displays information indicating that the meeting room is in use (during the meeting). If a use start notification notifying the check-in cannot be confirmed by a predetermined time with respect to the start time of the meeting, the meeting management server 30 cancels the reservation of the meeting room 6. In other words, the meeting management server 30 cancels reservation information if the use of the meeting room is not started in a predetermined time period since the start time of the meeting. In this case, the meeting management server 30 transmits, to the meeting room terminal 90, information indicating that the corresponding reservation has been cancelled as the status included in the reservation information. In response, the meeting room terminal 90 displays information indicating that the room is vacant, thereby enabling an arbitrary user to use the meeting room 6.

G. The meeting room terminal 90 controls an electronic device 70 in response to a request from the meeting management server 30. For example, the electronic device 70 is turned on at the meeting start time, and the electronic device 70 is turned off at the meeting end time. By doing so, it is possible to improve convenience when operating the electronic device 70 by a meeting participant.

H. When the electronic device 70 has, for example, a videoconference function, the electronic device 70 can communicate with an electronic device (such as a videoconference terminal 70x) at another site 5 to hold a meeting with the another site. A personal computer (PC) 70y on which an application operates can also communicate with the electronic device 70. The reservation information includes destination information indicating another site in advance (communication ID of the destination), and the electronic device 70 can automatically communicate with the videoconference terminal 70x and the PC 70y.

I. When the meeting ends, the reservation person presses a button of the meeting room terminal 90 to check out, so the meeting room terminal 90 displays the next reservation status. As a result, an arbitrary user can recognize the reservation state of the meeting room.

First Embodiment

<Initial Setting of Meeting Room Terminal>

As illustrated in FIG. 1, the meeting room terminal 90 is located (provided) in the meeting room. In the resource reservation system 100 in which a dedicated meeting room terminal 90 is prepared in each meeting room, the initial setting of the meeting room terminal 90 is performed before shipment, and therefore an administrator or the like does not have to configure the initial settings at all or has to configure minimum initial settings. However, when the dedicated meeting room terminal 90 is prepared, a general-purpose information processing terminal cannot be diverted to the meeting room terminal 90.

In recent years, there is a usage form of an information processing terminal called BYOD (Bring Your Own Device), and there are many users who would like to easily implement the resource reservation system 100 at low cost by using their own smart device as the meeting room terminal 90. However, in this case, the initial setting for registering the user's smart device in the meeting management server 30 as the meeting room terminal 90 is necessary, and the user's workload becomes large when the initial setting is complicated.

Therefore, in the present embodiment, the resource reservation system 100 that enables the initial setting by capturing image data such as an image code by the meeting room terminal 90 will be described. Note that the meeting room terminal 90 and the information processing terminal are the same device. In other words, before configuration of initial settings, the information processing terminal operates just as an information processing terminal, while after configuration of initial settings, the information processing terminal operates as the meeting terminal 90. Hereinafter, to simplify the description, both the information processing terminal before configuration of initial settings and the information processing terminal after configuration of initial settings are collectively referred to as the meeting room terminal 90. Further, the present disclosure can be applied to a terminal in which settings for cooperating with a server are required to be configured after shipment or after initial setting, even if the terminal is a dedicated meeting room terminal.

Figure 2:
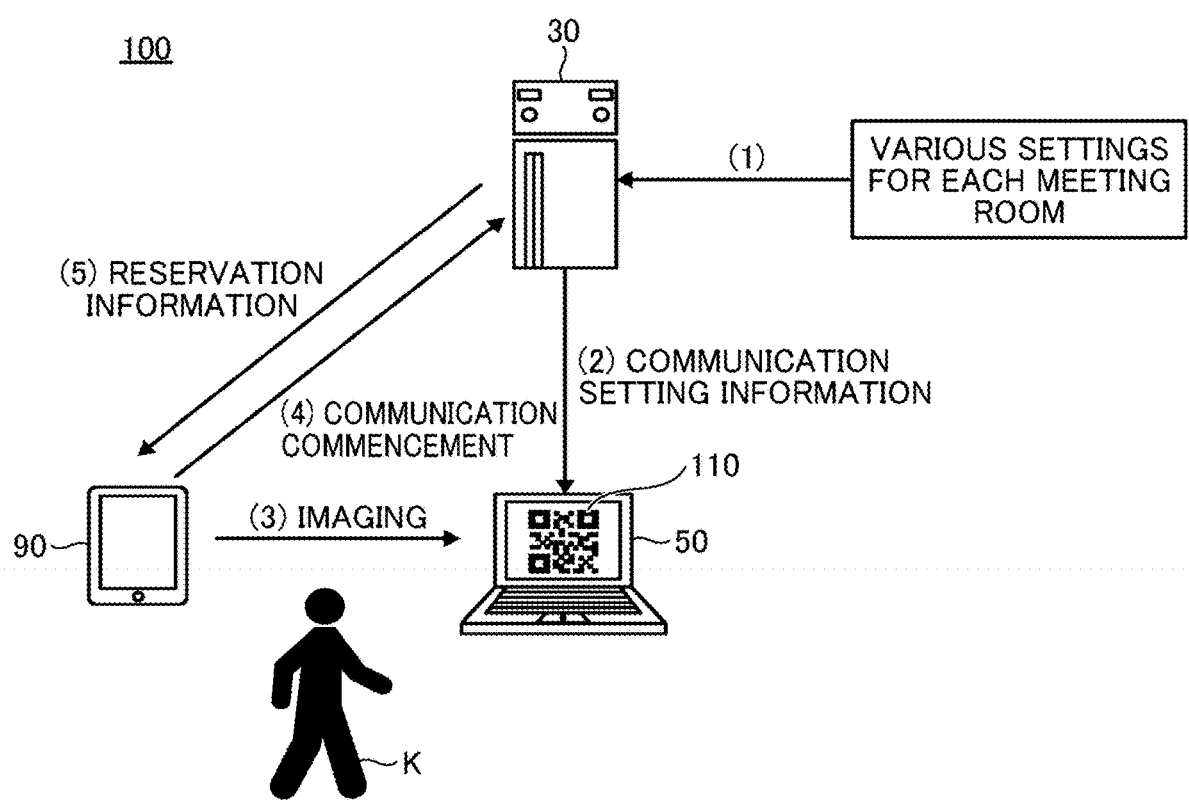
FIG. 2 is a diagram for explaining an example of an outline of initial setting of a meeting room terminal using an image code, according to an embodiment of the present disclosure.

FIG. 2 is a diagram for explaining an example of an outline of the initial setting of the meeting room terminal 90 using the image code.

(1) A provider providing the resource reservation system 100 performs various settings related to the meeting room of a customer in advance on the meeting management server 30. The customer is a company or the like that introduces the resource reservation system 100. The various settings include a meeting room name, a meeting room ID, a URL of the meeting management server 30, and the like. The meeting management server 30 also includes reservation information for each meeting room synchronized with the reservation management server 20.

(2) In order to use the information processing terminal as the meeting room terminal 90, an administrator K performs initial setting on the information processing terminal. The initial setting may include a number of operations, such as at least allowing the meeting room terminal 90 to communicate with the meeting management server 30. Since the communication is preferably performed by designating a meeting room, the initial setting includes registration of the meeting room terminal 90 in the meeting management server 30 in association with the meeting room at the placement destination. The administrator K who performs the initial setting may be a person in charge on the provider side or a system person in charge on the customer side.

The administrator K logs into the meeting management server 30 using the registration terminal 50, and starts communication. The place where the administrator K works may be a place where the administrator K can communicate with the meeting management server 30. Therefore, Thus, the place need not be a meeting room. The administrator displays an administrator setting screen for performing the various settings. The administrator designates a meeting room in which the meeting room terminal 90 is registered, and requests communication setting information to the meeting management server 30. As a result, the registration terminal 50 receives the communication setting information. The communication setting information is encoded in an image code.

(3) The administrator K captures the image code 110 displayed on the registration terminal 50 with the meeting room terminal 90. A terminal application is installed in the meeting room terminal 90, and the meeting room terminal 90 decodes the image code to acquire the communication setting information. As a result, the meeting room terminal 90 can communicate with the meeting management server 30, and a meeting room ID is set to the meeting room terminal 90. That is, the meeting room terminal 90 is registered in the meeting management server 30 in association with the meeting room of the placement destination.

(4) The meeting room terminal 90 starts communication with the meeting management server 30 by using the communication setting information. The meeting room terminal 90 starts to acquire reservation information periodically. The reservation information is repeatedly acquired without being involved in the state of the meeting management server 30.

(5) Since the meeting room terminal 90 transmits the set meeting room ID, the meeting management server 30 transmits the reservation information associated with the meeting room ID to the meeting room terminal 90. The meeting room terminal 90 displays the reservation information.

Thus, in the resource reservation system 100 of the present embodiment, the customer can use his/her information processing terminal as the meeting room terminal 90. By using the image code, it is possible to easily set the initial setting on the customer side. Since the meeting room terminal 90 automatically downloads the reservation information by the initial setting, the meeting room terminal 90 can start the cooperation with the meeting management server 30. For example, the meeting room terminal 90 can display the reservation information of the meeting room, and the user of the customer can check-in from the meeting room terminal 90.

<Regarding Terms>

The term "resource" refers to a resource, such as a meeting room, and equipment, a device, a person (receptionist), mechanisms, and the like that can be used in the meeting room. A resource that is difficult to move is referred to as a facility. In the present embodiment, for convenience of explanation, the term "meeting room" is used as an example of the resource.

The term "initial setting" refers to that a person configures some settings so that the device can implement at least a minimum function. For example, the initial setting may be a setting relating to communication or the like. Information necessary for the communication is information set by the initial setting.

Providing means (circuitry to provide information) can provide information in any way that allows the registration terminal to receive the information. For example, an image (visual information) such as the image code, a radio wave, or sound wave can be used appropriately. An example of the image code is a QR code, but is not limited thereto, and may be a second dimensional image code or a one dimensional bar code. In addition, the providing means (circuitry to provide information) can be implemented by an image code printed for each resource, an NFC tag provided for each resource, or communication such as wireless communication with the terminal.

Similarly, the receiving means (circuitry to receive the information) can receive information from the registration terminal in any way that allows the meeting room terminal to receive the information. For example, the receiving means (circuitry to receive the information) can be implemented by a reading device that reads an NFC tag of the meeting room terminal or a communication device of the meeting room terminal in addition to the camera of the meeting room terminal.

The wordings "the information processing terminal can acquire reservation information" does not necessarily means that the information processing apparatus actually acquire the reservation information. The wordings include that the information processing terminal is ready to acquire the reservation information. The actual acquisition of the reservation information can be performed when a predetermined timing arrives or according to a user operation.

The term "reservation person" refers to a person who has reserved the meeting room. The term "participant" refers to a participant in the meeting. The reservation person is often included in the participants, but the reservation person may not be included in the participants. In the present embodiment, there is a case where the work performed by the reservation person can be performed by the participant. Persons who use the meeting room are collectively referred to as a user.

In order for the meeting room terminal 90 to start the communication with the meeting management server 30, it is necessary for the meeting room terminal 90 to store the communication setting information by the initial setting of the administrator. Thereby, the reservation information is periodically requested, but whether the request information can be acquired depends on the setting of the meeting management server 30.

When a management start flag, which will be described later, of the meeting management server 30 is set to True, the meeting management server 30 is ready for the management of the meeting room. When the management start flag is True, and the meeting management server 30 receives the request for the reservation information from the meeting room terminal 90, the meeting management server 30 starts the management of the meeting room. In this way, when there is the request from the meeting room terminal 90, the transmission of the reservation information is started.

When the meeting room terminal 90 acquires the reservation information from the meeting management server 30, the meeting room terminal 90 starts the cooperation with the meeting management server 30. Therefore, the start of cooperation and the start of management are triggered by the related processing of the request of the reservation information and the transmission of the reservation information.

The following processing is carried out by the start of the cooperation or the start of the management.

Display of reservation information (check-in, check-out, extension, use now)

Control of electronic devices associated with check-in and check-out

Automatic Cancellation of Reservation

Note that the term "extension" refers to that the participant extends the reservation beyond the end time of the reservation of the meeting room. The terms "use now" refer to that an arbitrary user uses a meeting room which is vacant without reservation.

<System Configuration Example>

Figure 3:
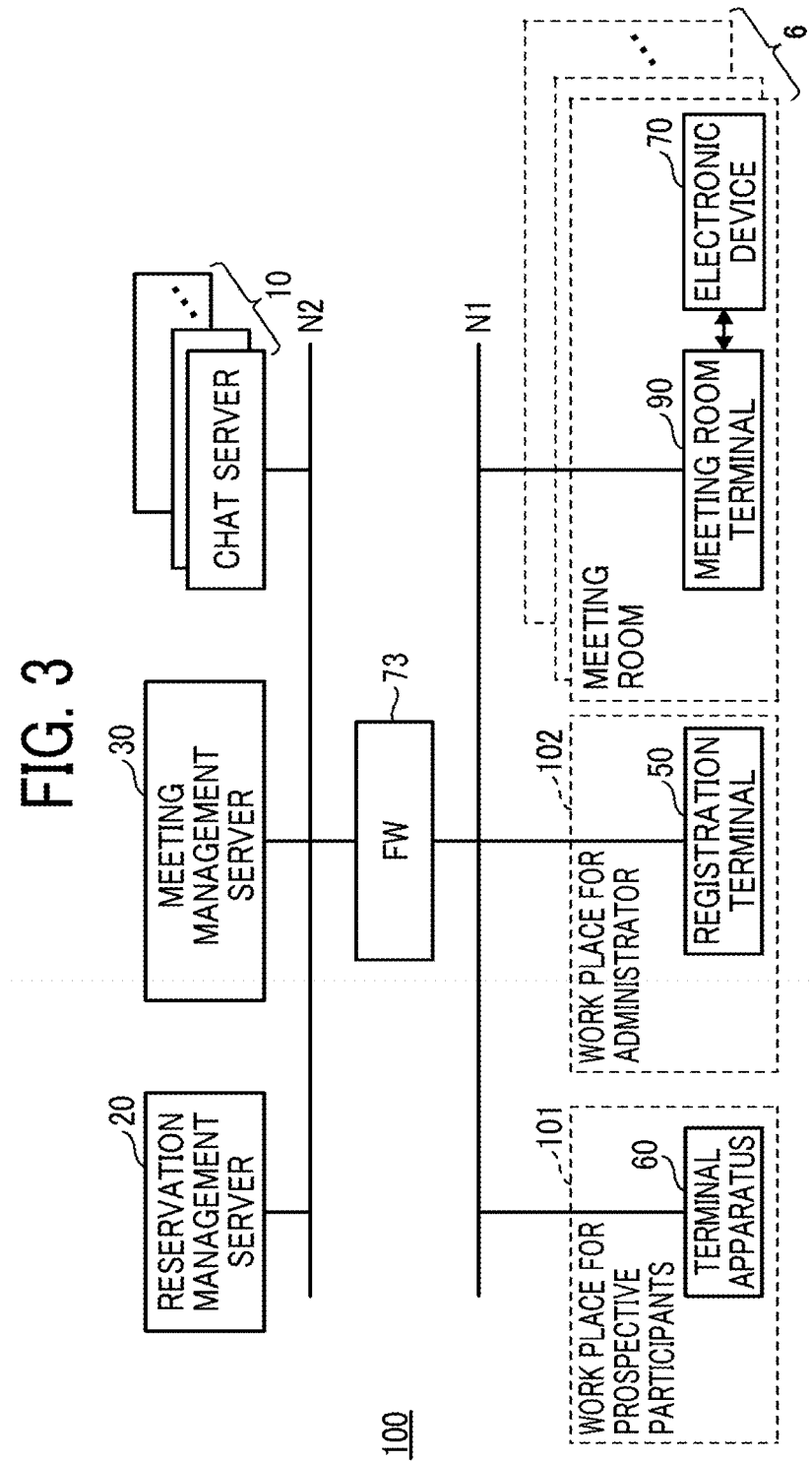
FIG. 3 is a block diagram illustrating an example of a system configuration of the resource reservation system, according to an embodiment of the present disclosure.

FIG. 3 is a block diagram illustrating an example of a system configuration of the resource reservation system 100. The resource reservation system 100 can be mainly divided into an external network N2 and an internal network N1. The internal network N1 refers to a network inside the firewall 73, and the external network N2 is a network such as the Internet through which an unspecified number of communications are transmitted.

The external network N2 is connected to the reservation management server 20, the meeting management server 30, and one or more chat servers 10, and each server can communicate as necessary. A terminal apparatus 60 operated by a meeting participant may be connected to the external network N2 as necessary.

The reservation management server 20 is implemented by one or more information processing apparatuses (computer systems) on which a general server OS or the like is mounted. A system related to a facility reservation provided by the reservation management server 20 is referred to as a reservation management system.

The reservation management server 20 has a calendar system, and provides a Web application for managing various schedules. Specifically, for example, the following functions are provided.

Acceptance of the registration of schedule. The reservation person can confirm from anywhere anytime.

E-mail notification at the set date and time, such as 30 minutes before the schedule One person can manage schedules with multiple calendars (for work, for home, etc.)

Share a calendar with people in the same group.

The reservation management server 20 manages the user with an account. The account is the right to which the user uses the service. In many systems, the user logs into the system using the account. For this reason, the account has a function in which the system uniquely identifies the user (identification information function). In the present embodiment, the reservation management server 20 transmits reservation information of the account (domain) registered in advance in the meeting management server 30. Alternatively, when the meeting management server 30 specifies an account of the reservation management server 20 and requests the reservation information, the meeting management server 30 can acquire the reservation information of the meeting room 6 from the reservation management server 20. Note that the account may be information that can uniquely identify the user, such as an e-mail, an ID, and a telephone number.

In the present embodiment, the reservation of the meeting room 6 is managed as a schedule, but the reservation management server 20 can manage various schedules without being limited to the meeting room 6. In addition to the meeting room 6, the present embodiment can be used for reservation of various facilities such as various electronic equipment rentals and parking reservations, and reservations of rental offices, rental studios, rental cycles, rental cars, accommodation facilities such as hotels, rental spaces for entertainment venues and lockers, etc.

Note that as such a reservation management system, G Suite (registered trademark), Office365 (registered trademark), and the like are known. However, any reservation management system having the function described in the present embodiment may be used.

In the present embodiment, the information related to the meeting room 6 in the internal network N1 is registered in advance in the reservation management server 20. Specifically, the Web application of the reservation management server 20 is customized in accordance with the meeting room name of each meeting room 6, the meeting room ID, the reservable time, the capacity of each meeting room 6, the reservation unit, and the like, which are located in the internal network of the company using the resource reservation system 100. Therefore, the meeting room 6 and the reservation information of the company using the resource reservation system 100 are associated to each other.

The chat server 10 can be realized by one or more information processing apparatuses (computer systems) on which a general server OS or the like is mounted. A real-time sharing system of information such as text, audio and video in a plurality of users provided by the chat server 10 is referred to as a chat system. The chat server 10 notifies the terminal apparatus 60 of information related to the reservation of the meeting room 6. In the present embodiment, a plurality of chat servers 10 operated by different operating entities may be included.

Although the shared information includes an image, a sound, and the like, and is not limited to text, it is assumed that text is mainly used in the present embodiment for convenience of explanation. For example, the chat system may provide a voice call function between groups. The voice call may be one-to-one or one-to-N ($\geq 2$). Therefore, when the chat system notifies the information related to the reservation of the meeting room 6 in the present embodiment, a voice message may be output in addition to the text display. Note that LINE (registered trademark; hereinafter omitted), slack, Microsoft Teams (registered trademark; hereinafter omitted), etc. are known as chat systems, any chat system that can notify one or more users from a bot (a program that executes a predetermined process) may be used.

Similarly, the chat server 10 manages a user with an account (different from the account of the reservation management server 20), but in principle, the meeting management server 30 does not need to be aware of the account of the chat server 10. However, the meeting management server 30 can designate and notify an arbitrary account of the chat server 10.

The meeting management server 30 can be implemented by one or more information processing apparatuses (computer systems) on which a general server OS or the like is mounted. The meeting management server 30, as processing related to the external network N2, acquires the reservation information of the meeting room 6 from the reservation management server 20, obtains the prospective participants set in the reservation information, and transmits a notification to the group (or an individual person such as a reservation person) of the chat server 10 associated with the prospective participant at the set timing. In addition, the meeting management server 30, as processing related to the internal network N1, manages check-in and check-out to meeting room 6, and controls the power supply to the electronic device 70 based on the reservation information of the meeting room 6 acquired from the reservation management server 20.

The internal network N1 includes the meeting room 6, a workplace 101 for the prospective participants, a workplace 102 for the administrator, and the like. The prospective participants can access the external network N2 from various places via the internal network N1. The internal network N1 is, for example, a LAN (Local Area Network). The meeting room 6, the workplace 101 for the prospective participant, and the workplace 102 for the administrator are not necessarily the LAN in the same company.

The meeting room terminal 90, and the electronic device 70 is disposed in the meeting room 6. The meeting room terminal 90 and the electronic device 70 can communicate with each other by a small-scale LAN or a dedicated line. The electronic device 70 can be connected to the internal network N1 and the external network N2 without passing through the meeting room terminal 90. The meeting room terminal 90 and the electronic device 70 may communicate with each other by either wireless or wired communication.

Note that since the internal network N1 is inside the firewall 73, it is difficult to directly communicate from the external network N2 to the internal network N1.

The meeting room terminal 90 is an information processing apparatus operated by a participant for a meeting such as a reservation person who uses the meeting room 6. The meeting room terminal 90 is a reception terminal that accepts to use the meeting room. The meeting room terminal 90 is provided on a desk in the meeting room 6 or is provided at the entrance of the meeting room 6. A plurality of meeting room terminals 90 can be located in the single meeting room 6. The meeting room terminal 90 can be implemented by one or more information processing apparatuses (computer systems) on which a general OS or the like is mounted.

The meeting room terminal 90 transmits the meeting room ID to the meeting management server 30, and displays the reservation information or the like for the meeting room 6 on the day. Further, the meeting room terminal 90 acquires control information such as power ON/OFF of the electronic device 70 from the meeting management server 30. The meeting room terminal 90 turns on or off the electronic device 70 using the acquired control information.

The meeting room terminal 90 also displays a standby screen for check-in, check-out, and the like, and communicates with the meeting management server 30 to inform the meeting management server 30 of check-in or check-out. At the time of check-in, the meeting room terminal 90 transmits the meeting identification information input from the reservation person and the meeting room ID held in advance to the meeting management server 30. Therefore, the meeting management server 30 can confirm the use of the meeting room 6 reserved by the reservation person who reserved the meeting room 6 based on the meeting identification information and the meeting room ID.

The electronic device 70 includes a variety of office devices that can be used in the meeting room 6. Examples of the electronic device 70 include an electronic whiteboard, a multifunction peripheral, a projector, a digital signage, a digital camera, or the like. The electronic whiteboard includes a large display with a touch panel, detects coordinates of the board surface designated by the user, and connects the coordinates to display the stroke. In addition, the electronic whiteboard can display an image of the connected PC, or can communicate with an electronic whiteboard at another site to synchronize strokes. Note that the electronic whiteboard can be referred to as an electronic information board.

The multifunction peripheral has functions such as a copier, a scanner, a printer, and a facsimile transmission/reception, and is used for printing materials, copying materials, digitizing materials, transmitting materials, and the like during a meeting. The projector is an apparatus for projecting an image. For example, the projector projects an image (still image or moving image) displayed on a display of the terminal apparatus 60 onto a screen, etc., to enable the participants to share the image. The digital signage includes a large display and is used to display any still image or moving image. The digital camera is used for each participant to capture and store paper materials and materials displayed on an electronic whiteboard.

The terminal apparatus 60 which can be connected to the internal network N1 is located in the workplace 101 of the prospective participant. The terminal apparatus 60 may communicate by wire or wirelessly. The terminal apparatus 60 is an information processing apparatus used when the prospective participant (including the reservation person) reserves a meeting room, but it is also assumed to be brought into the meeting room. The terminal apparatus 60 may be an information processing apparatus carried by the prospective participant.

The terminal apparatus 60 can be implemented by one or more information processing apparatuses (computer systems) on which a general OS or the like is mounted. The terminal apparatus 60 is, for example, a smartphone, a tablet terminal, a PC (Personal Computer), a PDA (Personal Digital Assistant), a wearable PC (sunglass type, wristwatch type, etc.). It is sufficient that the terminal apparatus 60 has a communication function and has a function for operating browser software or application software dedicated to the chat server 10 or the reservation management server 20. For example, a car navigation system, a game machine, a television receiver, or the like may also be used as the terminal apparatus 60.

The terminal apparatus 60 operates application software dedicated for the chat server 10 (hereinafter referred to as a chat application), and further operates application software dedicated for the resource reservation system 100 (hereinafter referred to as a meeting application). However, these applications may be replaced by browser software.

The registration terminal 50 which can be connected to the internal network N1 is located in the workplace 102 of the administrator. The registration terminal 50 may communicate by wire or wirelessly. The registration terminal 50 is a display terminal (user terminal) for the administrator to initially set the meeting room terminal 90.

The registration terminal 50 may be an information processing apparatus similar to the terminal apparatus 60. However, since the registration terminal 50 is mainly used for the administrator to set in the meeting management server 30, the chat application and the meeting application are not required. The registration terminal 50 mainly communicates with the meeting management server 30 through browser software, and displays a Web page.

<Hardware Configuration>
<<Hardware Configuration of Meeting Management Server>>

Figure 4:
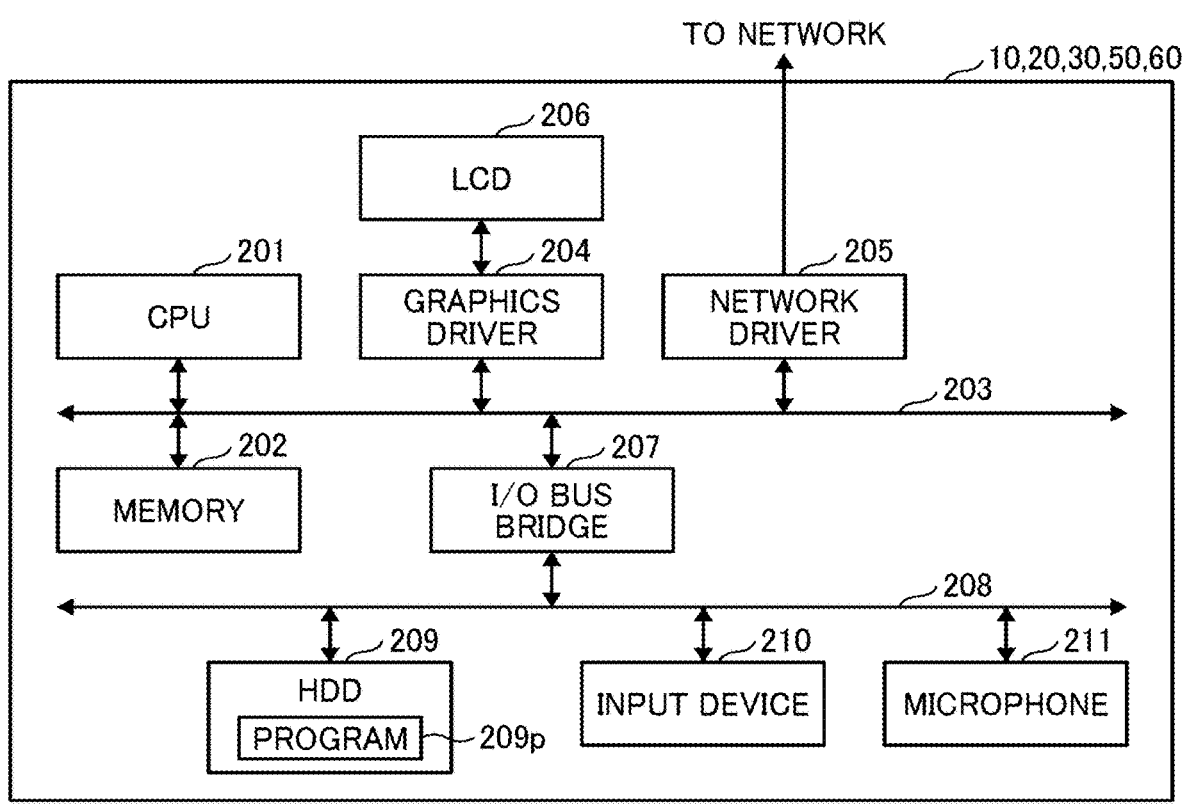
FIG. 4 is a block diagram illustrating an example of a hardware configuration of a meeting management server, according to an embodiment of the present disclosure.

FIG. 4 is a block diagram illustrating an example of a hardware configuration of the meeting management server 30. The meeting management server 30 includes a CPU 201 and a memory 202 that enables high-speed access to data used by the CPU 201. The CPU 201 and the memory 202 are connected to other device or driver such as a graphics driver 204 and a network driver (NIC) 205 in the meeting management server 30, via a system bus 203.

The graphics driver 204 is connected to an LCD (a display device, an example of the display) 206 via a bus to monitor a processing result by the CPU 201. The network driver 205 connects the meeting management server 30 to the external network N2 at the transport layer level and the physical layer level to establish a session with another device.

An input/output (I/O) bus bridge 207 is connected to the system bus 203. The downstream of the I/O bus bridge 207 is connected to a storage device such as an HDD (Hard Disk Drive) 209 by IDE, ATA, ATAP80I, serial ATA, SCSI, USB, etc. via an I/O bus 208 such as PCI. The HDD 209 stores a program 209$p$ for controlling the entire meeting management server 30. The HDD 209 may be an SSD (Solid State Drive). The program 209$p$ may be distributed in a state stored in a storage medium or may be distributed from a server for program distribution.

An input device 210 such as a keyboard and a mouse (referred to as a pointing device) is connected to the I/O bus 208 via a bus such as a USB, and receives input and commands from an operator such as a system administrator. A microphone 211 is also connected to the I/O bus 208.

Note that the hardware configuration of the meeting management server 30 illustrated in the figure indicates hardware elements that are preferably included in the meeting management server 30.

The hardware configuration diagram of the reservation management server 20, the chat server 10, the registration terminal 50, and the terminal apparatus 60 may be the same as that of the meeting management server 30. Alternatively, the hardware configuration diagram may be different as long as there is no problem in the description of the resource reservation system 100 of the present embodiment. Moreover, the meeting management server 30, the reservation management server 20, and the chat server 10 supports cloud computing. Therefore, these hardware configurations may be configured by dynamically connecting and disconnecting hardware resources in accordance with the load. Note that the cloud computing refers to a usage mode in which resources on a network are utilized without being conscious of a specific hardware resource.

<<Meeting Room Terminal>>

Figure 5:
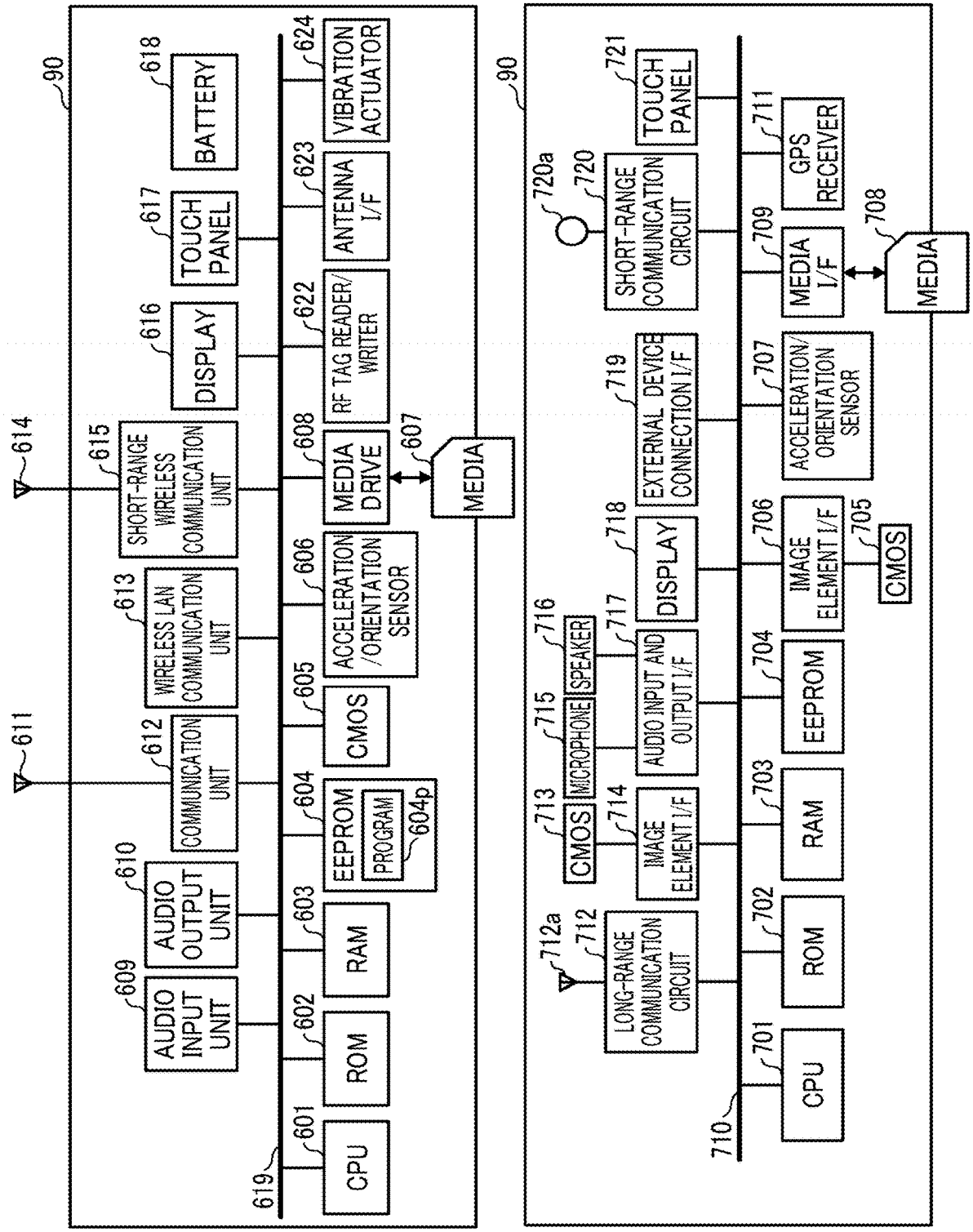
FIG. 5A and FIG. 5B are diagram, each illustrating an example of a hardware configuration the meeting room terminal, according to an embodiment of the present disclosure.

FIG. 5A and FIG. 5B are block diagrams, each illustrating an example of a hardware configuration of the meeting room terminal 90. FIG. 5 illustrates two hardware configuration examples of the meeting room terminal 90. Note that the meeting room terminal 90 illustrated in FIG. 5A and FIG. 5B is assumed to be a tablet device. The meeting room terminal 90 of FIG. 5A includes a CPU 601, a ROM 602, a RAM 603, an EEPROM 604, a CMOS (Complementary Metal Oxide Semiconductor) sensor 605, an acceleration/orientation sensor 606, and a media drive 608.

The CPU 601 controls the overall operation of the meeting room terminal 90. The ROM 602 stores a basic input and output program. The RAM 603 is used as a work area for the CPU 601. The EEPROM 604 performs reading or writing of data under the control of the CPU 601. The CMOS sensor 605 captures an image of a subject under the control of the CPU 601 to obtain image data. The acceleration/orientation sensor 606 is an electronic magnetic compass, a gyro compass, an acceleration sensor, or the like, which detects geomagnetism.

The media drive 608 controls to read or write (memorize) data to and from a media 607 such as a flash memory. The media drive 608 is configured to be detachable from the media 607 from which data that has already been recorded is read or to which data is newly written and stored.

Note that the EEPROM 604 stores a program 604p executed by the CPU 601. The program 604p includes an application software, an OS, or the like for executing various processes in the embodiment. The program 604p may be distributed in a state of being stored in the media 607 or the like, or may be distributed from a server for program distribution.

The CMOS sensor 605 is a charge-coupled element that converts light into electric charge and digitizes an image of a subject. The CMOS sensor 605 may be, for example, a CCD (Charge Coupled Device) sensor as long as the CMOS sensor 605 can image a subject. The CMOS sensor 605 can read a bar code or a second dimensional bar code.

The meeting room terminal 90 includes an RF tag reader/writer 622, an antenna I/F 623, and a vibration actuator 624. The RF tag reader/writer 622 communicates in accordance with, for example, a standard such as NFC (Near Field Communication).

The vibration actuator 624 includes a motor that vibrates the meeting room terminal 90. For example, when the end time of the meeting is approaching, the meeting room terminal 90 vibrates to inform the participant of the fact.

The meeting room terminal 90 includes an audio input unit 609, an audio output unit 610, an antenna 611, a communication unit 612, a wireless LAN communication unit 613, a short-range wireless communication antenna 614, a short-range wireless communication unit 615, a display 616, and a touch panel. 617 and a bus line 619.

The audio input unit 609 converts voice into an audio signal. The audio output unit 610 converts the audio signal into voice. The communication unit 612 uses the antenna 611 to communicate with the nearest base station apparatus using a wireless communication signal. The wireless LAN communication unit 613 performs wireless LAN communication conforming to the IEEE 802.11 standard.

The short-range wireless communication unit 615 includes a communication device that uses the short-range wireless communication antenna 614 and conforms to a communication standard such as Bluetooth (registered trademark) or Bluetooth Low Energy (registered trademark).

The display 616 includes a liquid crystal, an organic EL or the like for displaying an image of a subject, various icons, and the like. The touch panel 617 is mounted on the display 616 and is configured by a pressure-sensitive or electrostatic panel, and detects a touch position on the display 616 by touching with a finger, a touch pen, or the like. The bus line 619 includes an address bus, a data bus, or the like for electrically connecting the above components.

The meeting room terminal 90 includes a dedicated battery 618 and can be driven by either the battery 618 or a commercial power source. The audio input unit 609 includes a microphone for inputting audio. The audio output unit 610 includes a speaker that outputs audio.

FIG. 5B is an example of a hardware configuration diagram of the meeting room terminal 90. As illustrated in FIG. 5B, the meeting room terminal 90 includes a CPU 701, a ROM 702, a RAM 703, an EEPROM 704, a CMOS sensor 705, an image element I/F 706, an acceleration/orientation sensor 707, a media I/F 709, and a GPS receiver 711.

In the above components, the CPU 701 controls the operation of the entire meeting room terminal 90. The ROM 702 stores a program such as an initial program loader (IPL) to boot the CPU 701. The RAM 703 is used as a work area for the CPU 701. The EEPROM 704 performs reading or writing of data under control of the CPU 701. The CMOS sensor 705 is a kind of built-in an imaging unit that captures a subject (mainly, a self-portrait) and obtains image data under the control of the CPU 701. It should be noted that, instead of the CMOS sensor, an imaging unit such as a CCD (Charge Coupled Device) sensor may be used. The image element I/F 706 includes a circuit for controlling to drive the CMOS sensor 705. The acceleration/orientation sensor 707 includes various sensors such as an electronic magnetic compass, a gyrocompass, and an acceleration sensor that detect geomagnetism. The media I/F 709 controls to read or write (memorize) data with respect to a recording medium 708 such as a flash memory. The GPS receiver 711 receives GPS signals from GPS satellites.

The meeting room terminal 90 includes a long-range communication circuit 712, a CMOS sensor 713, an image element I/F 714, a microphone 715, a speaker 716, an audio input/output I/F 717, a display 718, and an external device connection I/F (Interface) 719, a short-range communication circuit 720, an antenna 720a of the short-range communication circuit 720, and a touch panel 721.

In the above components, the long-range communication circuit 712 includes an antenna 712a and a circuit that communicates with other devices via a communication network. The CMOS sensor 713 is a type of built-in an imaging unit that captures an image of a subject under the control of the CPU 701 to obtain image data. The image element I/F 714 includes a circuit for controlling to drive the CMOS sensor 713. The microphone 715 includes a built-in circuit that converts sound into an electric signal. The speaker 716 includes a built-in circuit that converts an electric signal into a physical vibration to generate sound such as music or voice. The audio input/output I/F 717 includes a circuit for processing the input and output of audio signals between the microphone 715 and the speaker 716 under the control of the CPU 701. The display 718 is a type of a display unit such as liquid crystal or organic EL (Electro Luminescence) for displaying an image of a subject, various icons, and the like. The external device connection I/F 719 includes an interface for connecting various external devices. The short-range communication circuit 720 includes a communication circuit such as NFC (Near Field Communication) or Bluetooth (registered trademark). The touch panel 721 is a kind of an input unit for operating the meeting room terminal 90 by pressing the display 718 by a user.

The meeting room terminal 90 includes a bus line 710. The bus line 710 is an address bus, a data bus, or the like for electrically connecting the components such as the CPU 701 illustrated in FIG. 4.

<About Functions>

Figure 6:
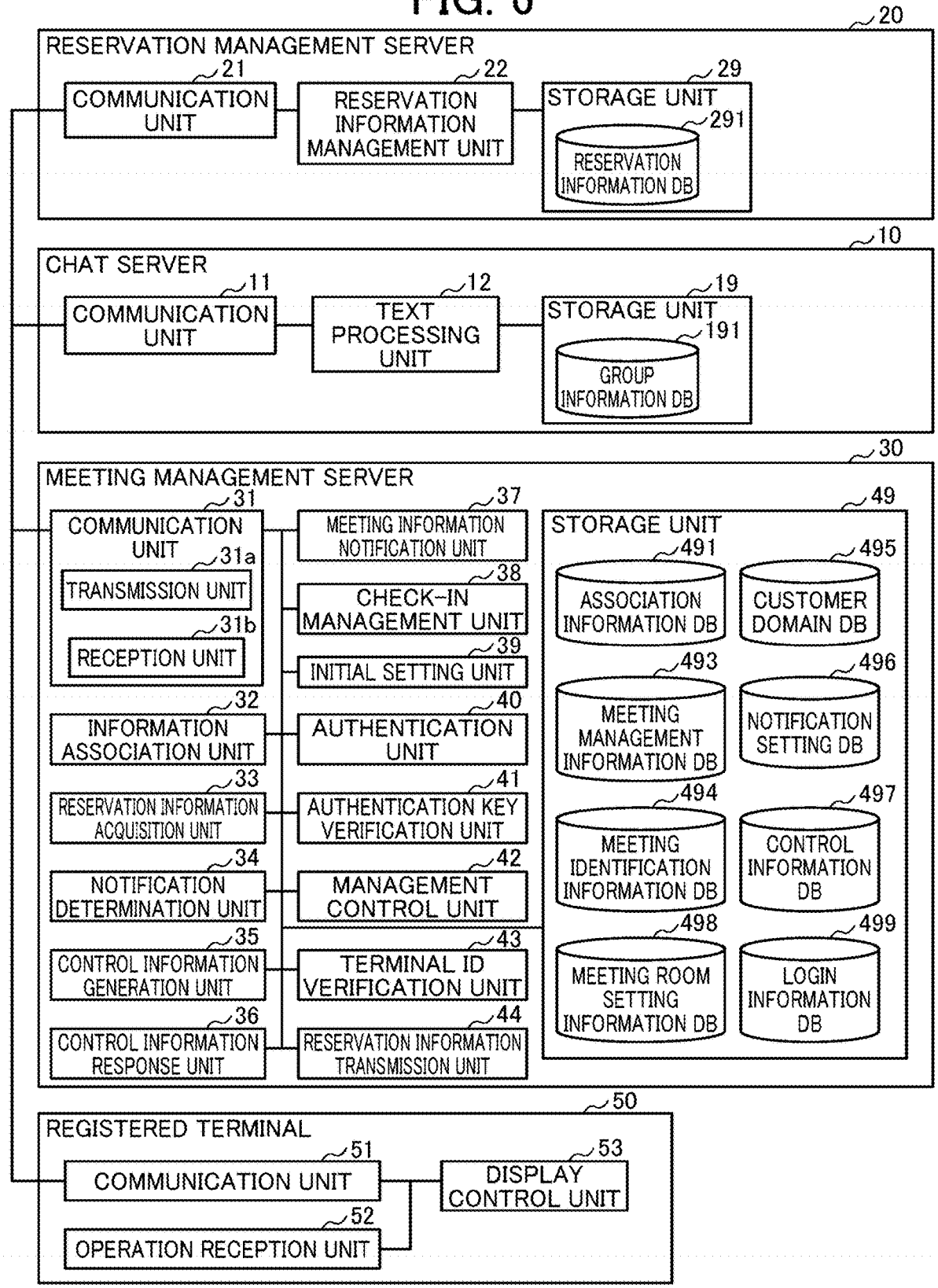
FIG. 6 is a block diagram illustrating an example of a functional configurations of a reservation management server, a chat server, a meeting management server, and a registration terminal, according to an embodiment of the present disclosure.

FIG. 6 is a block diagram illustrating an example of a functional configuration of the reservation management server 20, the chat server 10, the meeting management server 30, and the registration terminal 50 in a block form.

<Reservation Management Server>

The reservation management server 20 includes a communication unit 21 and a reservation information management unit 22. Each of the functional units in the reservation management server 20 has functions or means, which are implemented by any one of the constituent elements illustrated in FIG. 4 operating according to a command from the CPU 201 in accordance with the program 209p expanded from the HDD 209 to the memory 202.

The communication unit 21 transmits and receives various kinds of information to and from the meeting management server 30 and the terminal apparatus 60. The communication unit 21 transmits the screen information for the reservation setting screen to the terminal apparatus 60, and receives the setting of the reservation from the terminal apparatus 60. Further, the reservation information is transmitted to the meeting management server 30. The communication unit 21 is implemented by the CPU 201 in FIG. 4 executing the program 209p and controlling the network driver 205, and the like.

The reservation information management unit 22 manages the reservation information registered by the user. The reservation information management unit 22 reads the reservation information of the meeting room 6 requested from the meeting management server 30 from a reservation information database (DB) 291 and transmits it to the meeting management server 30 via the communication unit 21. Alternatively, when the reservation information is registered (or changed), the reservation information is transmitted to the meeting management server 30 even if there is no request. It is assumed that a general Web application is used as a method for the reservation person to reserve the meeting room 6 in the reservation management server 20. The reservation information management unit 22 is implemented by the CPU 201 in FIG. 4 executing the program 209p.

The reservation management server 20 includes a storage unit 29. The storage unit 29 is implemented by the memory 202 and the HDD 209 in FIG. 4. The storage unit 29 stores the reservation information DB 291, a constraint condition DB 292, and a request condition DB 293.

TABLE 1

| | | | | | | |
|---|---|---|---|---|---|---|
| | | RESERVATION INFORMATION DB | | | | |
| Reservation ID | Reservation person account | Meeting name | Meeting ID | Start time | End time | Prospective participant account |
| 001 | a@xfood.com | Product Z development meeting | K-001 | 2017/07/07 10:00 | 2017/07/07 12:00 | b@xfood.com c@xfood.com d@xfood.com |
| 002 | e@xfood.com | Product Y development meeting | K-001 | 2017/07/07 13:00 | 2017/07/07 14:00 | f@xfood.com g@xfood.com |
| ... | ... | ... | ... | ... | ... | ... |

Table 1 illustrates an example of the reservation information stored in the reservation information DB 291. The reservation information includes information for managing the reservation state of the meeting room 6. In the reservation information, items of a reservation person account, a meeting name, a meeting room ID, a start time, an end time, and a prospective participant account are registered in association with a reservation ID. The reservation ID includes identification information for identifying one record of the reservation information. The ID is an abbreviation for identification, which means an identifier and identification information. The ID refers to a name, a code, a character string, a numerical value, or a combination of one or more of these used to uniquely distinguish a particular object from a plurality of objects. The same applies to IDs other than the reservation ID. The reservation person account is an account of a prospective participant who has reserved the meeting room 6. The meeting name is a name of a meeting arbitrarily given by the prospective participant. The meeting room ID is identification information for identifying the meeting room 6 in the internal network. The start time is the start time of the time zone in which the meeting room 6 is reserved (the time when the meeting starts), and the end time is the end of the time zone in which the meeting room 6 is reserved (the time at which the meeting ends). The prospective participant account is an account of a prospective participant who is scheduled to participate in the meeting. Note that the accounts in Table 1 are the accounts issued by the reservation management server 20.

<<Chat Server>>

The chat server 10 includes a communication unit 11 and a text processing unit 12. Each of the functional units in the chat server 10 has functions or means, which are implemented by any one of the constituent categories illustrated in FIG. 4 operating according to a command from the CPU 201 in accordance with the program 209p expanded from the HDD 209 to the memory 202.

The communication unit 11 transmits and receives various kinds of information to and from the meeting management server 30. In the present embodiment, the communication unit 11 receives from the meeting management server 30 information related to meeting room reservation, information for identifying a bot (a token or the like to be described later), and information for specifying a notification destination group. The information for identifying the bot is previously notified from the chat server 10 as the bot identification information when the bot of the meeting management server is created. In addition, an individual account such as a reservation person may be designated. Furthermore, the communication unit 11 transmits to the meeting management server 30 that the prospective participant has already read the information related to the meeting room reservation or the response of the prospective participant to the displayed information related to the meeting room reservation. The communication unit 11 is implemented by the CPU 201 in FIG. 4 executing the program 209p and controlling the network driver 205, and the like.

The text processing unit 12 transmits information regarding the reservation of the meeting room 6 to the prospective participants belonging to the group as information that the bot speaks, based on the information for identifying the bot notified from the meeting management server 30 and the information for specifying the group to be notified. Therefore, the notification may be performed only by the number of participants who are scheduled to participate, or may be performed only the reservation person or the notification destination user. In addition, information regarding the reservation of the meeting room 6 is transmitted to only a specific notification destination.

The text processing unit 12 is capable of performing a so-called push notification. Examples of the mechanism include the following. The chat application 60a receives a push notification ID (token) from a server operated by an OS (Operating System) maker. In this server, a token and a device (terminal apparatus 60) are associated to each other. The chat application 60a registers the token and the account of the chat application 60a in the chat server 10. When the chat server 10 makes a push notification, the account of the chat application 60a is specified, so the associated token can be specified. The chat system designates a token and transmits notification contents to a server operated by the OS manufacturer. The server sends a push notification to the device (terminal apparatus 60) associated with the token.

The chat server 10 includes a storage unit 19. The storage unit 19 is implemented by the memory 202, the HDD 209, and the like in FIG. 4. The storage unit 19 stores a group information DB 191.

TABLE 2

GROUP INFORMATION DB

| Workspace | Channel | Member Account 1 | Member Account 2 | Member Account 3 | Member Account 4 | Pot account |
|---|---|---|---|---|---|---|
| http://sample.com/1 | #marketing | a@chat.com | b@chat.com | c@chat.com | d@chat.com | robo@chat.com |
| http://sample.com/2 | #team 1 | b@chat.com | d@chat.com | | | |
| http://sample.com/3 | #ip | f@chat.com | g@chat.com | h@chat.com | | robo@chat.com |
| ... | ... | ... | ... | ... | ... | ... |

Table 2 illustrates an example of group information stored in the group information DB 191. The group information is information in which accounts of members belonging to the same group are registered. In the group information, member accounts 1 to n (n=4 in Table 2) and bot accounts are registered in association with workspaces and channels.

The workspace is identification information for identifying organization such as a company or a department. In the present embodiment, a plurality of members belongs to a workspace (for example, company A). The workspace is, for example, a URL, but it may be unique. The workspace has a plurality of channels corresponding to the purpose of chat or the like. The channel is a group of members to which common information is exchanged, such as a group for product A and a group for product B, for example. One of the members belonging to the workspace belongs to the channel. That is to say, the notification destination is specified by the workspace and the channel. However, the method of specifying the notification destination varies depending on the chat system. Therefore, if there is identification information that can uniquely identify a group, the notification destination may be specified only by the information or by three or more pieces of information.

The channel is guaranteed to be unique. The member accounts 1 to n are channel member accounts, which are issued by the chat server 10. In the present embodiment, the bot is registered as a member for notifying information related to the reservation of the meeting room 6. The bot may be referred to as an agent or an imaginary member of the meeting management server 30. The bot remarks (text) are transmitted to the terminal apparatus 60 of the member accounts 1 to n.

The workspace and the channel are managed by the meeting management server 30, and become information for identifying the group to which the participant belongs.

<<Meeting Management Server>>

The meeting management server 30 includes a communication unit 31, an information association unit 32, a reservation information acquisition unit 33, a notification determination unit 34, a control information generation unit 35, a control information response unit 36, a meeting information notification unit 37, and a check-in management unit 38, an initial setting unit 39, an authentication unit 40, an authentication key verification unit 41, a management control unit 42, a terminal ID verification unit 43, and a reservation information transmission unit 44. Each of these functional units included in the meeting management server 30 has functions or means, which are implemented by any one of the constituent categories illustrated in FIG. 4 operating according to a command from the CPU 201 in accordance with the program 209p expanded from the HDD 209 to the memory 202. The program 209p is distributed from a server for program distribution or in a state stored in a storage medium.

The communication unit 31 transmits and receives various kinds of information to and from the reservation management server 20, the chat server 10, the registration terminal 50, and the terminal apparatus 60. The communication unit 31 includes a transmission unit 31a and a reception unit 31b. The reception unit 31b receives the reservation information from the reservation management server 20, and receives a reservation information request from the meeting room terminal 90. The reception unit 31b also receives a check-in request from the meeting room terminal 90. In addition, the reception unit 31b receives the association between the chat system group and the account from the registration terminal 50 operated by the administrator. The transmission unit 31a transmits information regarding the meeting room reservation to the chat server 10 and transmits the reservation information to the meeting room terminal 90. The communication unit 31 is implemented by the CPU 201 in FIG. 4 executing the program 209p and controlling the network driver 205, and the like.

The information association unit 32 mainly performs processing related to a pre-registration operation. Specifically, the information association unit 32 accepts domain registration from the registration terminal 50 or the like operated by the administrator, registers the accepted domain in the customer domain DB 495, and registers the chat system workspace and channel transmitted from the registration terminal 50 in the association information DB 491 in association with the account of the reservation management server 20. The information association unit 32 is implemented by the CPU 201 in FIG. 4 executing the program 209p.

The reservation information acquisition unit 33 specifies the account of the customer using the resource reservation system 100, acquires the reservation information from the reservation management server 20, and registers the reservation information in the meeting management information DB 493 as meeting management information. Alternatively, the reservation information acquisition unit 33 receives the changed reservation information. Accordingly, at least part of the reservation information in the reservation management server 20 is stored in the meeting management information DB 493. The reservation information acquisition unit 33 acquires future reservation information for a predetermined period from the present among the reservation information held in the reservation management server 20. The predetermined period is determined depending on which of the meetings to be held in the future is notified of information related to the reservation of the meeting room 6. The reservation information acquisition unit 33 is implemented by the CPU 201 in FIG. 4 executing the program 209p.

The notification determination unit 34 determines whether there is a reservation corresponding to a start time which satisfies a condition to be notified in the meeting management information. For example, the notification determination unit 34 refers to a notification settings DB 496 to determine whether the current time matches a date and time obtained by subtracting a period set in the notification settings DB 496 from the start time of the reservation. When the current time matches the obtained date and time by this subtraction, the notification determination unit 34 determines that a notification is to be sent. For example, when there are plural bots according to different roles, such as the bot for sending a reminder or the bot for receiving a reservation, the notification determination unit 34 specifies a suitable bot according to processing to be performed. The notification determination unit 34 is implemented by the CPU 201 in FIG. 4 executing the program 209p.

When the notification determination unit 34 determines that notification is to be made, the meeting information notification unit 37 specifies information for identifying the bot (for example, a token in slack) and information for specifying the group to be notified, and requests the chat server 10 to notify the information regarding the reservation of the meeting room 6. Note that the notification is performed by dividing into several times, and the meeting identification information is included in at least one of the notifications. The meeting identification information includes information for the meeting management server 30 to confirm that the participant has the right to use the reserved meeting room 6 in the reserved time slot. The meeting information notification unit 37 generates the meeting identification information at least before the final notification. The meeting identification information is registered in the meeting identification information DB 494. The meeting information notification unit 37 is implemented by the CPU 201 in FIG. 4 executing the program 209p.

The control information generation unit 35 generates control information for the electronic device 70 with reference to the meeting management information, and registers the control information in the control information DB 497. For example, the control information generation unit 35 generates control information for turning on the electronic device 70 several minutes before the start time of the meeting, and generates control information for turning off the electronic device 70 when detecting the checkout. The control information is stored in the control information DB 497. The control information generation unit 35 is implemented by the CPU 201 in FIG. 4 executing the program 20p.

The control information response unit 36 receives an inquiry as to whether there is the control information from the meeting room terminal 90 of the meeting room 6, refers to the control information DB 497, and transmits the control information corresponding to the meeting room 6 to the meeting room terminal 90. The control information response unit 36 is implemented by the CPU 201 in FIG. 4 executing the program 209p.

The check-in management unit 38 manages check-in and check-out to the meeting room. The check-in management unit 38 registers the status of the meeting associated with check-in and check-out in the meeting management information DB 493. Check-in is allowed 5-10 minutes prior to the meeting start time identified by the reservation ID. Then, check-in is permitted when a set of the meeting room ID and the meeting identification information transmitted by the meeting room terminal 90 is registered in the meeting identification information DB 494. The check-in management unit 38 is implemented by the CPU 201 in FIG. 4 executing the program 209p.

The initial setting unit 39 performs processing related to the initial setting of the meeting room terminal 90. For example, the initial setting unit 39 provides a list of meeting rooms (setting screen described later) to the registration terminal 50 of the administrator for the resource reservation system 100, specifies the meeting room ID and the meeting room name of the meeting room selected by the administrator for the resource reservation system 100, generates an authentication key and transmits the URL (Uniform Resource Locator of the meeting management server 30 to the registration terminal 50. The URL is address information of the meeting management server 30. The check-in management unit 38 is implemented by the CPU 201 in FIG. 4 executing the program 209p. The function of the initial setting unit 39 will be described in detail with reference to FIG. 8.

The authentication unit 40 authenticates the administrator based on the login password and the user ID in the login information DB 499.

49 stores an association information DB 491, a meeting management information DB 493, a meeting identification information DB 494, a customer domain DB 495, a notification setting DB 496, a control information DB 497, a meeting room setting information DR 498 and a login information DR 499.

TABLE 3

ASSOCIATION INFORMATION DB

| Workspace | Channel | Member Account 1 | Member Account 2 | Member Account 3 | Member Account 4 |
|---|---|---|---|---|---|
| http://sample.com/1 | #marketing | a@xfood.com a@chat.com | b@xfood.com b@chat.com | c@xfood.com c@chat.com | d@xfood.com d@chat.com |
| http://sample.com/2 | #team 1 | f@xfood.com f@chat.com | g@xfood.com g@chat.com | h@xfood.com h@chat.com | |
| ... | ... | ... | ... | ... | ... |

The authentication key verification unit 41 authenticates the meeting room terminal 90 based on whether the authentication key transmitted from the meeting room terminal matches a key registered in the meeting room setting information DB 498. Therefore, the reservation information can be acquired only by the meeting room terminal having the correct authentication key.

The management control unit 42 confirms whether the management start flag registered in the meeting room setting information DB 498 is True, and whether the acquisition of the reservation information is requested, for each meeting room. As will be described later, the management start flag is a flag indicating whether the management of the meeting room may be started.

The terminal ID verification unit 43 verifies whether a predetermined number or more of meeting room terminals are registered in one meeting room based on the terminal ID.

In response to a request from the meeting room terminal 90, the reservation information transmission unit 44 transmits the reservation information (meeting management information) stored in the meeting management information DB 493. However, it is necessary that authentication by the authentication key is successful, and that the management start flag is set to True. The reservation information transmission unit 44 may transmit in the JSON format, the XML format, the CVS (Comma-Separated Values) format, or the like. Since the reservation information is repeatedly transmitted, a format having a small capacity is advantageous.

The meeting management server 30 includes a storage unit 49. The storage unit 49 is implemented by the memory 202, the HDD 209, and the like in FIG. 4. The storage unit Table 3 illustrates an example of association information stored in the association information DB 491. The association information includes information for associating the account of the reservation management system with the group of the chat system. The association information has items of workspace, channel and member account 1 to n (n=4 in the table). The workspace and the channel are as described above. The account of each participant issued by the reservation management server 20 is registered in the member accounts 1 to n. Also, as illustrated in Table 3, the account of the chat system may be registered. In order to notify the group, it is enough to have an account of the reservation management server 20 of the user who has reserved the meeting in the reservation management server 20, and information to identify the group and channel of the notification destination (In the present embodiment, the workspace and the channel name). It is not always necessary to register the accounts of all members belonging to the group. However, when notifying a personal user, account information of each chat system is required, and therefore, registration may be made as illustrated in Table 3.

TABLE 4

MEETING MANAGEMENT INFORMATION DB

| Reservation ID | Reservation person account | Meeting name | Meeting ID | Start time | End time | Prospective participant account | Status |
|---|---|---|---|---|---|---|---|
| 001 | a@xfood.com | Product Z development meeting | K-001 | 2017/07/07 10:00 | 2017/07/07 12:00 | b@xfood.com c@xfood.com d@xfood.com | Checked in |
| 002 | e@xfood.com | Product Y development meeting | K-001 | 2017/07/07 13:00 | 2017/07/07 14:00 | f@xfood.com g@xfood.com | Notified |
| ... | ... | ... | ... | ... | ... | ... | ... |

Table 4 illustrates an example of the meeting management information stored in the meeting management information DB 493 of the meeting management server 30. Since the reservation information is stored in the meeting management information DB 493, Table 4 explains differences from the reservation information DB 291 in Table 1. The meeting management information in Table 4 has an item of status. The status means the status of the reservation. For example, a status such as notified status of information related to the reservation of the meeting room 6, confirmed use, checked in, checked out, or canceled (cancellation) is registered.

TABLE 5

MEETING IDENTIFICATION INFORMATION DB

| Reservation ID | Meeting room ID | Meeting identification information |
|---|---|---|
| 001 | K-001 | 1234 |
| 002 | K-002 | 5678 |
| ... | ... | ... |

Table 5 illustrates an example of the meeting identification information management information stored in the meeting identification information DB 494. The meeting identification information management information includes information for managing the meeting identification information for each reservation in the meeting room 6. The meeting identification information management information includes items of reservation ID, meeting room ID, and the meeting identification information. These are the same as the reservation information except for the status (reservation information received from the reservation management server 20), and since it has already been described, the description thereof is omitted. Note that the reservation ID is registered in order to identify the reservation in the same meeting room 6. The status means the status of the reservation. For example, a status such as notified status of information related to the reservation of the meeting room 6, confirmed use, checked in, checked out, or canceled (cancelation) is registered.

TABLE 6

CUSTOMER DOMAIN DB

| Customer domain name | Customer administrator account |
|---|---|
| xfood.com | a@xfood.com |
| ycar.com | f@ycar.com |
| ... | ... |

Table 6 illustrates an example of customer domain information stored in the customer domain DB 495. The customer domain information includes information for managing customer domains and customer administrator accounts. The customer domain information is registered in association with the customer domain name and the customer administrator account. The customer domain in Table 6 is a domain of an account (mail address) issued by the reservation management server 20. The administrator account is an account of a customer administrator (representative). Note that the account in Table 6 is issued by the reservation management server 20.

TABLE 7

NOTIFICATION SETTING DB

| Customer domain name | Notification setting |
|---|---|
| xfood.com | One day ago |
| ycar.com | 12 hours ago |
| ... | ... |

Table 7 illustrates an example of notification setting information stored in the notification setting DB 496. The notification setting information holds settings relating to the notification for each customer. The notification setting information is registered in association with the customer domain name and the notification setting. The notification setting sets the timing for notifying information related to the reservation of the meeting room 6 before the start time of the meeting. Alternatively, a predetermined date and time may be set. Further, the timing may not necessarily be one, and a plurality of notification settings may be registered in one customer.

TABLE 8

CONTROL INFORMATION DB

| Meeting ID | Control content |
|---|---|
| K-001 | Power ON |
| K-002 | Power Off |
| ... | ... |

Table 8 illustrates an example of the control information stored in the control information DB 497. The control information includes information for controlling the electronic device 70 in the meeting room 6. The control information includes items of the meeting room ID and control content. The control content is a specific control method of the electronic device 70. The meeting management server 30 can set detailed control content for each electronic device 70. The reason why the time to control is not registered is that it is difficult to transmit from the meeting management server 30 of the external network to the meeting room terminal 90, and that if the control information is generated when the meeting room terminal 90 accesses the meeting management server 30, the control content is transmitted.

TABLE 9

MEETING ROOM SETTING INFORMATION DB

| Customer ID | Meeting room name | Meeting room ID | Status of meeting room terminal | Authentication key | Management start flag | Number of registrable meeting room terminals |
|---|---|---|---|---|---|---|
| G-001 | Meeting room A | K-001 | connected | ***** | True | 1 |
|  | Meeting room B | K-002 | Before set-up | ***** | False | 1 |
|  | Meeting room C | K-003 | disconnected | ***** | True | 2 |

Table 9 illustrates an example of the meeting room setting information stored in the meeting room setting information DB 498. The meeting room setting information includes information related to the setting for each meeting room. The meeting room setting information includes items of the meeting room name, the meeting room ID, the state of the meeting room terminal, the authentication key, the management start flag and the number of registrable meeting room terminals, in association with the customer ID.

- The meeting room name is a general name of a meeting room recognized by the participants of the meeting, and is presented at the entrance of the meeting room, for example.
- The meeting room ID includes identification information for uniquely identifying the meeting room as described above. In brief, the meeting room ID may be shared by the reservation management server 20. Further, by providing a conversion table, the administrator can be set separately from the reservation management server 20.
- The state of the meeting room terminal indicates whether the initial setting of the meeting room terminal 90 has been completed or whether communication is possible, or the like.

Connected: States where communication is confirmed within a certain period

Before setup: Before initial setup

Disconnected: Status where no communication for a certain period or longer

- The authentication key serves as authentication information for the meeting management server 30 to authenticate the meeting room terminal 90. The authentication key is transmitted to the meeting room terminal 90 by the initial setting. The authentication key is a combination of digits, alphabets, symbols, and the like, which are long enough not to be specified by the brute force method. The authentication key may be determined by the administrator even if the meeting management server 30 determines the authentication key.
- The management start flag is a flag (True: Start, False: Do not start) indicating whether the meeting management server 30 starts managing the meeting room after the initialization of the meeting room terminal 90 is completed. By the management start flag, inconvenience caused by a time lag from the completion of the initial setting to the arrangement of the meeting room terminal 90 can be suppressed. Details will be described later.
- The number of registrable meeting room terminals is the number of meeting room terminals that can be associated with one meeting room. Although there is no problem if there is one meeting room terminal 90 in one meeting room, if an abnormality occurs to the meeting room terminal 90, it becomes difficult to check in the meeting room during repairing the meeting room terminal 90. Therefore, there is a case where the administrator would like to associate the plurality of meeting room terminals 90 with one meeting room. Therefore, even when the authentication key leaks to the outside, the terminal IDs match and the number of the terminal IDs are determined, so that it is possible to suppress the leakage of the reservation information to the outside. The initial value may be one or more.

The meeting room name and the meeting room ID are predetermined or can be set by the administrator. The meeting room name and the meeting room ID transmitted from the reservation management server 20 may be used. The initial state of the meeting room terminal (immediately after setting by the provider) is before the setup, but changes depending on the communication status. The authentication key is set by the meeting management server 30, for example, at the time of initial setting. The management start flag is set by the administrator from a setting screen or the like which will be described later. The number of registrable meeting room terminals can be set by the administrator as well. The number of registrable meeting room terminals is often one or more. When set to one, only one meeting room terminal 90 can be registered in one meeting room.

TABLE 10

LOGIN INFORMATION DB

| Customer ID | Login password | User ID | Server URL |
|---|---|---|---|
| G-001 | ******* | a@xfood.com | http://kaigi.xfood.com/ |

Table 10 illustrates an example of login information stored in the login information DB 499. The login information includes information for the administrator to log in to the meeting management server 30. The login information includes items of the customer ID, the login password, the user ID, and the server URL. The administrator logs in to the meeting management server 30 with the login password and the user ID, and causes the registration terminal 50 to display a setting screen described later. The customer who has the meeting room where the administrator places the meeting room terminal 90 is specified by the login. The server URL assigned to the customer is registered in the login information DB 499, and the meeting room terminal 90 of the customer can communicate with the meeting management server 30. The server URL is a URL assigned to a customer in the meeting management server 30, and the meeting room terminal 90 can access the server URL to acquire the customer reservation information. However, the server URL may be common to a plurality of customers.

<<Registration Terminal>>

The registration terminal 50 includes a communication unit 51, an operation reception unit 52, and a display control unit 53. Each of these functional units included in the registration terminal 50 has functions or means, which are implemented by any one of the constituent elements illustrated in FIG. 4 operating according to a command from the CPU 201 in accordance with the program 209p expanded from the HDD 209 to the memory 202. The program 209p is distributed from a server for program distribution or in a state stored in a storage medium.

The registration terminal 50 is a terminal for the administrator to perform various settings relating to the meeting room via a Web page provided by the meeting management server. One of the settings is the initial setting. The terminal apparatus 60 may be used for the initial setting. The functions of the communication unit 51, the operation reception unit 52, and the display control unit 53 in the registration terminal 50 are the same as those in the terminal apparatus 60, and the details thereof will be described with reference to the terminal apparatus 60.

<<Terminal Apparatus>>

Figure 7:
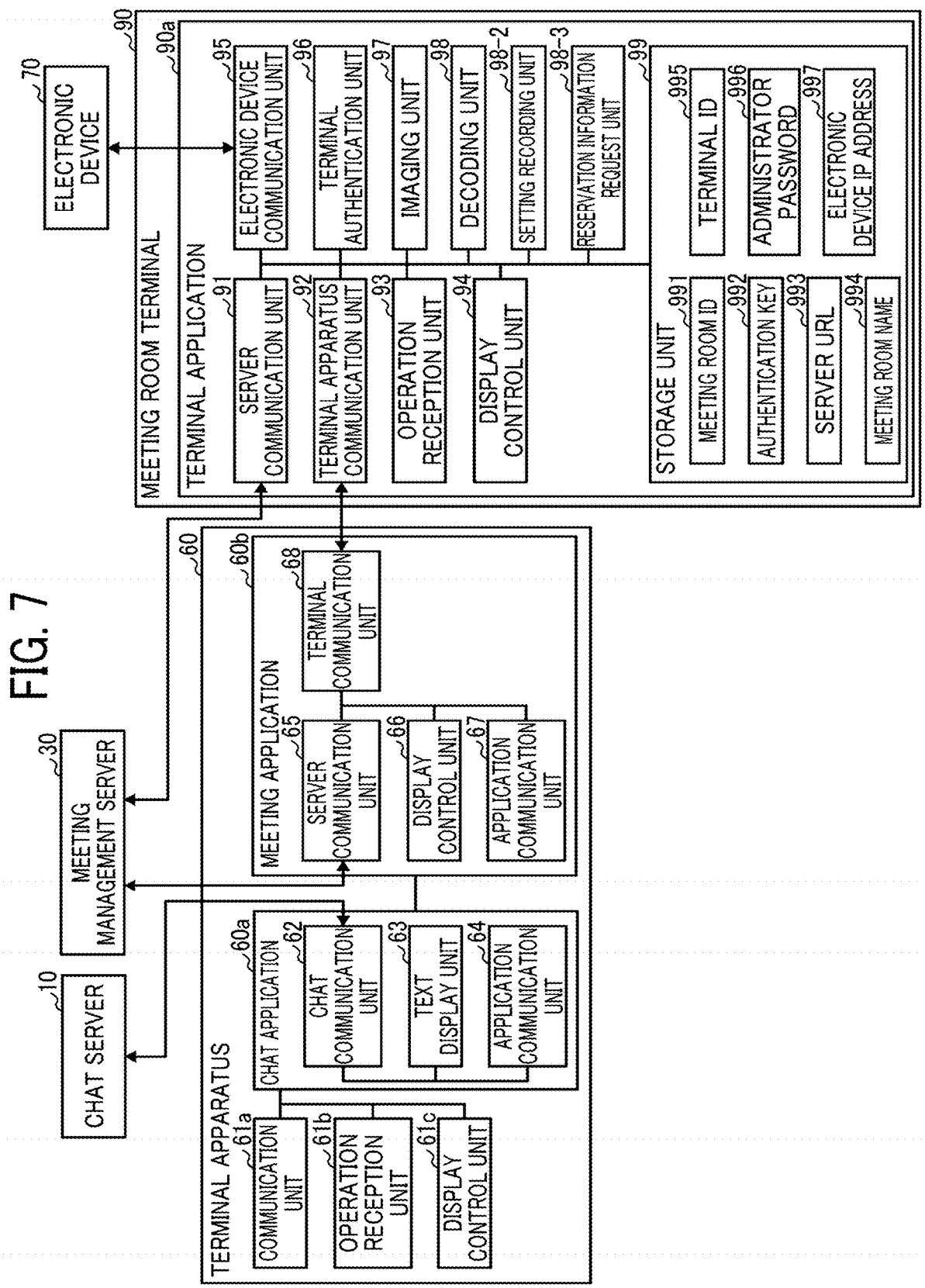
FIG. 7 is a block diagram illustrating an example of a functional configuration of a terminal apparatus and the meeting room terminal, according to an embodiment of the present disclosure.

FIG. 7 is a block diagram illustrating an example of functional configurations of the terminal apparatus 60 and the meeting room terminal 90. The function of the electronic device 70 will be described as necessary.

The terminal apparatus 60 includes a communication unit 61a, an operation reception unit 61b, a display control unit 61c, a chat communication unit 62, a text display unit 63, an application communication unit 64, a server communication unit 65, a display control unit 66, an application communication unit 67, and a terminal communication unit 68. Each of these functional units included in the terminal apparatus 60 has functions or means, which are implemented by any one of the constituent categories illustrated in FIG. 4 operating according to a command from the CPU 201 in accordance with the program 209p expanded from the HDD 209 to the memory 202. The program 209p is distributed from a server for program distribution or in a state stored in a storage medium. Since the chat application 60a and the meeting application 60b operates on the terminal apparatus 60, the program 209p includes the chat application 60a and the meeting application 60b.

The communication unit 61a transmits and receives various kinds of information to and from the meeting management server 30 and the reservation management server 20. The communication unit 61a is implemented by the CPU 201 in FIG. 4 executing the program 209p and controlling the network driver 205, and the like.

The operation reception unit 61b accepts various operations of a participant with respect to the terminal apparatus 60. The operation reception unit 61b is implemented by the CPU 201 in FIG. 4 executing the program 209p and controlling the input device 210, and the like.

The display control unit 61c interprets screen information of various screens and displays the information on the LCD 206. The operation reception unit 61b and the display control unit 61c have, for example, a browser function and can execute a web application. For example, the reservation setting screen received from the reservation management server 20 is displayed, and the operation reception unit 61b accepts reservation information set by the reservation person.

The chat communication unit 62 of the chat application 60a transmits and receives various kinds of information to and from the chat server 10. In the present embodiment, the chat server 10 receives information regarding the reservation of the meeting room 6, and notifies the chat server 10 of facts of what is already read, whether the meeting room 6 is scheduled to be used or canceled, and the like. The chat communication unit 62 is implemented by the CPU 201 in FIG. 4 executing the program 209p and controlling the network driver 205, and the like.

The text display unit 63 of the chat application 60a displays text transmitted from the chat server 10 (information related to the reservation of the meeting room 6). For example, the utterance source is a bot, and the text display unit 63 displays the text as if the bot had input. The text display unit 63 is implemented by the CPU 201 in FIG. 4 executing the chat application 60a.

The application communication unit 64 of the chat application 60a calls the meeting application 60b and transmits the meeting identification information to the meeting application 60b. Since the chat server 10 transmits information identifying the meeting application 60b to the terminal apparatus 60 when notifying information related to the reservation of the meeting room 6, the chat application 60a designates the meeting application 60b to the OS and requests notification of the meeting identification information. The OS can activate the meeting application 60b. The application communication unit 64 is implemented by the CPU 201 in FIG. 4 executing the chat application 60a.

The server communication unit 65 of the meeting application 60b communicates with the meeting management server 30. An image code including the meeting identification information may be acquired from the meeting management server 30. The server communication unit 65 is implemented by the CPU 201 in FIG. 4 executing the meeting application 60b. The image code is used for authentication at check-in. A few digits for authentication may be also used.

The display control unit 66 of the meeting application 60b displays an image code or the like including the meeting identification information on the LCD 206. The display control unit 66 is implemented by the CPU 201 in FIG. 4 executing the meeting application 60b and controlling the graphics driver.

The application communication unit 67 of the meeting application 60b acquires various types of information (such as the meeting identification information included in the information related to the reservation of the meeting room 6) from the chat application 60a via the OS. The application communication unit 67 is implemented by the CPU 201 in FIG. 4 executing the meeting application 60b.

The terminal communication unit 68 communicates with the meeting room terminal 90 and transmits the meeting identification information and the like. The terminal communication unit 68 detects the presence of the meeting room terminal 90 by a short-range wireless communication such as Bluetooth (registered trademark), and transmits the meeting identification information when the meeting room terminal 90 is detected. Also, a function of displaying an image code is provided to the meeting room terminal 90. The terminal communication unit 68 is implemented by the CPU 201 in FIG. 4 executing the meeting application 60b.

<<Meeting Room Terminal>>

The meeting room terminal 90 includes a server communication unit 91, a terminal apparatus communication unit 92, an operation reception unit 93, a display control unit 94, an electronic device communication unit 95, a terminal authentication unit 96, an imaging unit 97, a decoding unit 98, a setting recording unit 98-2, and a reservation information request unit 98-3. Each of these functional units included in the meeting room terminal 90 has functions or means, which are implemented by any one of the constituent categories illustrated in FIG. 5A and FIG. 5B operating according to a command from the CPU 601 in accordance with the program 604p expanded from the EEPROM 604 to the RAM 603. The program 604p is distributed from a server for program distribution or in a state stored in a storage medium.

The server communication unit 91 communicates with the meeting management server 30 with the server URL 993 as a destination. Since the meeting room terminal 90 exists in the internal network, it is difficult to communicate with the meeting room terminal 90 from the meeting management server 30. Therefore, the server communication unit 91 communicates with the meeting management server 30 by means of a communication technology such as polling (periodically communicating with the meeting management server 30) or Web Socket. When there is no communication from the server communication unit 91, disconnection is registered in the meeting room setting information DB 498. The server communication unit 91 may communicate with a communication protocol such as HTTP, and the communication protocol is not particularly limited.

The server communication unit 91 of the present embodiment receives the reservation information, and transmits, at check-in, to the meeting management server 30 the meeting identification information which is received by the terminal apparatus communication unit 92 from the terminal apparatus 60 or which is input by hand. Further, the server communication unit 91 receives the control information from the meeting management server 30. The server communication unit 91 is implemented by the CPU 601 in FIG. 5A executing the program 604p and controlling the wireless LAN communication unit 613.

The terminal apparatus communication unit 92 communicates with the terminal apparatus 60. In the present embodiment, the meeting identification information or the like is received. The terminal apparatus communication unit 92 is implemented by the CPU 601 in FIG. 5A executing the program 604p and controlling the short-range wireless communication unit 615 or the RF tag reader/writer 622.

The electronic device communication unit 95 communicates with the electronic device 70. In the present embodiment, the control information received by the server communication unit 91 is transmitted to the electronic device 70. The electronic device communication unit 95 is implemented by the CPU 601 in FIG. 5A executing the program 604p and controlling the wireless LAN communication unit 613, and the like.

The display control unit 94 displays a screen to be generated by the terminal application 90a on the display 616. This screen is a standby screen that allows check-in and check-out. The display control unit 94 is implemented by the CPU 601 in FIG. 5A executing the program 604p to control the display 616, and the like.

The operation reception unit 93 receives various operations to the meeting room terminal 90. The operation reception unit 93 is implemented by the CPU 601 in FIG. 5A executing the program 604p and controlling the touch panel 617, and the like.

The terminal authentication unit 96 authenticates the administrator login to the terminal application based on whether the input administrator password is correct. This is because the meeting room terminal 90 located in the meeting room can be operated by unspecified participants, so that there is a possibility that the initial setting is changed when there is no authentication function.

The imaging unit 97 mainly captures an image code. When the administrator operates or moves the meeting room terminal 90 so that the image code enters the angle of view of the CMOS sensor 605, the imaging unit 97 recognizes the image code and automatically generates image data. The decoding unit 98 decodes the image code captured by the imaging unit 97 to restore the communication setting information.

The setting recording unit 98-2 stores the communication setting information (the meeting room ID, the authentication key, the server URL and the meeting room name) decoded by the decoding unit 98 in the storage unit 99.

The meeting room terminal 90 includes the storage unit 99. The storage unit 99 is implemented by the ROM 602 and the EEPROM 604 in FIG. 5A. The storage unit 99 stores the meeting room ID 991, the authentication key 992, the server URL 993, the meeting room name 994, the terminal ID 995, the administrator password 996, and the IP address 997 of the electronic device 70.

The reservation information request unit 98-3 repeatedly transmits the meeting room ID and the authentication key to the meeting management server 30 via the server communication unit 91 at a periodical timing for acquiring the reservation information. As the response, the reservation information request unit 98-3 acquires the reservation information via the server communication unit 91. The reservation information may be acquired only when there is a change. The timing is a period of several seconds to several minutes. Although the reservation information can be updated earlier when the period is shorter, the communication load is increased, and therefore, it is determined by considering both of them. In the present embodiment, for example, a period of 30 seconds is used. The meeting management information (reservation information) of the meeting room 6 on the day can be received via the server communication unit 91.

The terminal ID 995 is identification information of the meeting room terminal 90. The terminal ID is used for the meeting management server 30 to identify the meeting room terminals 90 in order to prevent more than a predetermined number of meeting room terminals 90 in one meeting room from being connected to the meeting management server 30. The terminal ID may be unique, for example, a UUID (Universally Unique Identifier), MAC address of the terminal application. The UUID is a unique identifier that does not allow two or more items to have the same value over the entire world without any particular management.

The administrator password 996 is set by the administrator at the timing of installing the terminal application 90a or at the timing of activating the terminal application 90a for the first time. The IP address 997 of the electronic device 70 is set by the administrator as necessary.

<Regarding Initial Setting Section of Meeting Management Server>

Figure 8:
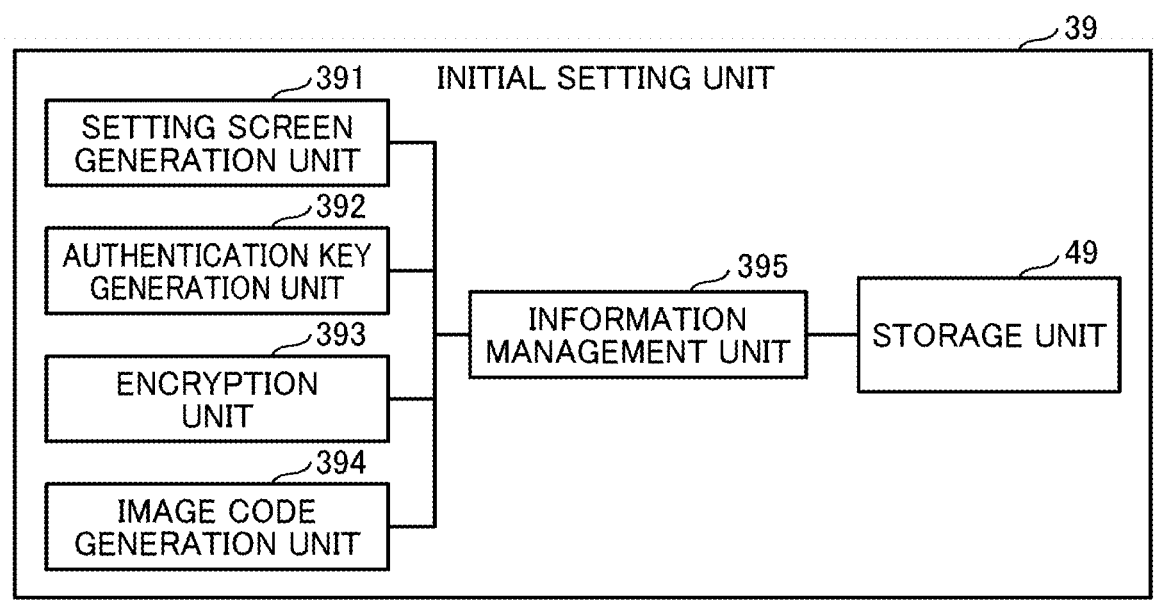
FIG. 8 is a block diagram illustrating an example of a functional configuration of an initial setting unit, according to an embodiment of the present disclosure.

FIG. 8 is a block diagram illustrating an example of a functional configuration of the initial setting unit 39 in a block form. The initial setting unit 39 includes a setting screen generation unit 391, an authentication key generation unit 392, an encryption unit 393, an image code generation unit 394, and an information management unit 395. The storage unit 49 is the same as that illustrated in FIG. 6. The initial setting unit 39 controls each function to perform necessary processing.

The information management unit 395 reads out various types of information stored in the storage unit 49, and sends the information to functions that require the information (the setting screen generation unit 391, the authentication key generation unit 392, the encryption unit 393, and the image code generation unit 394).

The setting screen generation unit 391 generates screen information for the setting screen, and transmits the screen information to the registration terminal 50 via the communication unit 31. The screen information is created by HTML, CSS (Cascade Style Sheet), JavaScript (registered trademark), or the like. The setting screen is provided as one screen of a Web application that runs on a browser by JavaScript (registered trademark).

The encryption unit 393 encrypts the communication setting information acquired from the storage unit 49 by the information management unit 395. The image code generation unit 394 encodes the encrypted communication setting information into an image code. In short, the communication setting information is information necessary for the meeting room terminal 90 to communicate with the meeting management server 30. The server URL is information for specifying the communication destination, the authentication key is information for receiving authentication, and the meeting room ID is information for notifying which meeting room the communication is from. Since the meeting room name is information that the meeting room terminal 90 displays, there is no problem even if the meeting room name is not included in the communication setting information.

<Regarding Setting Screen>

FIG. 9 illustrates an example of a setting screen 501 displayed on the registration terminal 50. The administrator logs in to the meeting management server 30 from the registration terminal 50 with her/his login password and user ID. In the present embodiment, since the initial setting is performed, the administrator displays the setting screen 501 illustrated by way of example in FIG. 9.

The setting screen 501 displays columns including a check mark field 502, a meeting room name field 503, a meeting room ID field 504, a meeting room terminal connection status field 505, an operation group field 506, an image code field 507, and a number of registrable terminals field 508. The contents of the columns are information stored in the meeting room setting information DB 498 in Table 9, except for the operation group. The operation group is a group that defines an operation policy of the meeting room. There are a meeting room for general employees, a meeting room for executives, a reception room, a training room and so on as the meeting room, and there are cases where the operation policy should be changed depending on the group. For example, in a general meeting room, the meeting start time may be used as the automatic cancellation timing, but in the reception room, it is desired to delay the automatic cancellation timing in consideration of the possibility that the visitor is delayed. In addition, it may be desirable to make the timing of reminding different between the training room (early time required for training) and the general meeting room.

In the items illustrated in FIG. 9, in the present embodiment, it may be enough to display at least the meeting room name field 503 and the image code field 507. Note that the administrator can confirm the state (operation status) of the meeting room terminal in each meeting room by the connection status field 505 on the meeting room terminal. For example, in case of disconnected, it is possible to immediately check the situation.

The check mark field 502 corresponds to the management start flag in the meeting room setting information DB 498 in Table 9. The check mark field 502 is a reception button for accepting a setting for requesting the start of meeting room management. "Checked" is True, "No Check" is False. The presence of the check mark field 502 can prevent the meeting management server 30 from starting meeting room management, particularly automatic cancellation, even if the initial setting has been completed. For example, when the workplace 102 of the administrator is away from the meeting room, it takes time to set up the meeting room after the administrator initially sets up the meeting room terminal 90. If the meeting cancellation time elapses between the initial settings and the meeting room settings, even if the participant is in the meeting room, problems such that the room reservation is canceled, the room is double-booked, and another person enters the room may occur.

In addition, when the administrator performs the initial setting of the number of meeting room terminals 90, it takes time from the initial setting of the first meeting room terminal 90 to the initial setting of the final meeting room terminal 90 by the administrator. If the meeting cancellation time elapses during this period, even if the participant is in the meeting room, problems such that the room reservation is canceled, the room is double-booked, and another person enters the room may occur.

It is also effective to start meeting room management almost simultaneously in each meeting room depending on the operation.

When the check mark field 502 is checked and the meeting room terminal 90 starts the acquisition request of the reservation information after the image code is captured, the meeting management server 30 starts the transmission of the reservation information to the meeting room terminal 90 and the cancellation of the reservation information when the use of the meeting room is not started for a predetermined time, as the start of the management.

The image code field 507 illustrated in FIG. 9 can accept an administrator's input. When the administrator presses the image code field 507 of an arbitrary meeting room, the operation reception unit 52 of the registration terminal 50 receives the input, and the registration terminal 50 requests the meeting management server 30 for the image code. In this way, the communication unit 51 can receive the image code including the communication setting information.

The administrator can arbitrarily set the number of registrable terminals. However, since it is preferable that at least one meeting room terminal 90 is placed in the meeting room, it is preferable that the setting screen 501 does not accept 0 (zero).

A number of terminals field 508 accepts input (setting) of the upper limit number of the registrable meeting room terminals 90 in one meeting room.

Note that FIG. 9 displays a plurality of meeting rooms. However, when the provider who provides the resource reservation system 100 does not perform various settings regarding the meeting room of the customer in the meeting management server 30, none might be displayed.

FIG. 10 illustrates the setting screen 501 displayed with the image code superimposed. When the "image code display" in the image code field 507 is pressed, the display control unit 53 of the registration terminal 50 pops up the image code 110 on the setting screen 501, as illustrated in FIG. 10. The meeting room name and the meeting room ID may be displayed together with the image code 110. As a result, the administrator can grasp which meeting room image code for the initial setting.

The image code 110 may be displayed as another Web page instead of the pop-up display, or may be downloaded as a single file. The administrator captures the image code with the meeting room terminal 90 to be initially set.

<Screen Transition of Meeting Room Terminal>

Figure 11:
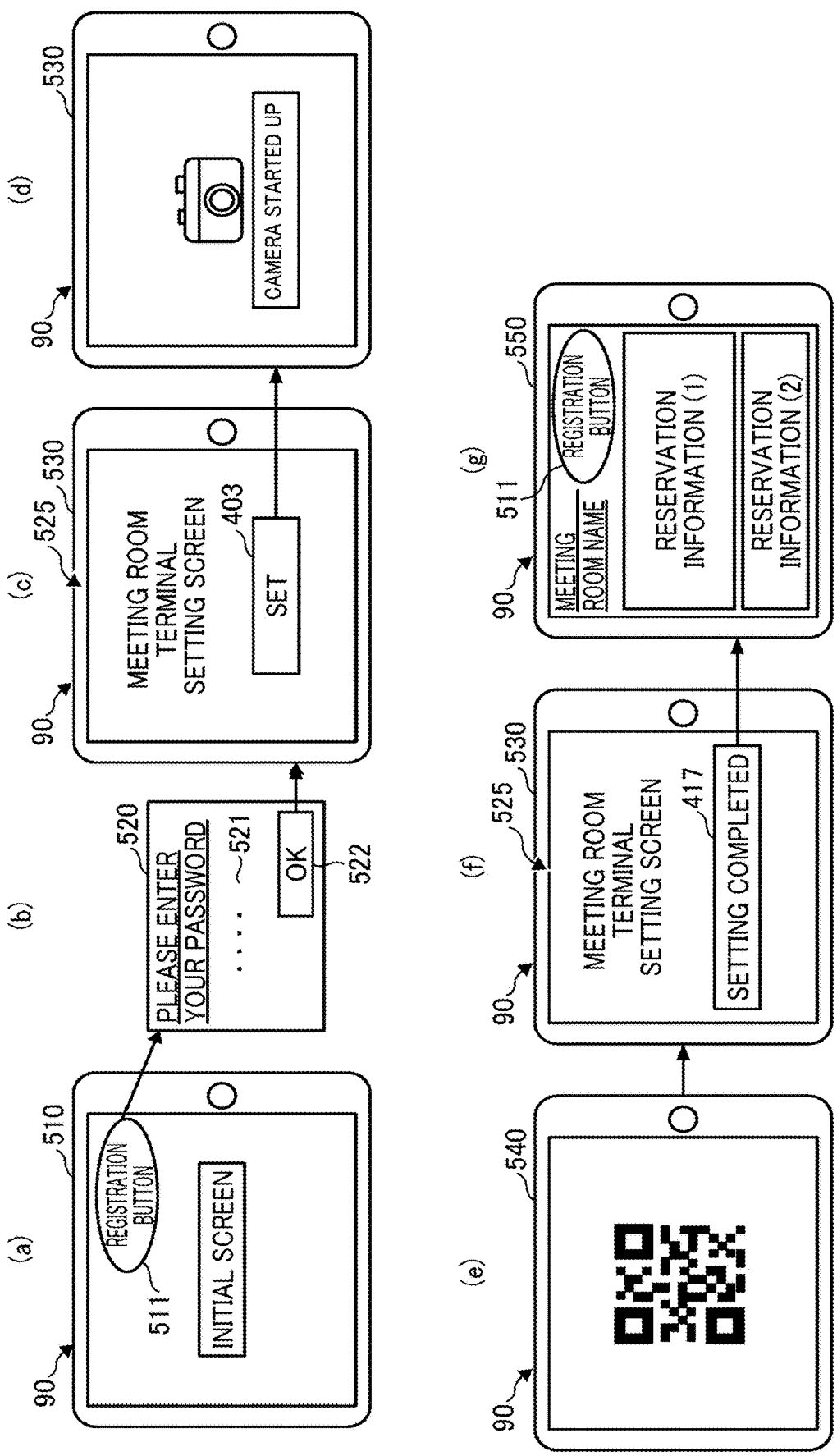
FIG. 11 is a diagram illustrating an example of a screen of the meeting room terminal displayed by a terminal application, according to an embodiment of the present disclosure.

Next, a description will be given of a transition of the screen displayed by the terminal application of the meeting room terminal 90 with reference to FIG. 11. FIG. 11 illustrates an example of the screen displayed by the terminal application of the meeting room terminal 90.

First, when the administrator activates the terminal application of the meeting room terminal 90, Screen (a) of FIG. 11 as an initial screen 510 is displayed. The initial screen 510 has a registration button 511. When the administrator presses the registration button 511, the operation reception unit 93 accepts the pressing of the registration button 511. The registration button 511 is a button for registering the meeting room terminal 90 in the meeting management server 30 (for initial setting).

When the registration button 511 is hold down, the display control unit 94 of the meeting room terminal 90 displays Screen (b) of FIG. 11 as a password input screen 520. The password input screen 520 includes a password input field 521 and an OK button 522. The administrator inputs the administrator password stored in the storage unit 99 into the password input field 521, and then presses the OK button 522. The operation reception unit 93 accepts these operations. The terminal authentication unit 96 compares the input administrator password with the administrator password stored in the storage unit 99, and determines whether the authentication has succeeded or failed. This makes it possible to prevent a general user from arbitrarily changing the setting of the meeting room terminal 90 in the meeting room where the general user enters and exits.

When the authentication is successful by the administrator password, Screen (c) of FIG. 11 as a meeting room terminal setting screen 525 is displayed. The details of the meeting room terminal setting screen 525 will be described with reference to FIG. 12. When the administrator presses a setting button 403 to be described later, the imaging unit 97 of the meeting room terminal 90 is activated as illustrated in Screen (d) of FIG. 11. Screen (d) is a starting-up screen 530. When the administrator operates or moves the meeting room terminal 90 so that the image code in FIG. 10 enters the angle of view of the CMOS sensor 605, the imaging unit 97 captures the image code.

As illustrated in Screen (e) of FIG. 11, the display control unit 94 of the meeting room terminal 90 displays the captured image code (an example of information to be provided) on the display 616 (an example of a display unit) like a moving image, in order to make it easy for the administrator to operate during imaging. Screen (e) of FIG. 11 is an imaging screen 540. The decoding unit 98 decodes the captured image code to restore the communication setting information.

When the communication setting information is restored by decoding the image code, the meeting room terminal setting screen 525 is displayed again as illustrated in Screen (f) of FIG. 11. The meeting room name of the communication setting information is automatically displayed on the meeting room terminal setting screen 525. When the administrator presses a setting completion button 417, the meeting room terminal 90 starts acquiring the reservation information. After the setting completion button 417 is pressed, a standby screen without reservation information is displayed.

The server communication unit 91 of the meeting room terminal 90 can communicate with the meeting management server 30 by using the communication setting information. When the authentication with the authentication key and the confirmation of the management start flag are successful, the meeting room terminal 90 can acquire the reservation information.

As described above, when the initial setting of the meeting room terminal 90 is completed, and the management start flag becomes True, the meeting room terminal 90 starts to download the reservation information. Screen (g) of FIG. 11 is a display screen (standby screen) 550 for the downloaded reservation information. Display examples of the standby screen will be described with reference to FIGS. 16 to 18.

Figure 12:
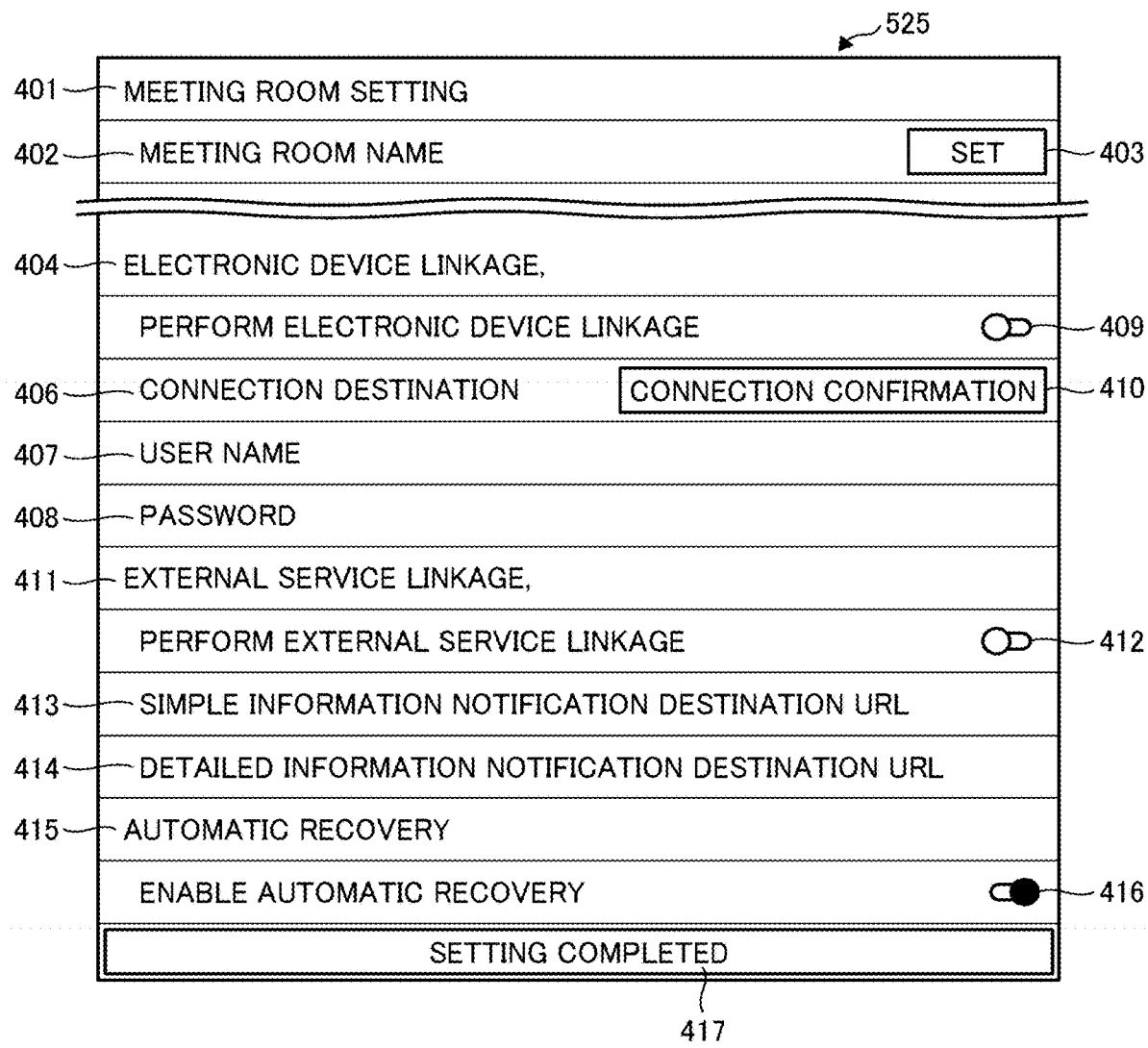
FIG. 12 is a diagram illustrating an example of a setting screen of the meeting room terminal, according to an embodiment of the present disclosure.

FIG. 12 illustrates an example of the meeting room terminal setting screen 525. Note that some setting items such as proxy server setting are omitted. The meeting room terminal setting screen 525 includes a meeting room name field 401, an electronic device linkage field 404, an external service linkage field 411, and an automatic recovery field 415. The meeting room name is displayed in the meeting room name field 401. A meeting room name 402 is automatically displayed by reading the image code. A setting button 403 is a button for activating a camera for picking up an image code.

The electronic device linkage field 404 is a field for setting whether to cooperate with the electronic device. The cooperation with the electronic device 70 is, for example, turning ON by the meeting room terminal 90 in conjunction with (at the same time of) check-in (or returning from sleep), and turning off the meeting room terminal 90 (or moving to sleep) in conjunction with the check-in (simultaneously). The electronic device linkage field 404 includes a switching button 409, a connection destination field 406, a username field 407, a password field 408, and a connection confirmation button 410. The switching button 409 is a button for switching whether to cooperate with the electronic device 70. The connection destination field 406 is a field for specifying an electronic device of a connection destination such as an IP address or a computer name of the electronic device. The username field 407 and the password field 408 are provided for the meeting room terminal 90 to log in to the electronic device 70 (to protect the electronic device 70). The connection confirmation button 410 is a button that makes the meeting room terminal 90 communicate with the electronic device 70 in a trial manner.

The external service linkage field 411 includes a switching button 412, a simple information notification destination URL field 413, and a detailed information notification destination URL field 414. The cooperation with the external service means that the check-in and check-out timing and the reservation information set at the time of reservation by the reservation person are passed to an external application (various applications operating on the electronic device 70). More specifically, the following cooperation is possible:

Start a remote meeting at the same time as check-in in cooperation with the remote meeting service. A communication ID of a destination to be remotely connected is inputted at the time of reservation (included in the reservation information).

In cooperation with the whiteboard service, initializes the whiteboard at the same time as check-in (deletes writing), and sends the reservation person, the participant, the meeting name, the meeting date, etc. to the whiteboard application for display. Start to store the screen data (handwritten data, projected materials) displayed on the whiteboard at the meeting at the time of (upon) check-in to the reservation management server, along with the reservation ID included in the reservation information.

Start an automatic minutes creation service at the same time as check-in in cooperation with the automatic minutes creation service. End as soon as check-out.

The switching button 412 is a button for switching whether to cooperate with an external service. A URL of a notification destination to which simple information is to be notified is set in the simple information notification destination URL field 413. The simple information is, for example, the following contents.

Change in status (check-in detected (including "use now"), the check-out detected, and the reservation time extended).

Meeting name

Meeting start time and end time

Meeting room information (meeting room ID, meeting room name)

A URL of a notification destination to which detailed information is to be notified is set in the detailed information notification destination URL field 414. The detailed information is, for example, the following contents.

Meeting name

Meeting start time and end time

Meeting room information (meeting room ID, meeting room name)

The name, the address, and the URL of the icon image of the reservation person (also displayed on the standby screen)

Each participant's name, address, icon image URL

The automatic recovery field 415 includes a switching button 416. The automatic recovery means that the terminal application 90a itself restarted to display the terminal application 90a on the front surface, when the terminal application 90a is not displayed on the front surface, for example, when a general user tries to close the terminal application 90a and operate another application, or when returning to the home screen by running the terminal application 90a in the background.

The meeting room terminal setting screen 525 has a setting completion button 417. The setting completion button 417 is a button for completing the setting illustrated in FIG. 12 and displaying a standby screen.

Figure 13:
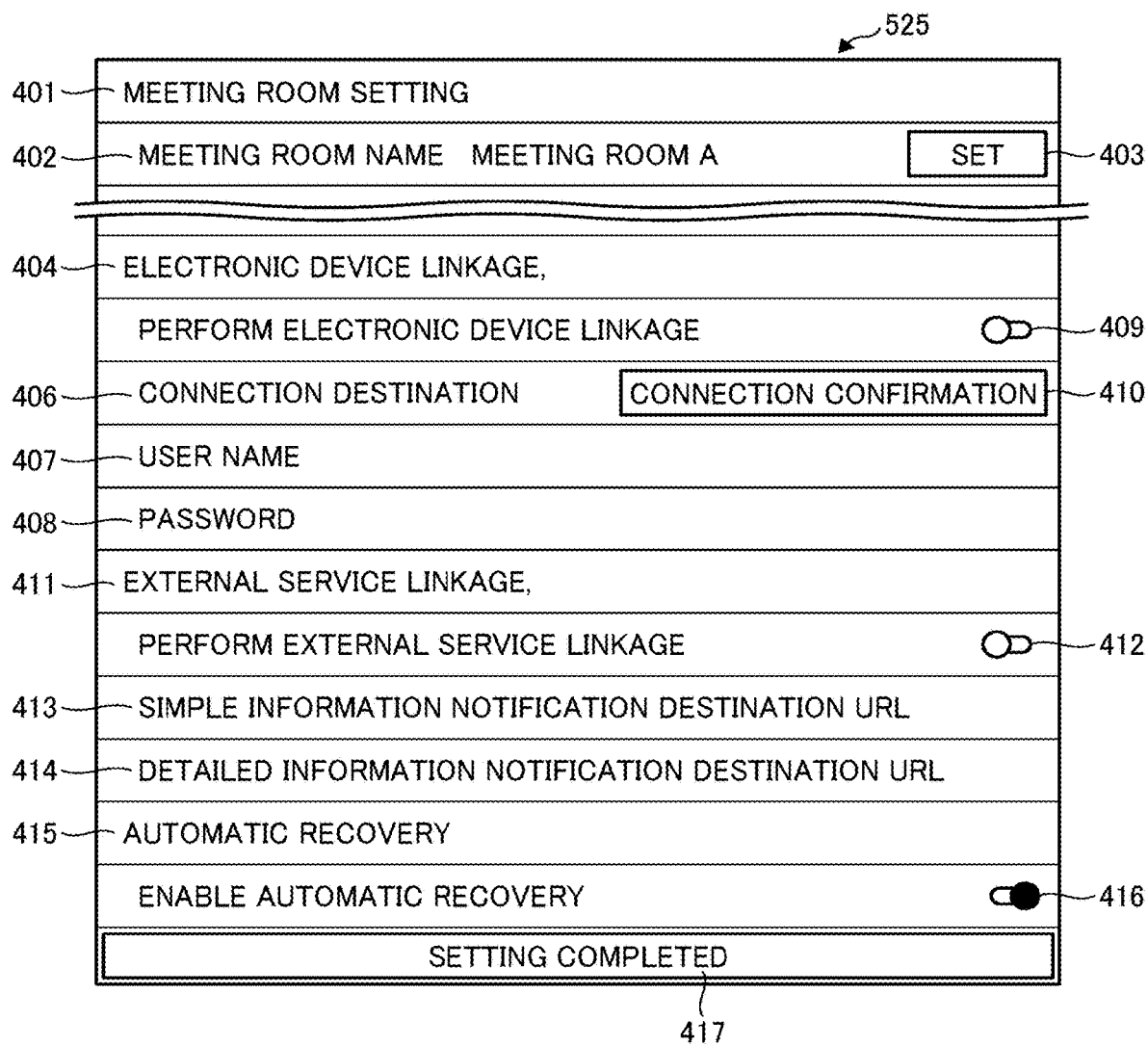
FIG. 13 is a diagram illustrating an example of a setting screen of the meeting room terminal displayed in the screen (f) of FIG. 11 after the image code is read, according to an embodiment of the present disclosure.

FIG. 13 illustrates a meeting room terminal setting screen 525 displayed in the screen (f) illustrated in FIG. 11 after the image code is read. The meeting room name of "meeting room A" included in the image code is automatically displayed in the meeting room name 402.

<Procedure of Initial Setting>

Figure 14:
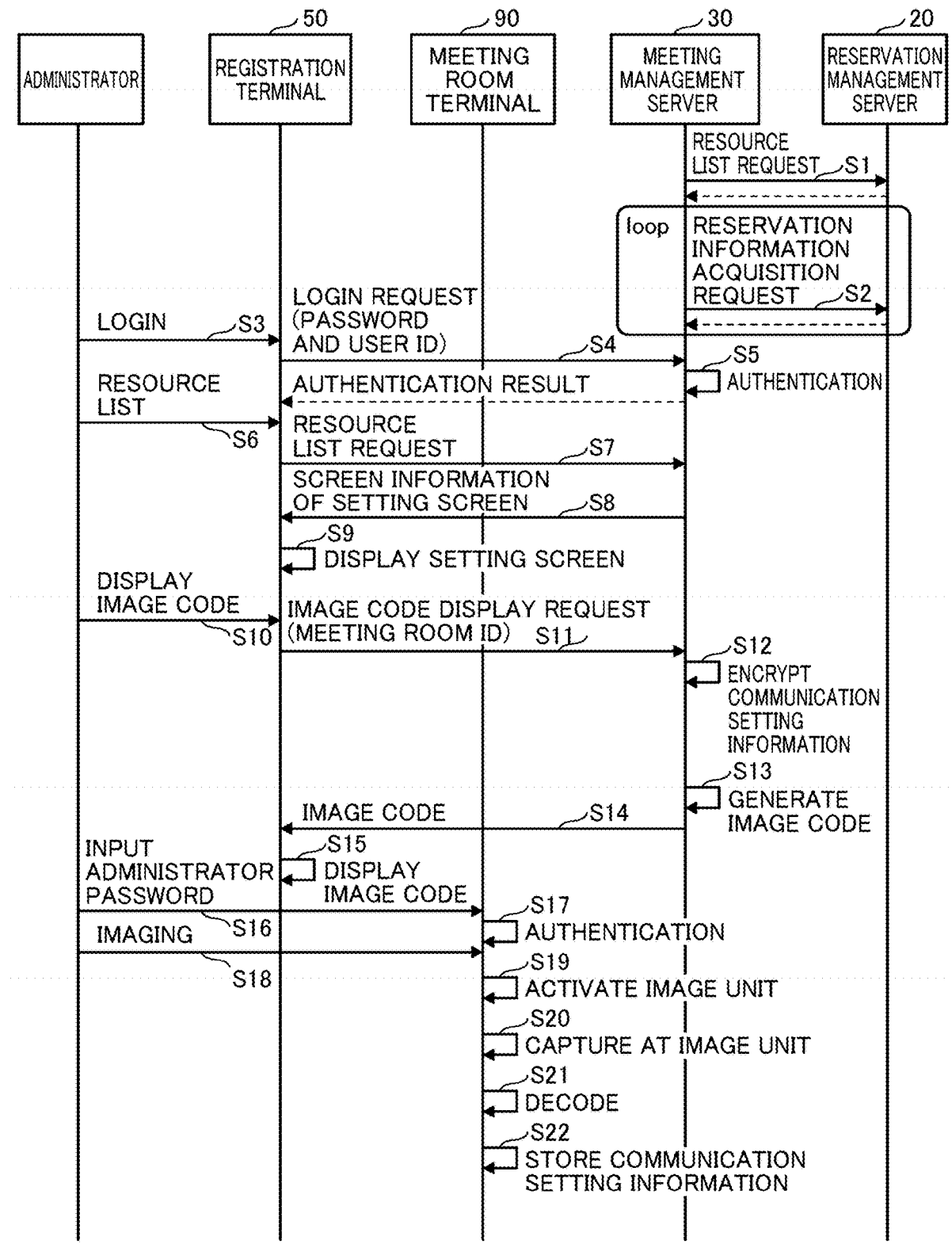
FIG. 14 is a sequence diagram illustrating an example of a procedure of the initial setting of the meeting room terminal in the resource reservation system, according to an embodiment of the present disclosure.

Next, a procedure for the administrator to perform the initial setting of the meeting room terminal 90 with reference to FIG. 14 will be described. FIG. 14 is a sequence diagram for explaining an example of the procedure of the initial setting of the meeting room terminal 90 in the resource reservation system 100. It is assumed that the terminal application is installed in the meeting room terminal 90. It is also assumed that the registration terminal 50 displays a login screen for logging in to the meeting management server 30.

S1: The reservation information acquisition unit 33 of the meeting management server 30 transmits a resource list request to the reservation management server at a predetermined frequency. The resource list request refers to requesting a list of resources of a customer registered in the reservation management server. The resource reservation system 100 handles a meeting rooms as a resource. Therefore, the meeting management server 30 can acquire a list of meeting rooms displayed on the setting screen 501 by the resource list request. The predetermined frequency may be relatively low, for example, once a day. The resources include the electronic device 70 in addition to the meeting room.

S2: The reservation information acquisition unit 33 of the meeting management server 30 repeatedly transmits a reservation information acquisition request to the reservation management server. The reservation information acquisition request refers to requesting reservation information of a reservation person who designates a domain and has the domain in an account. As a result, the meeting management server 30 can acquire reservation information for a predetermined period. The repetition frequency is preferably relatively high, such as every few minutes, every thirty minutes, or every hour. Regarding the reservation information, there may be a case where the reservation information newly registered or changed is automatically transmitted from the reservation management server 20.

S3: On the other hand, the administrator performs a login operation to the registration terminal 50. Specifically, the administrator inputs the login password and the user ID. The operation reception unit 52 of the registration terminal 50 accepts the login operation.

S4: The communication unit 51 of the registration terminal 50 transmits a login request (the login password and the user ID) to the meeting management server 30. Such a server at the authentication destination server may exist separately from the meeting management server 30.

S5: The authentication unit 40 of the meeting management server 30 performs authentication based on whether the login password and the user ID are registered in the login information DB 499. In the present embodiment, it is assumed that the authentication is successful. The communication unit 31 of the meeting management server 30 transmits the authentication result to the registration terminal 50.

S6: The administrator performs an operation to display a resource list on the registration terminal 50. The display of the resource list is to display the setting screen 501 illustrated in FIG. 9. The operation reception unit 52 of the registration terminal 50 accepts an operation for displaying the resource list. Note that the setting screen 501 may be automatically displayed by the authentication. Further, since the administrator has logged in, the customer ID for the customer for whom the administrator tires to initially set the meeting room terminal 90 is specified.

S7: The communication unit 51 of the registration terminal 50 transmits the resource list request to the meeting management server 30.

S8: The communication unit 31 of the meeting management server 30 receives the resource list request, and the setting screen generation unit 391 acquires the meeting room setting information specified by the customer ID from the meeting room setting information DB 498, and generates the setting screen 501 having a list of customer's meeting rooms (resources). The resources include an electronic device 70 other than the meeting rooms. The communication unit 31 of the meeting management server 30 transmits the screen information of the setting screen 501 to the registration terminal 50.

S9: The communication unit 51 of the registration terminal 50 receives the screen information of the setting screen 501, and the display control unit 53 displays the setting screen 501 as illustrated in FIG. 9.

S10: Next, the administrator designates the meeting room in which the meeting room terminal 90 is registered, and performs an operation for displaying an image code. Specifically, the administrator presses the image code field 507. The operation reception unit 52 of the registration terminal 50 accepts an operation for displaying the image code.

S11: The communication unit 51 of the registration terminal 50 designates the meeting room ID, and transmits an image code display request to the meeting management server 30.

S12: The communication unit 31 of the meeting management server 30 receives the image code display request, and first, the information management unit 395 acquires the communication setting information from the storage unit 49. The information management unit 395 acquires the server URL associated with the customer ID from the login information DB 499. Further, the information management unit 395 acquires the meeting room name and the authentication key associated with the meeting room ID transmitted from the meeting room terminal 90 from the meeting room setting information DB 498. As to the authentication key, the authentication key generation unit 392 may generate the authentication key for the meeting room terminal 90 at this timing. The encryption unit 393 encrypts the communication setting information described above.

S13: Then, the image code generation unit 394 encodes the communication setting information to generate an image code. As described above, the meeting management server 30 provides the communication setting information when the communication setting information is requested.

S14: The communication unit 31 of the meeting management server 30 transmits the image code to the registration terminal 50.

S15: The communication unit 51 of the registration terminal 50 receives the image code, and the display control unit 53 displays the image code on the display 616 as illustrated in FIG. 10.

S16: Next, the administrator presses the registration button 511 on the meeting room terminal 90 to input the administrator password. Specifically, the administrator presses the registration button 511 on the initial screen 510 as illustrated in Screen (a) of FIG. 11, and inputs the administrator password on the password input screen 520 illustrated in Screen (b) of FIG. 11. The operation reception unit 93 of the meeting room terminal 90 accepts these operations.

S17: The terminal authentication unit 96 of the meeting room terminal 90 determines that authentication has succeeded when the administrator password input by the administrator matches the administrator password stored in the storage unit 99, and determines that authentication has failed when the administrator password input by the administrator is not coincident with the administrator password stored in the storage unit 99.

S18: When the authentication is successful, the administrator activates the camera by pressing the setting button 403 on the meeting room terminal setting screen 525, as illustrated in Screen (c) of FIG. 11.

S19: As illustrated in Screen (d) of FIG. 11, the imaging unit 97 of the meeting room terminal 90 is activated.

S20: When the administrator operates or moves the meeting room terminal 90 so that the image code enters the angle of view of the CMOS sensor 605, the imaging unit 97 recognizes the image code and automatically generates image data, as illustrated in Screen (e) of FIG. 11.

S21: The decoding unit 98 decodes the image code captured by the imaging unit 97, and restores the communication setting information. As a result, the meeting room terminal setting screen 525 is displayed again as illustrated in Screen (f) of FIG. 11.

S22: The setting recording unit 98-2 stores the communication setting information in the storage unit 99. Therefore, the meeting room ID, the server URL, the authentication key, and the meeting room name are stored in the storage unit 99 to enable the communication with the meeting management server 30. The reservation information can be acquired depending on the state of the management start flag. As described above, the meeting room terminal 90 automatically starts the communication with the meeting management server 30 by the record of the communication setting information.

<<Reservation Information Acquisition, Cooperation Start, Management Start>>

Figure 15:
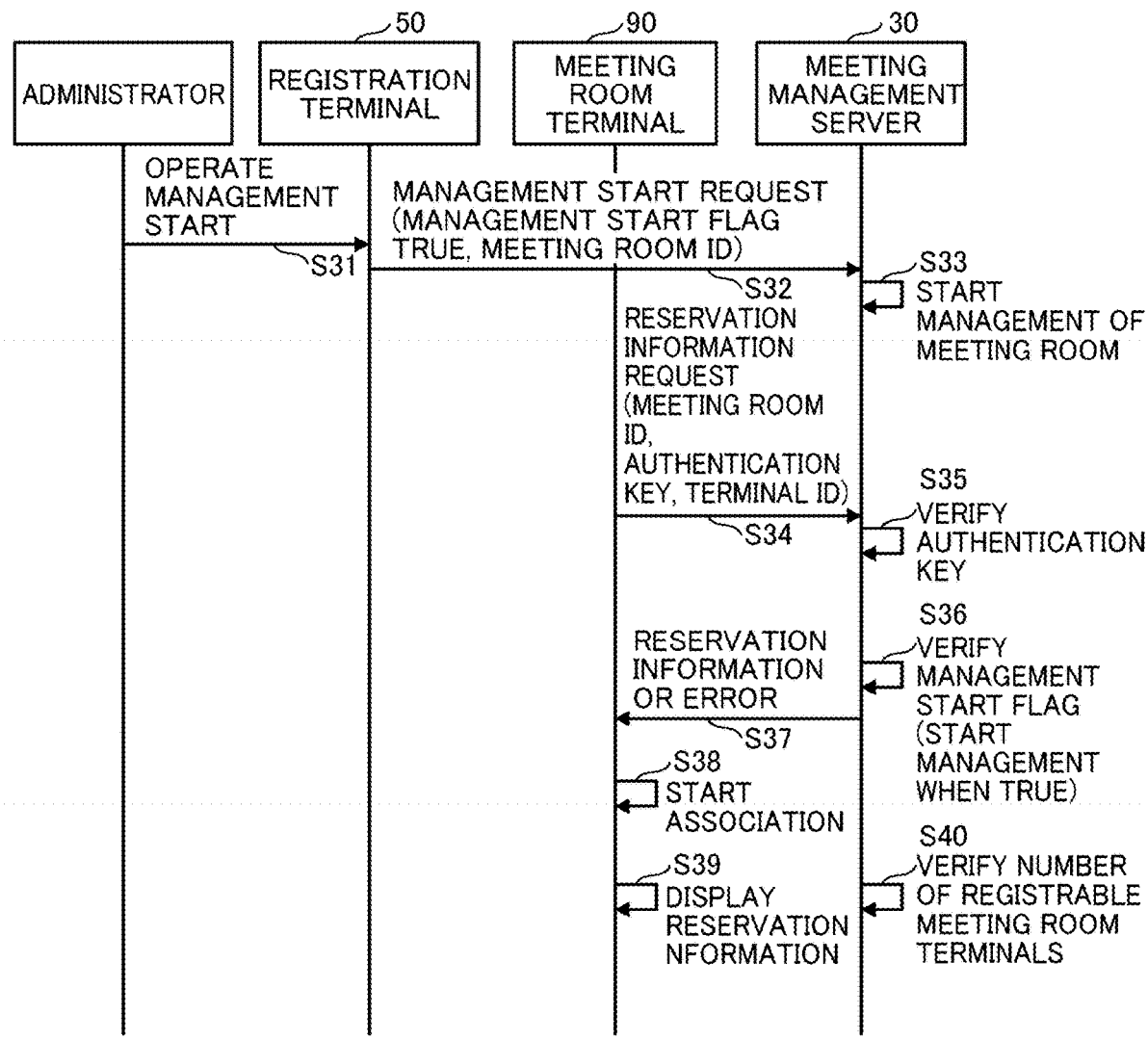
FIG. 15 is an example of a sequence diagram illustrating an operation until the meeting room terminal acquires reservation information, according to an embodiment of the present disclosure.

Next, a process in which the meeting room terminal 90 acquires reservation information will be described with reference to FIG. 15. FIG. 15 is a sequence diagram for explaining an example of an operation until the meeting room terminal 90 acquires the reservation information. It is assumed that the administrator displays the setting screen 501.

S31: The administrator turns on the check mark field 502 in a predetermined meeting room on the setting screen 501. This operation corresponds to an operation for management start (actually, the management is started by the reservation information request). The operation reception unit 52 of the registration terminal 50 accepts this operation.

S32: The communication unit 51 of the registration terminal 50 sets the management start flag to True and designates the meeting room ID to transmit the management start request to the meeting management server 30.

S33: The communication unit 31 of the meeting management server 30 receives the management start request. Accordingly, the information management unit 395 sets the management start flag of the meeting room setting information specified by the meeting room ID to True. As a result, when the reservation information is requested, the meeting management server 30 becomes ready for transmitting the reservation information.

S34: The reservation information request unit 98-3 of the meeting room terminal 90 periodically communicates with the meeting management server 30 via the server communication unit 91. Specifically, the reservation information request unit 98-3 of the meeting room terminal 90 sends a request for the reservation information by specifying the meeting room ID and the authentication key to a destination indicated by the server URL of the storage unit 99 (for example, every thirty seconds). Although transmission of the terminal ID is not essential, the terminal ID can be transmitted in order for the meeting management server 30 to verify the number of registrable meeting room terminals.

The reservation information request unit 98-3 continuously acquires reservation information in any other suitable way than sending the request to the meeting management server 30 at regular intervals. For example, when the meeting room information is changed, the meeting management server 30 sends a notification of the change to the meeting room terminal 90, and the meeting room terminal 90 send the request to the meeting management server 30 only when the notification is sent. The reservation information request unit 98-3 can acquire the request information continuously in any suitably way that allows the meeting room terminal 90 can address acquisition of the change in the reservation information.

S35: The communication unit 31 of the meeting management server 30 receives the reservation information request, and the authentication key verification unit 41 verifies the authentication key. Specifically, the communication unit 31 acquires the authentication key specified by the meeting room ID from the meeting room setting information DB 498 and determines whether the acquired authentication key matches the authentication key transmitted from the meeting room terminal 90. When the two authentication keys coincide with each other, the initial setting unit 39 changes the state of the meeting room terminal in the meeting room setting information DB 498 into "connected".

S36: When the two authentication keys coincide with each other, the management control unit 42 checks whether the management start flag is True and whether the acquisition of the reservation information is requested. Specifically, the management control unit 42 acquires the management start flag specified by the meeting room ID from the meeting room setting information DB 498 and determines whether it is True. When the meeting room terminal 90 requests the reservation information to the meeting management server 30 even once (and the authentication key matches), and the management start flag is True, the management control unit 42 starts an operation for meeting room management. Therefore, the reservation information transmission unit 44 of the meeting management server 30 transmits the reservation information. When the check-in is not detected, the reservation of the meeting room is automatically canceled.

When the authentication key matches, but the management start flag is False, the management control unit 42 does not start the meeting room management. The reservation information transmission unit 44 does not transmit the reservation information. However, even when the meeting room management is not started, the reservation information request unit 98-3 of the meeting room terminal 90 continues the reservation information request. This is because it is difficult to access the meeting room terminal 90 from the external network, and therefore it is not possible to notify that the management start flag has become True, and it is preferable to perform communication from the meeting room terminal 90.

S37: The reservation information transmission unit 44 of the meeting management server 30 transmits the reservation information or an error (the authentication key is not coincident, or the management start flag is false) to the meeting room terminal 90 via the communication unit 31. When the authentication key is confirmed, and the management start flag is True, the reservation information is transmitted.

S38: The server communication unit 91 of the meeting room terminal 90 receives the reservation information or the error. When the reservation information is transmitted, the meeting room terminal 90 starts cooperation with the meeting management server 30. When the authentication key cannot be confirmed or when the management start flag is FALSE, the error is transmitted. In this case, the cooperation is not started.

When both the management start flag is set to True and the acquisition request of the reservation information is detected, the management is started, and the cooperation is started. Therefore, the management and the cooperation can be started after the meeting room terminal 90 having been initially set is placed in the meeting room. If the reservation information acquisition request is only detected, the inconvenience of automatic cancellation as described above occurs. If the management start flag is only set to True, there may be a problem that automatic cancellation is performed when the initial setting of the meeting room terminal 90 is not completed.

S39: When the reservation information request unit 98-3 of the meeting room terminal 90 acquires the reservation information, the display control unit 94 displays the reservation information. When the error is received, the display control unit 94 displays, for example, the fact that the reservation information cannot be displayed, and the reason why the reservation information cannot be displayed.

S40: Since the terminal ID is transmitted together with the authentication information request, the terminal ID verification unit 43 of the meeting management server 30 can determine whether the number of terminal IDs exceeds the number of registrable meeting room terminals. This process will be described in detail with reference to FIG. 19.

<Example of Reservation Information Displayed by Meeting Room Terminal>

Figure 16:
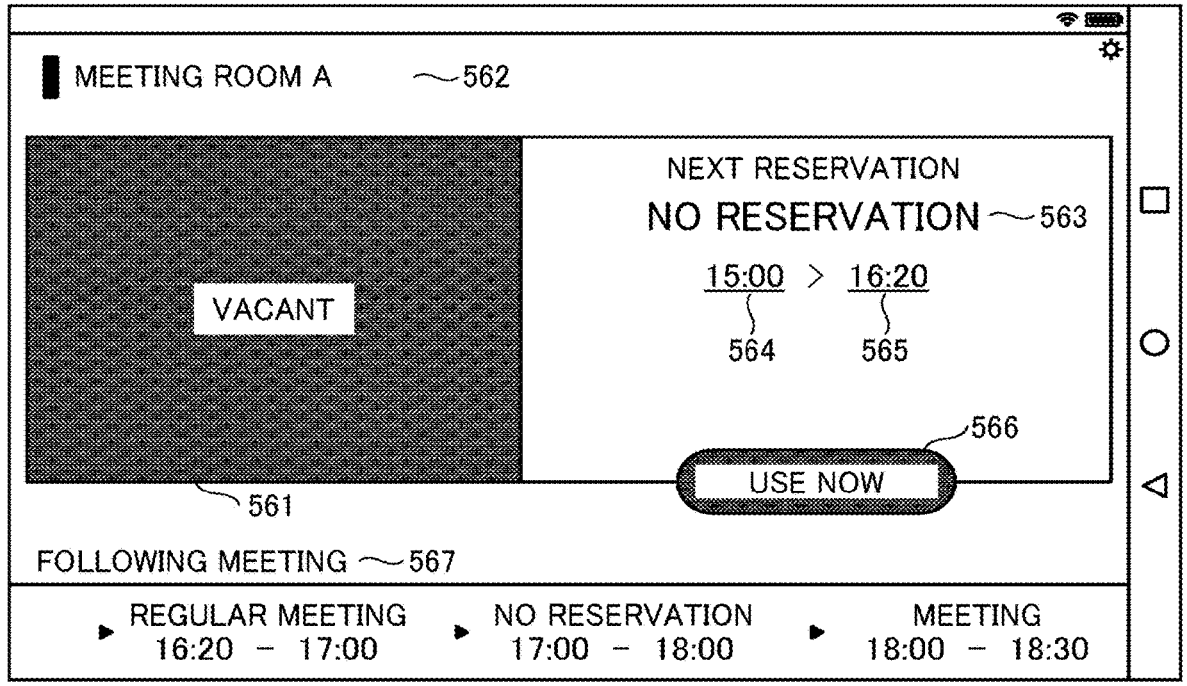
FIG. 16 is a diagram illustrating an example of a standby screen I displayed on a meeting room terminal when the meeting room is vacant, according to an embodiment of the present disclosure.

The reservation information displayed by the meeting room terminal 90 will be described with reference to FIGS. 16 to 18. FIG. 16 illustrates an example of a standby screen I displayed by the meeting room terminal 90 when the meeting room is currently vacant. The standby screen I in FIG. 16 displays a current status field 561, a meeting room name field 562, a meeting name field 563, a start time field 564, an end time field 565, a use start button 566, a subsequent reservation field 567, and the like.

The current status field 561 indicates the current status of the meeting room. The display control unit 94 of the meeting room terminal 90 displays the status of the reservation information in the current status field 561. When there is no reservation information at the current time, the display control unit 94 displays "vacant" (until check-in of the next reservation is permitted) or "waiting for entry" (after check-in of the next reservation becomes possible) in the current status field 561.

The meeting room name stored in the storage unit 99 is displayed in the meeting room name field 562. The meeting name included in the reservation information is displayed in the meeting name field 563. Until the next reservation is permitted to be checked, the display control unit 94 displays "No reservation" in the meeting name field 563.

The start time and the end time included in the reservation information are displayed in the start time field 564 and the end time field 565, respectively. FIG. 16 displays the start time of the next meeting from the end time of the last meeting in the start time field 564 and the end time field 565 because the figure illustrates the standby screen during the time when there is no reservation.

The subsequent reservation field 567 displays the start time and end time of each meeting reserved after the current time in accordance with the reservation information. The use start button 566 is displayed when the current status field 561 is "vacant". Even if the meeting room is not reserved, the user can start using the meeting room by pressing the use start button 566. The pressing of this button is transmitted to the meeting management server 30 and the reservation management server 20, and the status of the meeting room in the reservation information is changed. The status change is also reflected on the standby screen by receiving the reservation information by the meeting room terminal 90.

Figure 17:
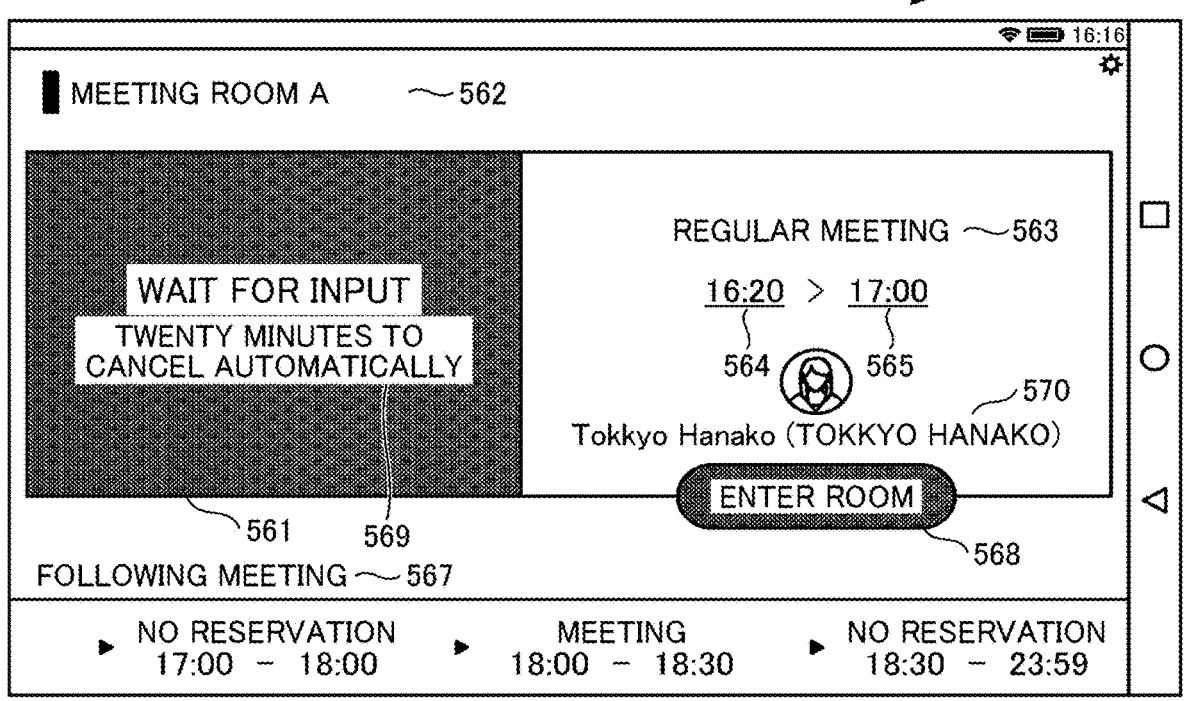
FIG. 17 is a diagram illustrating an example of a standby screen II displayed on a meeting room terminal when the meeting room is currently vacant and the current time is equal to or less than a predetermined time before the start time of the next meeting, according to an embodiment of the present disclosure.

FIG. 17 illustrates an example of a standby screen II displayed on the meeting room terminal 90 when the meeting room is vacant currently and the current time is equal to or less than a predetermined time before the start time of the next meeting. The standby screen II in FIG. 17 displays "waiting for entry" in the current status field 561, and an entry button 568. The reservation person name field 570 displays the reservation person. When the status of the reservation information is changed to "check-in possible" or the like, the display control unit 94 displays "waiting for entry", and displays the entry button 568.

For example, when ten minutes before the start time, the status changes to "check-in possible" or the like, and the display control unit 94 displays "waiting for entry" and permits check-in. That is, the reservation person can check in. If the meeting room terminal 90 does not transmit a check-in request by a predetermined time, the check-in management unit 38 of the meeting management server 30 determines that "check-in is not detected" and automatically cancels the reservation. Therefore, the display control unit 94 counts down the time 569 until the automatic cancellation is performed, and displays the countdown in the current status field 561. The time to be cancelled automatically is, for example, ten minutes after the start time.

The entry button 568 is a button for the user to check-in. When the button is pressed, the reservation person can input the meeting identification information. The reservation person information is displayed in the reservation person name field 570. The reservation person may be the account included in the reservation information, or the name or the nickname of the reservation person may be transmitted from the meeting management server 30. In addition, a picture of the reservation person and a character representing the reservation person may be displayed.

Figure 18:
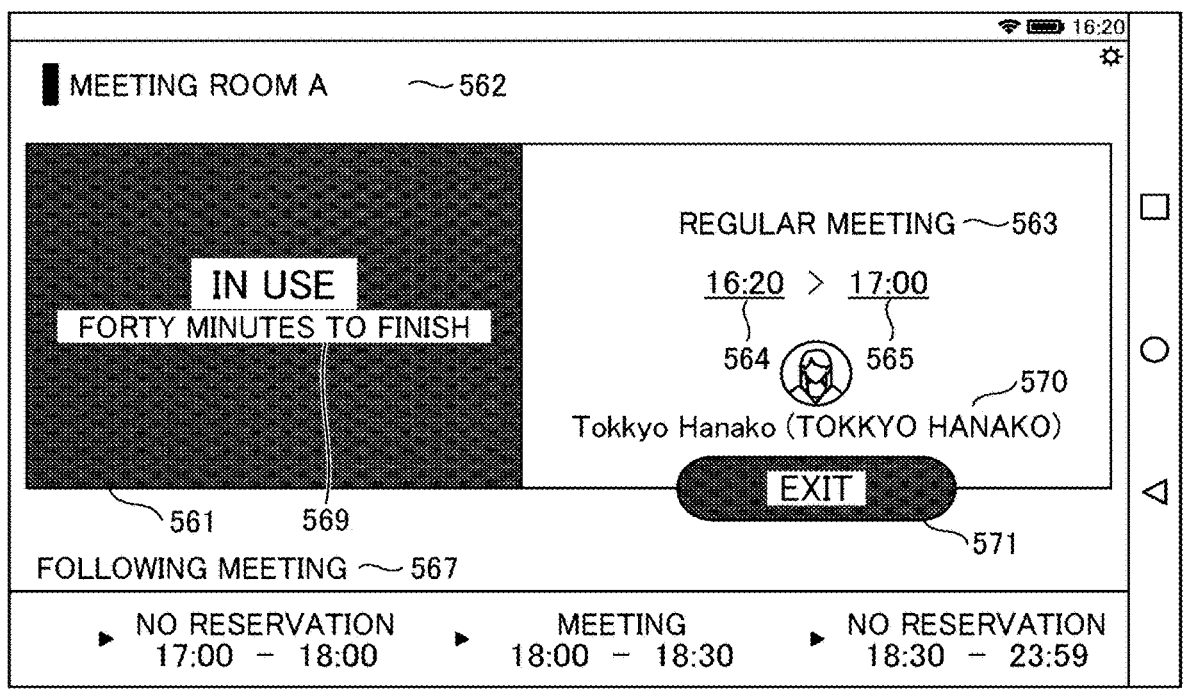
FIG. 18 is a diagram illustrating an example of a standby screen III displayed on a meeting room terminal when the meeting room is currently in use, according to an embodiment of the present disclosure.

FIG. 18 illustrates an example of a standby screen 111 displayed by the meeting room terminal 90 when the meeting room is currently in use. The standby screen III in FIG. 18, displays "in use" in the current status field 561, and an exit button 571. When the reservation person checks in, the status of the meeting management information DB 493 becomes "checked-in". When the meeting room terminal 90 receives the reservation information, the display control unit 94 detects that the status becomes "checked-in". The display control unit 94 displays "in-use" in the current status field 561 until the check-out is performed, and displays the exit button 571. Further, the display control unit 94 counts down the time until the end time, and displays the countdown in the current status field 561. The exit button 571 is a button for the reservation person to check out. When the button is pressed, the check-out request is transmitted to the meeting management server 30, and the check-in management unit 38 of the meeting management server 30 updates the status of the meeting management information DB 493 to "checked-out". When the meeting room terminal 90 receives the reservation information, the display control unit 94 displays "vacant" or "waiting for entry" in the current status field 561.

Note that the meeting room terminal 90 may display the information displayed in FIGS. 16 to 18 by generating with the meeting management server 30, instead of generating based on the reservation information with the meeting room terminal 90. In this case, the meeting room terminal 90 executes the browser software, thereby enabling the meeting management server 30 to control over the entire standby screen of the meeting room terminal 90.

<Verification of Number of Registrable Meeting Room Terminals>

Figure 19:
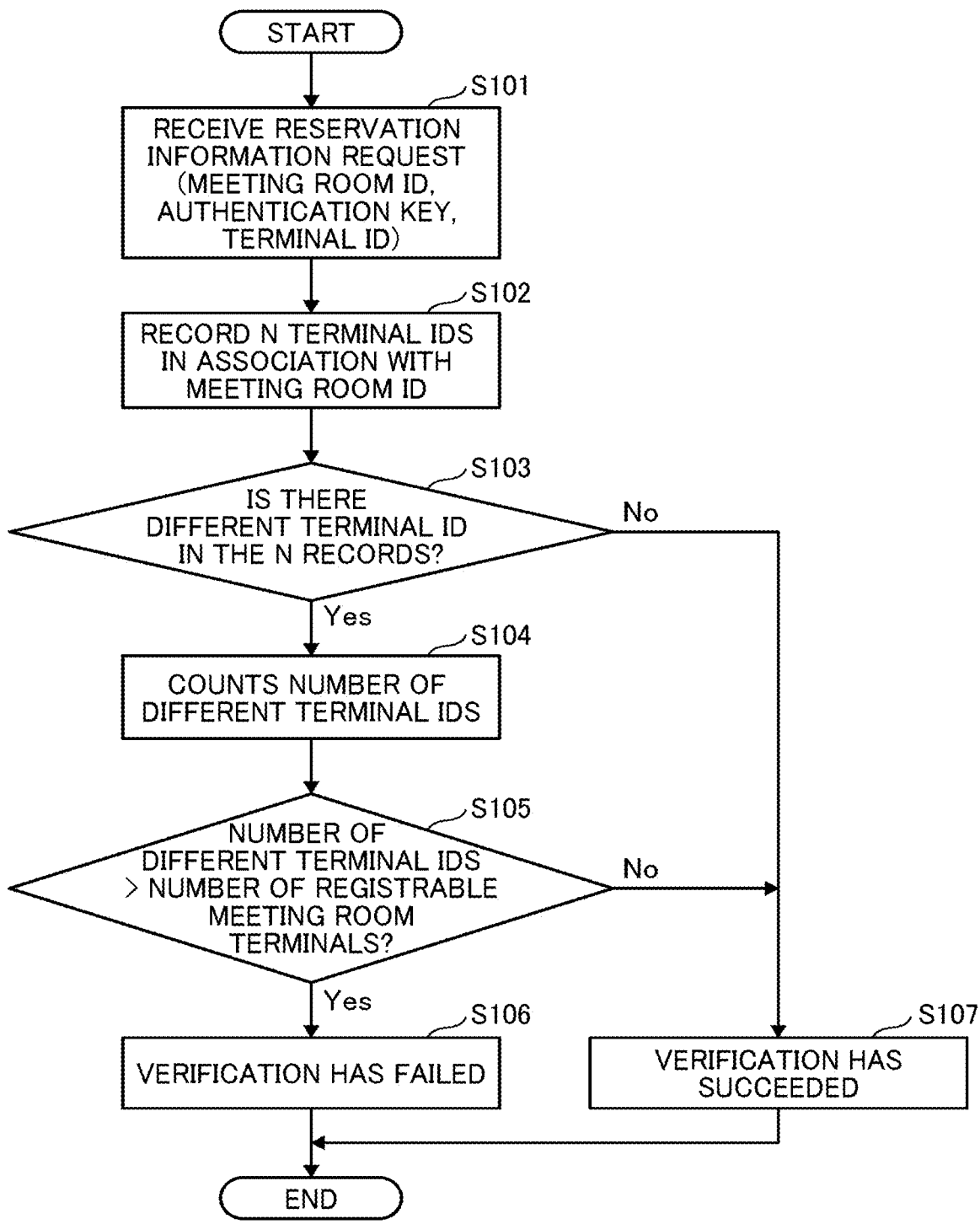
FIG. 19 is a flowchart illustrating an example of an operation performed by a terminal ID verification unit of the meeting management server of determining whether the number of terminal IDs exceeds the number of registerable meeting room terminals, according to an embodiment of the present disclosure.

FIG. 19 is a flowchart illustrating an example of an operation performed by the terminal ID verification unit 43 of the meeting management server 30 of determining whether the number of terminal IDs exceeds the number of registerable meeting room terminals. FIG. 20 illustrates a record example of the terminal ID of past ten times. As described in FIG. 10, the communication unit 31 of the meeting management server 30 receives the reservation information request (the meeting room ID, the authentication key, the terminal ID) (S101).

The terminal ID verification unit 43 records N terminal IDs in association with the meeting room ID (S102). Specifically, the terminal ID verification unit 43 records N terminal IDs in the order of reception. The terminal IDs older than N may be discarded.

The terminal ID verification unit 43 determines whether there are different terminal IDs in the N records (S103). If the determination in step S103 is No, the reservation information is requested from only one meeting room terminal 90 for one meeting room, so that the verification is determined to be successful (S107). In this case, nothing is to do particularly.

When the determination in step S103 is Yes, the terminal ID verification unit 43 counts the number of different terminal IDs in the N terminal IDs (S104). Since the meeting room terminal 90 periodically transmits the reservation information request, the terminal ID verification unit 43 counts so as not to overlap with each other. In the example of FIG. 20, since there are seven T-001s and three T-002s, the number of terminal IDs is two.

The terminal ID verification unit 43 determines whether the number of different terminal IDs is larger than the number of registrable meeting room terminals (S105). Specifically, the terminal ID verification unit 43 acquires the number of registerable meeting room terminals associated with the meeting room ID from the meeting room setting information DB 498 and compares with the number of different terminal IDs. If the determination in step S105 is No, it is determined that the verification is successful (S107).

If the determination in step S105 is Yes, the terminal ID verification unit 43 determines that verification has failed (S106). For example, an e-mail indicating that the meeting room terminals 90 are registered exceeding the number of registerable meeting room terminals may be transmitted to the administrator. Alternatively, the terminal ID verification unit 43 may display an alert on the setting screen 501 in association with the meeting room. In this way, it is possible to suppress a situation where many meeting room terminals 90 are registered and the contents of the reservation information are likely to leak.

In the method as illustrated in FIG. 19, the number of registrable meeting room terminals cannot be verified when the meeting room terminal 90 is initially set. However, the initial setting work can be facilitated. Also, the number of registrable meeting room terminals at the time of initial setting may be verified. In this case, the meeting room terminal 90 may transmit the terminal ID to the meeting management server 30 at the time of initial setting on the assumption that the terminal ID is recorded in the same fashion. Alternatively, there is a method in which the terminal ID registered for each meeting room is registered in the meeting room setting information DB 498.

As described above, in the resource reservation system 100 of the present embodiment, the customer can use his/her information processing terminal as the meeting room terminal 90. The customer can easily perform the initial setting by using the image code. Since the meeting room terminal 90 automatically downloads the reservation information by the initial setting, the meeting room terminal 90 can start the cooperation with the meeting management server 30. For example, the meeting room terminal 90 can display the reservation information, and the user of the customer can check-in from the meeting room terminal 90.

Second Embodiment

In the first embodiment, the administrator K initially sets the meeting room terminals 90 one by one, but in the present embodiment, a resource reservation system that can initially set a plurality of meeting room terminals 90 at a time will be described.

Figure 21:
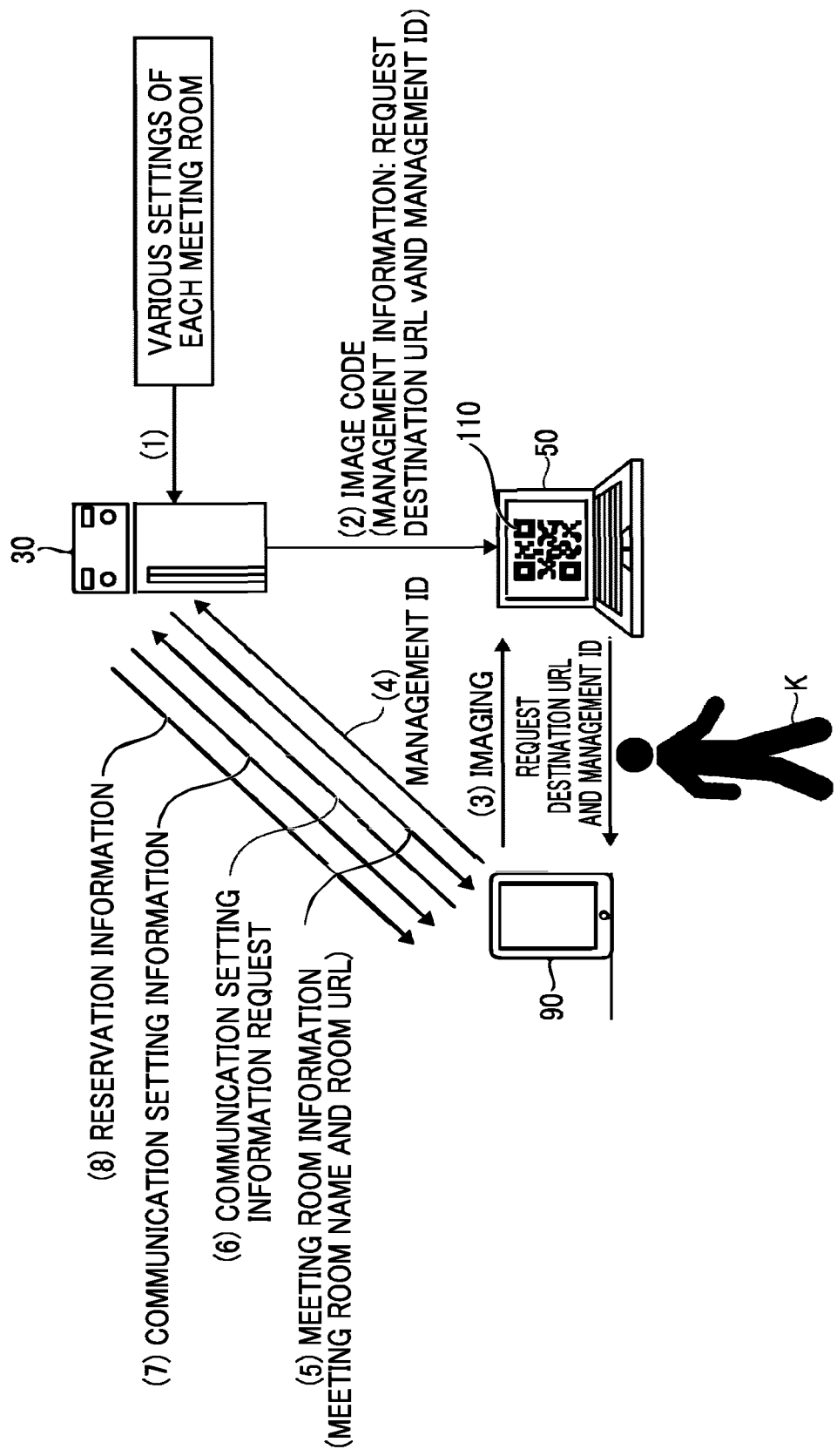
FIG. 21 is a diagram for explaining an example of an outline of initial setting of the meeting room terminal using the image code, according to an embodiment of the present disclosure.

FIG. 21 is a diagram for explaining an example of an outline of the initial setting of the meeting room terminal 90 using the image code.

(1) A provider providing the resource reservation system 100 performs various settings related to the meeting room of the customer in advance on the meeting management server 30. The customer is a company or the like that introduces the resource reservation system 100. The settings of the meeting room name, the meeting room ID, the URL of the meeting management server 30, and the like are included in the various settings. The meeting management server 30 has reservation information for each meeting room, synchronized with the reservation management server 20.

(2) In order to use the information processing terminal as the meeting room terminal 90, the administrator K performs initial setting to the information processing terminal. The initial setting may include a number of operations, such as at least allowing the meeting room terminal 90 to communicate with the meeting management server 30. Since the communication is preferably performed by designating a meeting room, the initial setting includes registration of the meeting room terminal 90 in the meeting management server 30 in association with the meeting room at the placement destination. The administrator K who performs the initial setting may be a person in charge on the provider side or a system person in charge on the customer side.

The administrator K logs into the meeting management server 30 using the registration terminal 50, and starts communication. The place where the administrator K works may be a place where the administrator K can communicate with the meeting management server 30. Therefore, the administrator K can work any other place than the meeting room. The administrator displays the setting screen of the administrator who performs the various settings. The administrator designates the meeting room in which the meeting room terminal 90 is registered, and the administrator requests the meeting management server 30 for the management information (the request destination URL and the management ID). As a result, the registration terminal 50 receives the management information encoded in the image code. In the present embodiment, the administrator K can select a plurality of meeting rooms, and the plurality of meeting rooms may be associated with the management information.

(3) The administrator K images the image code 110 displayed on the registration terminal 50 with the meeting room terminal 90. The terminal application is installed in the meeting room terminal 90. The meeting room terminal 90 decodes the image code and acquires the management ID and the request destination URL (an example of connection information) associated with one or more meeting rooms selected on the setting screen.

(4) The meeting room terminal 90 transmits the management ID to the meeting management server 30 with the request destination URL as a destination.

(5) Thus, the meeting management server 30 transmits the meeting room information (the meeting room name and the room URL) of one or more meeting rooms associated with the management ID to the meeting room terminal 90. The room URL is a URL that provides communication setting information for each meeting room, and is prepared for each meeting room.

(6) The meeting room terminal 90 requests the meeting management server 30 for the communication setting information with the room URL as a destination.

(7) The meeting management server 30 transmits the communication setting information of the meeting room specified by the room URL to the meeting room terminal 90. The communication setting information is stored in the meeting room terminal 90, and the meeting room terminal 90 is allowed to communicate with the meeting management server 30. That is, the meeting room terminal 90 is associated with the meeting room at the placement destination.

(8) The meeting room terminal 90 starts to periodically acquire the reservation information from the meeting management server 30 using the communication setting information. The meeting management server 30 repeats acquisition of the reservation information without involvement of the state. Since the meeting room terminal 90 transmits the meeting room ID set by the communication setting information, the meeting management server 30 transmits the reservation information associated with the meeting room ID to the meeting room terminal 90. The meeting room terminal 90 displays the reservation information.

The second and subsequent meeting room terminals 90 also perform the processes (3) to (8). The meeting management server 30 transmits the communication setting information of one or more meeting rooms associated with the management ID to the meeting room terminal 90 so as not to overlap with each other. Since the meeting management server 30 controls the transmission of the communication setting information to each meeting room terminal 90, the initial setting of the plurality of meeting room terminals 90 can be performed in parallel.

Thus, in the resource reservation system 100 of the present embodiment, the customer can use his/her information processing terminal as the meeting room terminal 90. Further, the customer can easily perform the initial setting by using the image code. Further, since the meeting room terminal 90 automatically downloads the reservation information by the initial setting, the meeting room terminal 90 can start the cooperation with the meeting management server 30. For example, the meeting room terminal 90 can display the reservation information of the meeting room, and the user of the customer can check-in from the meeting room terminal 90. Further, when the initial setting of the plurality of meeting room terminals 90 is performed, the work efficiency can be improved.

Note that the system configuration example of FIG. 3, the hardware configuration examples of FIGS. 4 and 5, and the functional block diagram of FIG. 6 are also referred to in the present embodiment.

<Function of Terminal Apparatus and Meeting Room Terminal>

Figure 22:
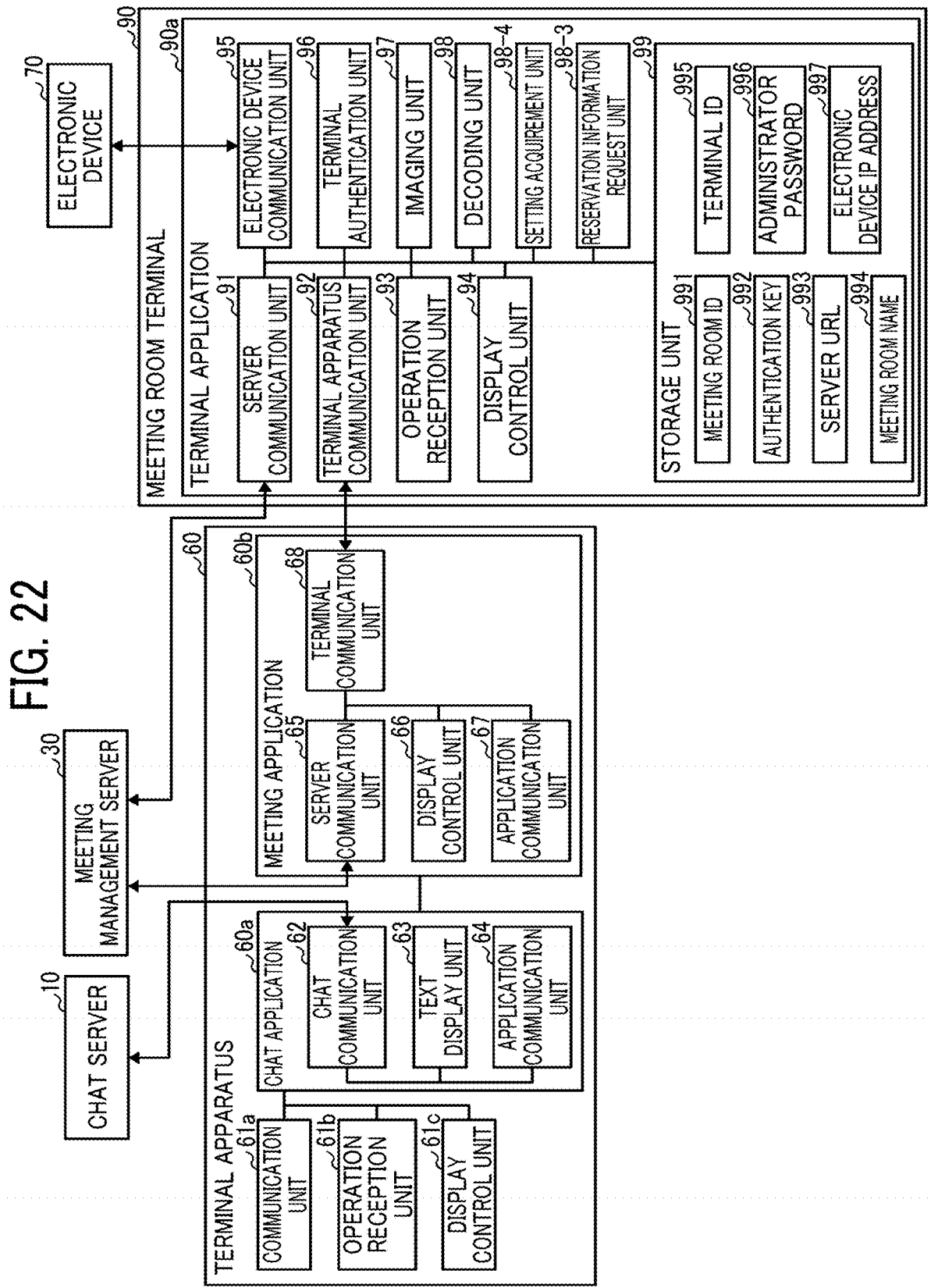
FIG. 22 is a block diagram illustrating an example of a functional configuration of the terminal apparatus and the meeting room terminal, according to an embodiment of the present disclosure.

FIG. 22 is a block diagram illustrating an example of a functional configurations of the terminal apparatus and the meeting room terminal according to the present embodiment. In the present embodiment, the components denoted by the same reference numerals in FIG. 7 perform the same functions, and therefore, only the main components of the present embodiment may be mainly described.

The meeting room terminal 90 of the present embodiment includes a setting acquisition unit 98-4. The setting acquisition unit 98-4 acquires the meeting management information and the communication setting information based on the management information, and stores the communication setting information (the meeting room ID, the authentication key, the server URL, and meeting room name) in the storage unit 99.

<Regarding Initial Setting Unit of Meeting Management Server 30>

Figure 23:
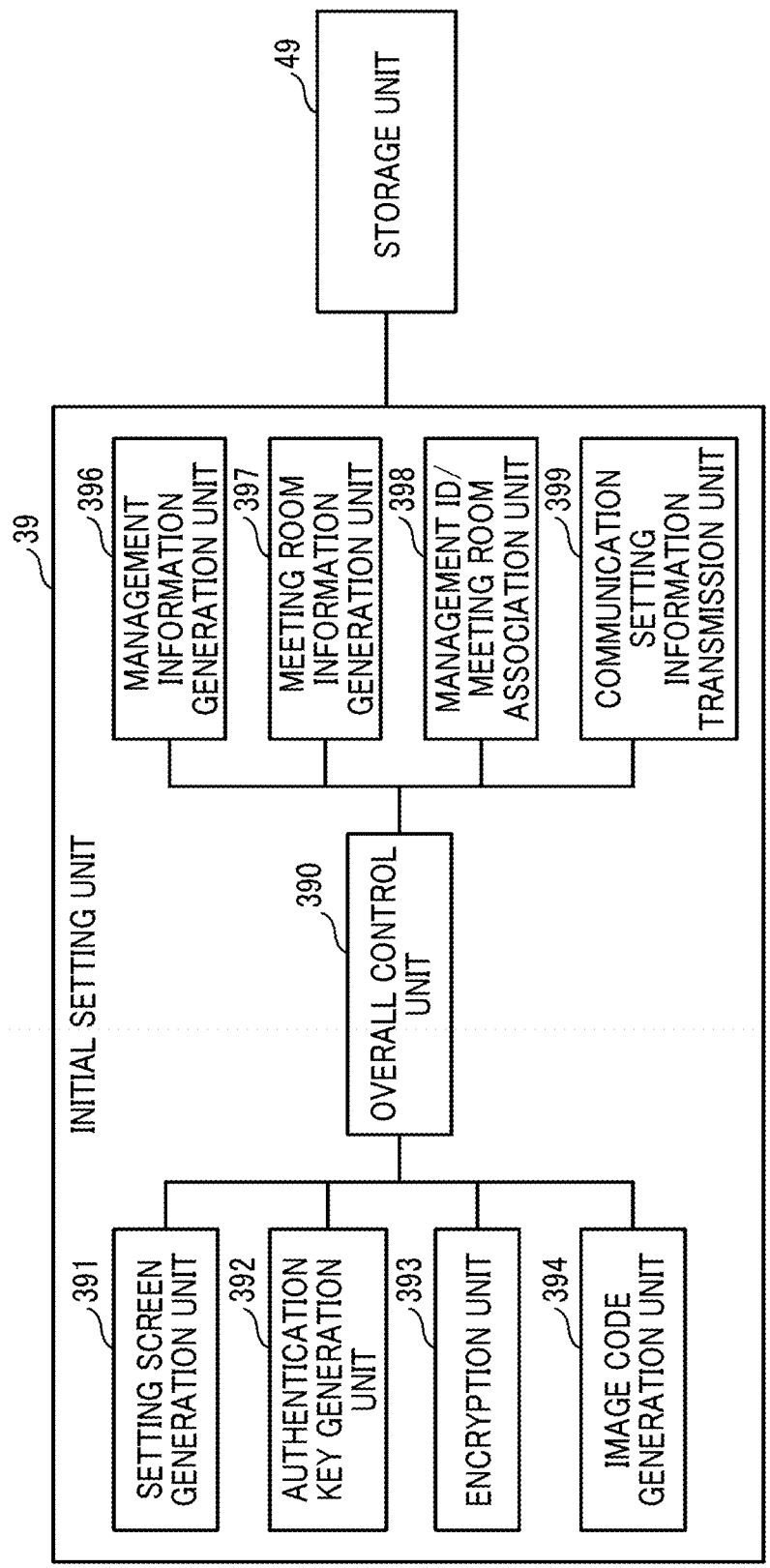
FIG. 23 is a block diagram illustrating an example of a functional configuration of the initial setting unit, according to an embodiment of the present disclosure.

FIG. 23 is a block diagram illustrating an example of a functional configuration of the initial setting unit 39. The initial setting unit 39 includes the setting screen generation unit 391, the authentication key generation unit 392, the encryption unit 393, the image code generation unit 394, an overall control unit 390, a management information generation unit 396, a meeting room information generation unit 397, a management ID/meeting room association unit 398, and a communication setting information transmission unit 399. The storage unit 49 is the same as that illustrated in FIG. 6.

The overall control unit 390 controls the entire initial setting unit 39 to control a series of processes related to the initial setting of the one or more meeting room terminals 90.

The setting screen generation unit 391 generates screen information of the setting screen, and transmits the screen information to the registration terminal 50 via the communication unit 31. The screen information is created by HTML, CSS (Cascade Style Sheet), JavaScript (registered trademark), or the like. The setting screen is provided as one screen of a Web application that runs on a browser by JavaScript (registered trademark).

When the registration terminal 50 requests the image code for the initial setting of the meeting room terminal 90 located in one or more meeting rooms, the management information generation unit 396 creates the management information (the management ID and the request destination URL) to manage the processing related to the initial setting. The image code generation unit 394 encodes the management information into an image code.

The meeting room information generation unit 397 creates the meeting room information (the meeting room name and the room URL) in association with the meeting room name and the room URL of the meeting to be initialized. The communication setting information unique to the meeting room is specified by the room URL.

The management ID/meeting room association unit 398 creates server holding information in which the management ID and one or more meeting room information are associated with each other. The management ID/meeting room association unit 398 manages which meeting room (meeting room terminal 90) has been initially set up, and which meeting room (meeting room terminal 90) has not been initially set up, among the one or more meeting rooms.

The authentication key generation unit 392 generates an authentication key for the meeting room terminal 90 to be authenticated by the meeting management server 30. The encryption unit 393 encrypts the communication setting information acquired from the storage unit 49. In short, the communication setting information is information necessary for the meeting room terminal 90 to communicate with the meeting management server 30. The server URL is information for specifying the communication destination, and the authentication key is information for authentication, and the meeting room ID is information for notifying which meeting room the communication is from. Since the meeting room name is information that the meeting room terminal 90 displays, there is no problem even if the meeting room name is not included in the communication setting information.

The communication setting information transmission unit 399 transmits the encrypted communication setting information to the meeting room terminal 90 via the transmission unit 31*a*.

<Regarding Setting Screen>

FIG. 24 illustrates an example of the setting screen 501 displayed on the registration terminal 50. Note that, in the description of FIG. 24, differences from FIG. 9 of the first embodiment will be mainly described.

The setting screen 501 of the present embodiment includes an image code generation button 509. When the administrator presses the image code generation button 509, the operation reception unit 52 of the registration terminal 50 accepts the press, and the registration terminal 50 designates the meeting room ID and requests the meeting management server 30 for an image code. Based on this, the communication unit 51 can receive an image code containing the management information. The administrator may select one or more meeting rooms to request to generate an image code.

FIG. 25 illustrates a setting screen 501 displayed with the image code superimposed. As illustrated in FIG. 25, the display control unit 53 of the registration terminal 50 pops up the image code 110 on the setting screen 501. The meeting room name and the meeting room ID may be displayed together with the image code 110. As a result, the administrator can grasp which meeting room the image code is for the initial setting.

The image code 110 may be displayed as another Web page instead of the pop-up display, or may be downloaded as a single file. The administrator captures the image code with the meeting room terminal 90 to be initially set.

In the first embodiment, the communication setting information is encoded in the image code 110. However, the present embodiment is different from the first embodiment in that management information is encoded in the image code 110.

<Management Information, Server Holding Information>

Next, the management information will be described with reference to FIG. 26. FIG. 26 is a diagram illustrating an example of management information. The management information includes the request destination URL and the management ID. The request destination URL is a URL (connection destination URL) to which the setting acquisition unit 98-4 of the meeting room terminal 90 first connects in the initial setting of the meeting room terminal 90. By transmitting the management ID to this request destination URL for connection, the initial setting unit 39 in the meeting management server 30 performs the initial setting of each meeting room designated by the administrator on the setting screen 501. The management ID is identification information for specifying or identifying one or more meeting rooms (resources) selected on the setting screen (information for managing resources). The initial setting unit 39 of the meeting management server 30 determines one or more meeting rooms selected on the setting screen 501 by the management ID, and determines which meeting room information of the meeting room should be returned.

Note that the management information format (form) is sufficient if attributes and values (Key and value) are recorded in association with each other, and the management information can be read in a format such as json or xml.

FIG. 27 is a diagram illustrating an example of the server holding information. The server holding information is information created by the initial setting unit 39 (mainly the management ID/meeting room association unit 398) in the meeting management server 30 when the management information is created, and is used by the overall control unit 390 to control a series of the initial settings of a plurality of meeting rooms.

The server holding information includes a result URL 1502, a number of the meeting rooms 1503, a finished number i 1504, and meeting room information 1505 of the number of meeting rooms, which are associated with a management ID 1501. The management ID 1501 is associated with the management information.

The result URL 1502 is a URL for transmitting the result of the initial setting in the meeting room terminal 90.

The number of meeting rooms 1503 is the number of meeting rooms selected by the administrator on the setting screen 501.

The finished number i 1504 is the number of meeting room terminals 90 (meeting rooms) that have notified that the initial setting was successful with the result URL as the destination. That is, the finished number i 1504 indicates how many meeting room terminals 90 have been initialized. The initial value is zero.

The meeting room information 1505 has the meeting room name and the room URL. The meeting room name is displayed on the setting screen 501, and the room URL is a URL for providing the communication setting information associated with the meeting room. FIG. 27 illustrates meeting room information for four meeting rooms. The file name of the room URL (for example, kaigiAxxxx.xxxx) indicates a file in which the communication setting information is compressed or a program for compression processing.

The overall control unit 390 in the meeting management server 30 returns the meeting room information associated with the management ID to the meeting room terminal 90 in response to a request from the meeting room terminal 90 using the server holding information illustrated in FIG. 27. Each of the meeting room terminals 90 can perform a plurality of initial settings with the same single image code.

When the initial setting of all the meeting room terminals 90 is completed, there is no meeting room information to be returned to the server holding information in FIG. 27. Then, the meeting management server 30 transmits to the meeting room terminal 90 that the initial setting has been completed for the meeting room terminals 90 of all meeting rooms set by the administrator.

Note that the meeting room information 1505 may be plural and may be dynamically changed. Therefore, the meeting room information 1505 may have data in a nested manner in place of the parallel structure as illustrated in FIG. 27. The meeting room information 1505 may be accompanied by information other than "meeting room name" and "room URL" as the meeting room information.

<Initial Setting Process>

Next, a procedure for an administrator to perform the initial setting of the meeting room terminal 90 will be described with reference to FIG. 28. FIG. 28 is a sequence diagram for explaining an example of the procedure of the initial setting of the meeting room terminal 90 in the resource reservation system 100. It is assumed that the terminal application is installed in the meeting room terminal 90. It is also assumed that the registration terminal 50 displays the login screen for logging in to the meeting management server 30.

S201: The reservation information acquisition unit 33 of the meeting management server 30 transmits the resource list request to the reservation management server at a predetermined frequency. The resource list request refers to requesting a list of resources of a customer registered in the reservation management server. Since meeting rooms are handled as resources in the resource reservation system 100, the meeting management server 30 can acquire a list of meeting rooms to be displayed on the setting screen 501 by the resource list request. The predetermined frequency may be relatively low such as once a day. The resource includes the electronic device 70 in addition to the meeting room.

S202: The reservation information acquisition unit 33 of the meeting management server 30 repeatedly transmits the reservation information acquisition request to the reservation management server. The reservation information acquisition request refers to requesting reservation information of a reservation person who designates a domain and has the domain in an account. As a result, the meeting management server 30 can acquire reservation information for a predetermined period. The repetition frequency is preferably relatively high, such as every few minutes, every thirty minutes, or every hour. Regarding the reservation information, there may be a case where the reservation information newly registered or changed is automatically transmitted from the reservation management server 20.

S203: On the other hand, the administrator performs a login operation to the registration terminal 50. Specifically, the administrator inputs the login password and the user ID. The operation reception unit 52 of the registration terminal 50 accepts the login operation.

S204: The communication unit 51 of the registration terminal 50 transmits a login request (the login password and the user ID) to the meeting management server 30. Such an authentication destination server may exist separately from the meeting management server 30.

S205: The authentication unit 40 of the meeting management server 30 performs authentication based on whether the login password and the user ID are registered in the login information DB 499. In the present embodiment, it is assumed that the authentication is successful. The communication unit 31 of the meeting management server 30 transmits the authentication result to the registration terminal 50.

S206: The administrator performs an operation to display a resource list on the registration terminal 50. The display of the resource list is to display the setting screen 501 illustrated in FIG. 24. The operation reception unit 52 of the registration terminal 50 accepts an operation for displaying the resource list. Note that the setting screen 501 may be automatically displayed by the authentication. Since the administrator has logged in, the customer ID of the customer for whom the administrator tries to initially set the meeting room terminal 90 is specified.

S207: The communication unit 51 of the registration terminal 50 transmits the resource list request to the meeting management server 30.

S208: The communication unit 31 of the meeting management server 30 receives the resource list request, and the setting screen generation unit 391 acquires the meeting room setting information specified by the customer ID from the meeting room setting information DB 498, and generates the setting screen 501 having a list of customer's meeting rooms (resources). The resources include an electronic device 70 other than the meeting rooms. The communication unit 31 of the meeting management server 30 transmits the screen information of the setting screen 501 to the registration terminal 50.

S209: The communication unit 51 of the registration terminal 50 receives the screen information of the setting screen 501, and the display control unit 53 displays the setting screen 501 as illustrated in FIG. 24.

S210: Next, the administrator designates the meeting room in which the meeting room terminal 90 is registered, and performs an operation for displaying an image code. Specifically, the administrator selects one or more meeting rooms in the image code creation target field 513, and presses the image code generation button 509. The operation reception unit 52 of the registration terminal 50 accepts an operation for displaying an image code.

S211: The communication unit 51 of the registration terminal 50 designates one or more meeting room IDs, and transmits an image code display request to the meeting management server 30.

S212: The communication unit 31 of the meeting management server 30 receives the image code display request, and sends the meeting room ID to the initial setting unit 39. The overall control unit 390 causes the management information generation unit 396 to create management information. As a result, the management information illustrated in FIG. 26 is created. Also, the overall control unit 390 causes the meeting room information generation unit 397 to create meeting room information of each meeting room specified by the meeting room ID. Further, the overall control unit 390 causes the management ID/meeting room association unit 398 to generate server holding information. As a result, the server holding information illustrated in FIG. 27 is created. It should be noted that the management ID, the request destination URL, and the result URL may be created so as not to overlap with each other. The number of meeting rooms is the number of meeting rooms selected on the setting screen 501. The initial value of the finished number i is zero. The meeting room information for each meeting room is a room URL that does not overlap with the meeting room name, but the file name possessed by the room URL indicates a file or file creation process for the communication setting information unique to the meeting room.

S213: Then, the image code generation unit 394 encodes the communication setting information to generate an image code.

S214: The communication unit 31 of the meeting management server 30 transmits the image code to the registration terminal 50.

Figure 29:
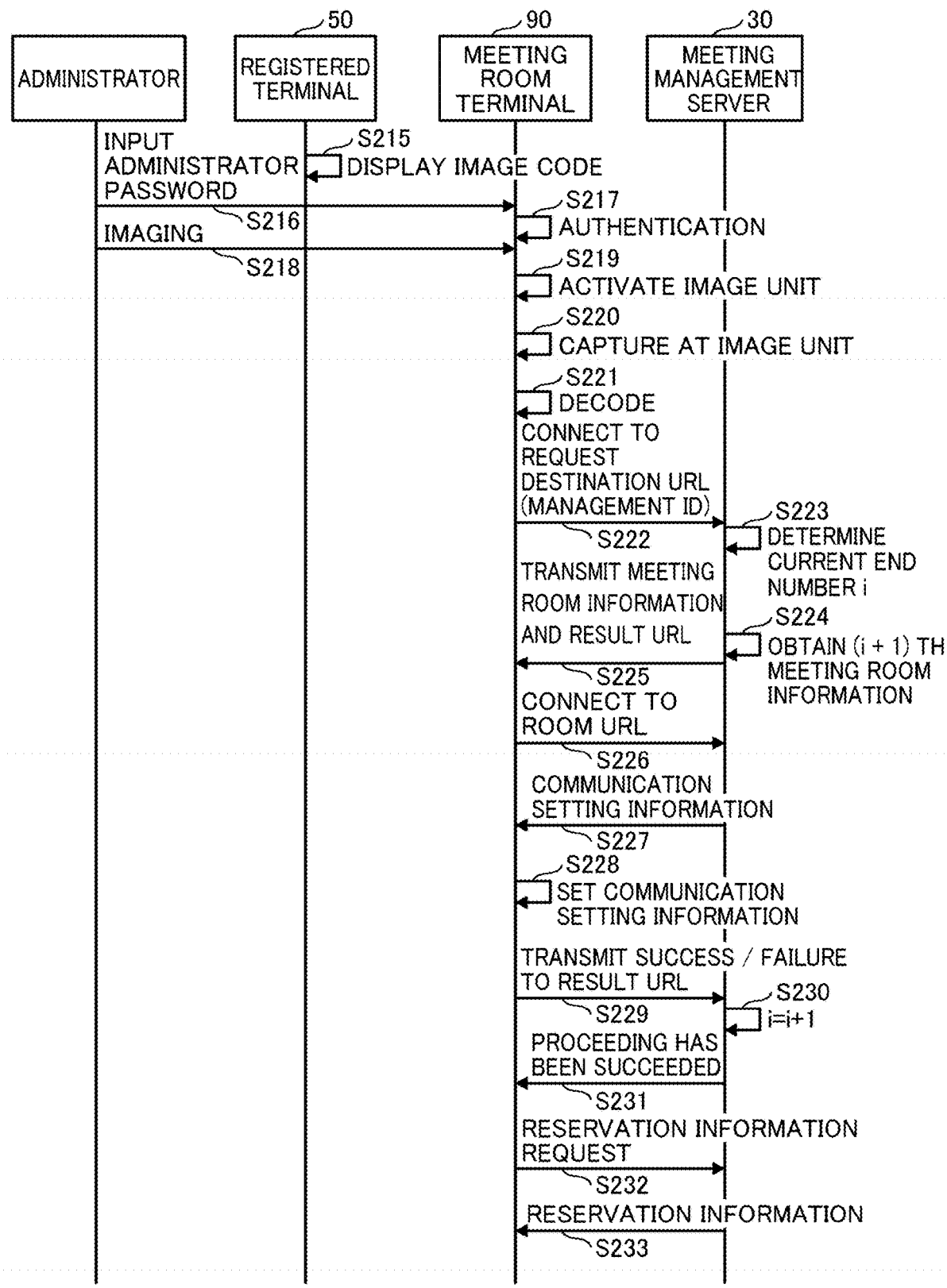
FIG. 29 is a sequence diagram illustrating an example of the procedure of initial setting of the meeting room terminal in the resource reservation system, performed after the procedure of FIG. 28.

FIG. 29 is a sequence diagram for explaining an example of the procedure of the initial setting of the meeting room terminal 90 in the resource reservation system 100 (part 2). The process of FIG. 29 is performed subsequent to FIG. 28.

S215: The communication unit 51 of the registration terminal 50 receives the image code, and the display control unit 53 displays the image code on the LCD 206 (an example of display means) as illustrated in FIG. 25.

S216: Next, the administrator presses the registration button 511 on the meeting room terminal 90 to input the administrator password. Specifically, the administrator presses the registration button 511 on the initial screen 510 illustrated in as Screen (a) of FIG. 11, and inputs the administrator password on the password input screen 520 illustrated in Screen (b) of FIG. 11. The operation reception unit 93 of the meeting room terminal 90 accepts these operations.

S217: The terminal authentication unit 96 of the meeting room terminal 90 determines that authentication has succeeded when the administrator password input by the administrator matches the administrator password stored in the storage unit 99, and determines that authentication has failed when the administrator password input by the administrator is not coincident with the administrator password stored in the storage unit 99.

S218: When the authentication is successful, the administrator activates the camera by pressing the setting button 403 on the meeting room terminal setting screen 525, as illustrated in Screen (c) of FIG. 11.

S219: As illustrated in Screen (d) of FIG. 11, the imaging unit 97 of the meeting room terminal 90 is activated.

S220: When the administrator operates or moves the meeting room terminal 90 so that the image code enters the angle of view of the CMOS sensor 605, the imaging unit 97 recognizes the image code and automatically generates image data, as illustrated in Screen (e) of FIG. 11.

S221: The decoding unit 98 decodes the image code captured by the imaging unit 97, and restores the management information. Thus, the setting acquisition unit 98-4 of the meeting room terminal 90 receives the management information and starts to acquire the communication setting information using the management information.

S222: The setting acquisition unit 98-4 of the meeting room terminal 90 connects to the request destination URL included in the management information, and transmits the management ID.

S223: The reception unit 31b of the meeting management server 30 receives the management ID. The overall control unit 390 of the initial setting unit 39 acquires the server holding information associated with the management ID transmitted from the meeting room terminal 90 from the management ID/meeting room association unit 398, and determines the current finished number i. When the finished number i is equal to the number of meeting rooms, a notice that the initial setting has been completed is returned to the meeting room terminal 90.

S224: When the finished number i is smaller than the number of meeting rooms, the overall control unit 390 acquires the (i+1)th meeting room information and the result URL from the server holding information.

S225: The overall control unit 390 transmits the meeting room information and the result URL to the meeting room terminal 90 via the transmission unit 31a.

S226: The server communication unit 91 of the meeting room terminal 90 receives the meeting room information and the result URL, and the setting acquisition unit 98-4 connects to the room URL and requests the communication setting information.

S227: The reception unit 31b of the meeting management server 30 receives the communication setting information request for the room URL. The communication setting information transmission unit 399 of the initial setting unit 39 receives the request, and transmits the file (the communication setting information) specified by the room URL to the meeting room terminal 90.

S228: The server communication unit 91 of the meeting room terminal 90 receives the communication setting information. The setting acquisition unit 98-4 stores the communication setting information in the storage unit 99. Therefore, the storage unit 99 stores the meeting room ID, the server URL, the authentication key, and the meeting room name, and enables communication with the meeting management server 30. The reservation information can be acquired depending on the state of the management start flag. As described above, the meeting room terminal 90 automatically starts communication with the meeting management server 30 by the record of the communication setting information.

S229: The setting acquisition unit 98-4 of the meeting room terminal 90 transmits the success/failure of the initial setting to the result URL. This is because the meeting management server 30 is not completed only by transmitting the communication setting information, but also checks whether the communication setting information has set. Here, it is assumed that it has succeeded.

S230: The reception unit 31b of the meeting management server 30 receives the initial setting success/failure. When the success is received, the overall control unit 390 of the initial setting unit 39 causes the management ID/meeting room association unit 398 to increase the finished number i by one. Since the finished number i indicates the order of the meeting room information in the server holding information, the finished number i is information for recording the meeting room or the meeting room terminal 90 for which the initial setting has been completed. The meeting room ID itself whose initial setting has been completed may be recorded. Thereby, when another meeting room terminal 90 is connected to the request destination URL in order to perform the initial setting, the meeting room terminal 90 can associate itself with another meeting room.

S231: When the finished number i is updated, the transmission unit 31a of the meeting management server 30 transmits the success of the processing to the meeting room terminal 90. Thus, the meeting room terminal 90 can confirm that the initial setting has been completed. Therefore, when an error occurs in the meeting management server 30 and the finished number i cannot be increased by one, the meeting room terminal 90 can be regarded as having failed the initial setting. In this case, the finished number i does not increase in step S30, and the initial setting of the meeting room terminal 90 does not end, so the meeting room terminal 90 can read the image code again and perform the initial setting.

S232: The reservation information request unit 98-3 of the meeting room terminal 90 starts a reservation information request.

S233: The reservation information transmission unit 44 of the meeting management server 30 transmits the reservation information on condition that the management start flag is set to True.

The administrator repeats the processes after S216 in FIG. 29 by the number of meeting rooms set on the setting screen 501 using each meeting room terminal 90. Accordingly, the setting of each meeting room terminal 90 is successively performed by one image code displayed in S 215. Since the process of FIG. 29 is controlled by the meeting management server 30 based on the number of completions i, a plurality of meeting room terminals 90 can perform initial settings in parallel. Therefore, administrators can perform the initial setting of the plurality of meeting room terminals 90 by hand, thereby improving the work efficiency. In this case, the administrator may print out the image code, distribute the image code to another administrator, or transmit the image code by e-mail. If the process does not end normally due to a network problem, the meeting management server 30 can return the same communication setting information to the meeting room terminal 90 again simply by the administrator reading the same image code again, so that the setting can be continued.

Figure 30A:
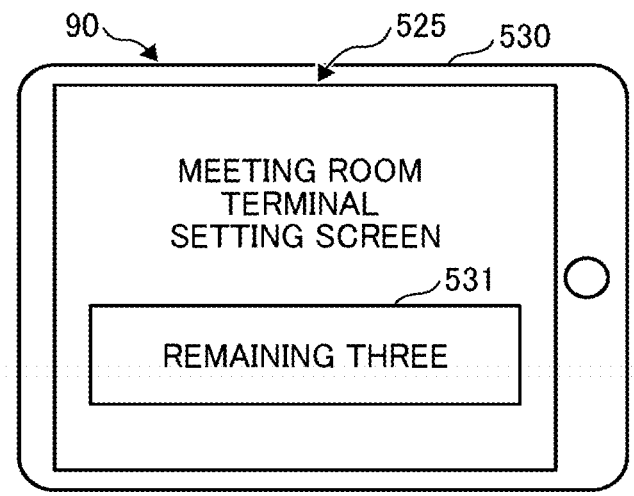
FIG. 30A and FIG. 30B are diagrams, each illustrating an example of a message displayed on the meeting room terminal setting screen at the end of the initial setting, according to an embodiment of the present disclosure.
Figure 30B:
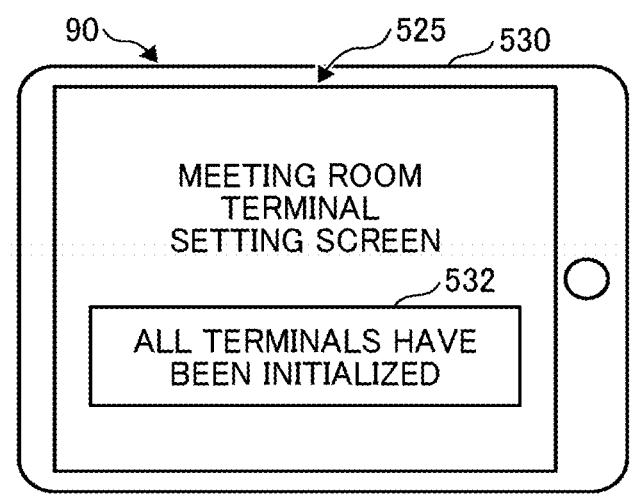

FIG. 30A and FIG. 30B each illustrates an example of a message displayed on the meeting room terminal setting screen 525 at the end of the initial setting. For the sake of explanation, it is assumed that the number of meeting room terminals 90 that are initially set is four. FIG. 30A illustrates a message displayed by the meeting room terminal 90 when the first initial setting is completed (when processing is successful, and the number of remaining meeting rooms are transmitted). FIG. 30A displays a message 531 that "there are three remaining". The administrator can grasp how many meeting room terminals 90 to be initially set remain.

FIG. 30B illustrates a message displayed by the meeting room terminal 90 when the fourth initial setting is completed (when a notice indicating processing success and the completion of the initial settings for all terminals transmitted). FIG. 30B displays a message 532 "the initial setting of all terminals has been completed". The administrator can grasp that the initial setting of all the meeting room terminals 90 has been completed.

If it is determined in step S223 of FIG. 29 that the number of ends i is the same as the number of meeting rooms, the same message 532 as in FIG. 18B may be displayed.

<Correspondence to Case Where Plural Administrators Simultaneously Capture Image Code>

In the present embodiment, a plurality of administrators can image one (the same) image code and perform the initial setting to the meeting room terminals 90 in parallel. However, when two meeting room terminals 90 that have almost simultaneously captured the same image code connect to the meeting management server 30, the meeting management server 30 transmits the same meeting room communication setting information to each of the same finished number i. In this case, two meeting room terminals 90 are associated with the same meeting room. On the other hand, the finished number i increases by two. Therefore, even if the finished number i of the server holding information is equal to the number of meeting rooms, there is a possibility that a meeting room terminal 90 that is not initially set remains.

Figure 31:
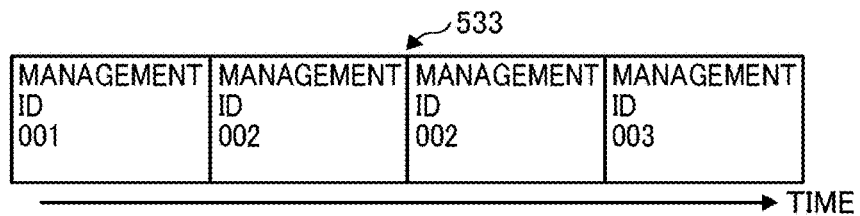
FIG. 31 is a diagram schematically illustrating a queue held by an overall control unit, according to an embodiment of the present disclosure.

Therefore, as illustrated in FIG. 31, it is conceivable to manage the management ID in a queue. FIG. 31 schematically illustrates queues held by the overall control unit 390. When the management ID is transmitted in step S222 of FIG. 29, the overall control unit 390 of the meeting management server 30 registers the management ID in the queue 533. In FIG. 31, management IDs are registered in the order of management IDs "001", "002", "002", and "003". Since there are two management IDs "002", two administrators capture the same image code and perform the initial setting of the meeting room terminals 90 in parallel.

When the same management ID is registered in the queue 533 as described above, the overall control unit 390 transmits the communication setting information first to the meeting room terminal 90 which has transmitted the management ID registered in the queue earlier in time. Then, the overall control unit 390 does not transmit the communication setting information to the meeting room terminal 90 which has transmitted the management ID later in time until the processing success or the processing failure is transmitted to the meeting room terminal 90. In this way, the above problem can be solved.

<Obtaining Reservation Information>
<<Acquisition of Reservation Information, Start of Cooperation, Start of Management>>

Figure 32:
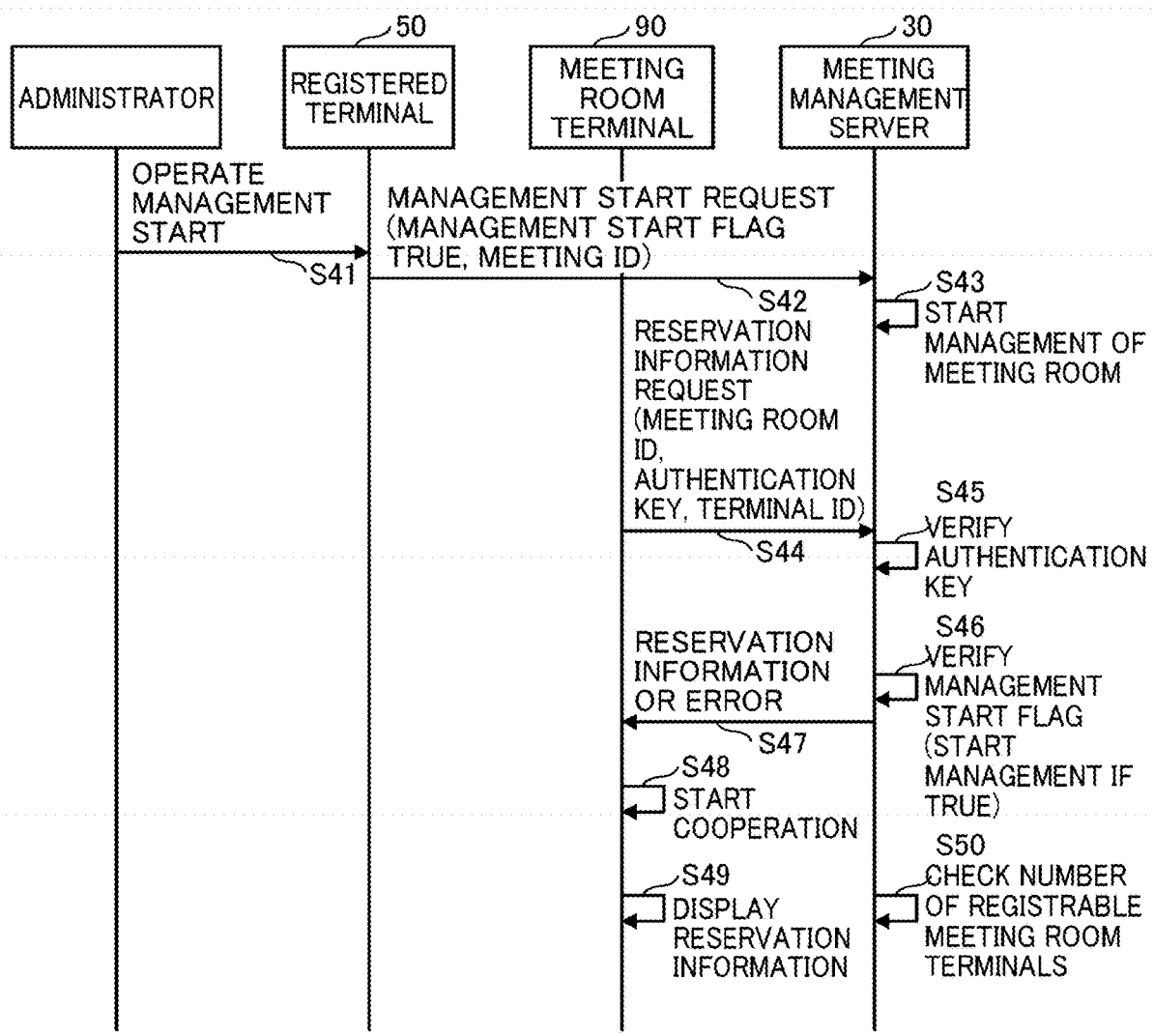
FIG. 32 is a sequence diagram for explaining an example of an operation performed until the meeting room terminal acquires the reservation information, according to an embodiment of the present disclosure.

Next, a process for acquiring the reservation information by the meeting room terminal 90 will be described with reference to FIG. 32. FIG. 32 is a sequence diagram for explaining an example of an operation until the meeting room terminal 90 acquires the reservation information. It is assumed that the administrator displays the setting screen 501.

S41: First, the administrator turns on the check mark field 502 of a predetermined meeting room on the setting screen 501. This operation corresponds to an operation for starting the management (actually, the management is started by the reservation information request). The operation reception unit 52 of the registration terminal 50 accepts this operation.

S42: The communication unit 51 of the registration terminal 50 sets the management start flag to True and specifies the meeting room ID to transmit the management start request to the meeting management server 30.

S43: The communication unit 31 of the meeting management server 30 receives the management start request. Thus, the initial setting unit 39 sets the management start flag of the meeting room setting information specified by the meeting room ID to True. As a result, when the reservation information is requested, the meeting management server 30 becomes ready for transmitting the reservation information.

S44: The reservation information request unit 98-3 of the meeting room terminal 90 periodically communicates with the meeting management server 30 via the server communication unit 91. Specifically, the reservation information request unit 98-3 requests the reservation information by specifying the meeting room ID and the authentication key with the server URL of the storage unit 99 as the destination (for example, every 30 seconds). Although transmission of terminal ID is not essential, the terminal ID may be transmitted in order for the meeting management server 30 to verify the number of registrable meeting room terminals.

The mechanism by which the reservation information request unit 98-3 continuously acquires reservation information may be a method that when the meeting room information is changed, the meeting management server 30 sends a notification of the change to the meeting room terminal 90, and the meeting room terminal 90 requests the meeting management server 30 only when the notification is sent, in addition to the method of requesting the meeting management server 30 at regular intervals. The mechanism may be any method that allows the meeting room terminal 90 to cope with acquisition of the change in the reservation information.

S45: The communication unit 31 of the meeting management server 30 receives the reservation information request, and the authentication key verification unit 41 verifies the authentication key. Specifically, the communication unit 31 acquires the authentication key specified by the meeting room ID from the meeting room setting information DB 498 and determines whether the acquired authentication key matches the authentication key transmitted from the meeting room terminal 90. When the two authentication keys coincide with each other, the initial setting unit 39 changes the state of the meeting room terminal in the meeting room setting information DB 498 into "connected".

S46: When the two authentication keys coincide with each other, the management control unit 42 checks whether the management start flag is True and whether the acquisition of the reservation information is requested. Specifically, the management control unit 42 acquires the management start flag specified by the meeting room ID from the meeting room setting information DB 498 and determines whether it is True. When the meeting room terminal 90 requests the reservation information to the meeting management server 30 even once (and the authentication key matches), and the management start flag is True, the management control unit 42 starts an operation for meeting room management. Therefore, the reservation information transmission unit 44 of the meeting management server 30 transmits the reservation information. When the check-in is not detected, the reservation of the meeting room is automatically canceled.

When the authentication key matches, but the management start flag is False, the management control unit 42 does not start the meeting room management. The reservation information transmission unit 44 does not transmit the reservation information. However, even when the meeting room management is not started, the reservation information request unit 98-3 in the meeting room terminal 90 continues the reservation information request. This is because it is difficult to access the meeting room terminal 90 from the external network, and therefore it is not possible to notify that the management start flag has become True, and it is preferable to perform communication from the meeting room terminal 90.

S47: The reservation information transmission unit 44 of the meeting management server 30 transmits the reservation information or an error (the authentication key is not coincident, or the management start flag is false) to the meeting room terminal 90 via the communication unit 31. The authentication key is confirmed, and when the management start flag is True, the reservation information is transmitted.

S48: The server communication unit 91 of the meeting room terminal 90 receives the reservation information or the error. When the reservation information is transmitted, the meeting room terminal 90 starts cooperation with the meeting management server 30. When the authentication key cannot be confirmed or when the management start flag is FALSE, the error is transmitted. In this case, the cooperation is not started.

When both the management start flag is set to True and the acquisition request of the reservation information is detected, the management is started, and the cooperation is started. Therefore, the management and the cooperation can be started after the meeting room terminal 90 having been initially set is placed in the meeting room. If the reservation information acquisition request is only detected, the inconvenience of automatic cancellation as described above occurs. If the management start flag is only set to True, there may be a problem that automatic cancellation is performed when the initial setting of the meeting room terminal 90 is not completed.

S49: When the reservation information request unit 98-3 of the meeting room terminal 90 acquires the reservation information, the display control unit 94 displays the reservation information. When the error is received, the display control unit 94 displays, for example, the fact that the reservation information cannot be displayed, and the reason why the reservation information cannot be displayed.

S50: Since the terminal ID is transmitted together with the authentication information request, the terminal ID verification unit 43 of the meeting management server 30 can determine whether the number of terminal IDs exceeds the number of registrable meeting room terminals.

As described above, in the resource reservation system 100 of the present embodiment, the customer can use his/her information processing terminal as the meeting room terminal 90. Further, the customer can easily perform the initial setting by using the image code. Further, since the meeting room terminal 90 automatically downloads the reservation information by the initial setting, the meeting room terminal 90 can start the cooperation with the meeting management server 30. For example, the meeting room terminal 90 can display the reservation information of the meeting room, and the user of the customer can check-in from the meeting room terminal 90. Further, when the initial setting of the plurality of meeting room terminals 90 is performed, the work efficiency can be improved.

<Variations>

Although the best mode for carrying out the present disclosure has been described with reference to examples, the present disclosure is not limited to such embodiments, and various modifications and substitutions can be made without departing from the spirit and scope of the present disclosure.

For example, instead of the registration terminal 50 displaying the image code, a display connected to the meeting management server 30 may display the image code. The terminal that displays the image code is not necessarily the registration terminal 50.

For example, in the present embodiments, the communication setting information is encoded into an image code. However, the registration terminal 50 may transmit the communication setting information to the meeting room terminal 90 by one-to-one short-range communication wireless communication. For example, the communication setting information may be transmitted by Bluetooth (registered trademark), NFC (Near Filed Communication), infrared communication, visible light communication, or the like.

Note that the meeting management server 30 may be a plurality of servers, or the functions of the meeting management server 30 may be distributed to a plurality of servers. Also, the reservation management server 20 and the meeting management server 30 may be integrated.

The resource reservation system 100 according to the present embodiments may also be referred to as a Web service. The Web service is a variety of services provided by application of Internet-related technology. For example, there are a meeting room rental service and various rental services. A system using the Web service is referred to as a usage system.

In addition, the configuration examples such as FIGS. 6 and 7 illustrated in the above embodiments are divided according to main functions in order to facilitate the understanding of the processing of the resource reservation system 100. However, the present disclosure is not limited by the method and the name of the division of each processing unit. The resource reservation system 100 may be divided into more processing units in accordance with the processing contents. Further, the resource reservation system 100 may be divided for one processing unit to include more processing.

Each of the functions of the embodiments described above may be implemented by one or more processing circuits. Here, the "processing circuit" in this specification may include a processor programmed to perform each function by software, such as a processor implemented by an electronic circuit, and devices such as application specific integrated circuits (ASICs), digital signal processors (DSPs), field programmable gate arrays (FPGAs), and conventional circuit modules designed to perform the functions described above.

The image code generation unit 394 is an example of providing means, the imaging unit 97 is an example of receiving means, the reservation information request unit 98-3 is an example of reservation information acquiring means, the encryption unit 393 is an example of encrypting means, the terminal authentication unit 96 is an example of authenticating means, the setting screen generation unit 391 is an example of accepting means, and the management control unit 42 is an example of managing means.

For example, in order to allow an information processing terminal located in a meeting room to cooperate with an information processing apparatus, reservation information is required. However, the related art does not describe acquiring the reservation information of a resource.

According to one or more embodiments of the present disclosure, a resource reservation system is provided in which an information processing terminal located in a resource such as a meeting room can acquire reservation information.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A resource reservation system, comprising: an information processing apparatus configured to manage reservation information of one or more resources; and an information processing terminal configured to acquire the reservation information from the information processing apparatus, the information processing apparatus comprising first circuitry configured to generate an image code including communication information necessary for obtaining the reservation information from the information processing apparatus, and cause the image code to be displayed on a display, the information processing terminal comprising second circuitry configured to receive the communication information generated by the first circuitry by causing the image code to be captured by a camera, wherein the information processing terminal is configured to acquire the reservation information from the information processing apparatus by using the communication information received by the second circuitry, wherein the second circuitry of the information processing terminal is configured to receive the image code including the communication information displayed on the display, wherein the first circuitry of the information processing apparatus is further configured to convert the communication information into the image code and generate the image code, wherein the first circuitry of the information processing apparatus is further configured to generate the image code converted from the communication information, in response to receiving, from a registration terminal, which is configured to receive a designation of at least one resource of the one or more resources, a request for provision of the communication information of a particular resource of the one or more resources, and wherein the first circuitry of the information processing apparatus is further configured to: accept a setting indicating a request for a management start of at least one resource of the one or more resources from the registration terminal; and permit transmission of the reservation information to the information processing terminal when the first circuitry of the information processing apparatus accepts the setting indicating the request for the management start of the at least one resource of the one or more resources.

2. The resource reservation system according to claim 1, further comprising the display configured to display the image code including the communication information generated by the first circuitry.

3. The resource reservation system according to claim 2, further comprising the registration terminal, wherein the registration terminal is configured to display a web page of the information processing apparatus, and wherein the display is provided with the registration terminal.

4. The resource reservation system according to claim 3, wherein the second circuitry of the information processing terminal is further configured to: authenticate a user; and receive the image code including the communication information from the registration terminal, when authentication of the user is successful.

5. The resource reservation system according to claim 3, wherein the information processing apparatus is configured to cancel a reservation of the at least one resource of the one or more resources when the information processing apparatus does not receive a usage start notification of the at least one resource of the one or more resources from the information processing terminal before a particular time obtained, based on a start time of the reservation of the at least one resource of the one or more resources, and wherein the first circuitry of the information processing apparatus is further configured to start management relating to cancellation of the reservation of the at least one resource of the one or more resources, when the first circuitry of the information processing apparatus accepts the setting for requesting the management start of the at least one of the one or more resources from the registration terminal, and requests the reservation information from the information processing terminal.

6. The resource reservation system according to claim 1, wherein the second circuitry of the information processing terminal is further configured to acquire the reservation information from the information processing apparatus by using the received communication information.

7. The resource reservation system according to claim 1, wherein the communication information provided by the first circuitry of the information processing apparatus includes at least one of address information of the information processing apparatus, authentication information for authenticating the information processing terminal by the information processing apparatus, identification information of the at least one resource, and a name of the at least one resource.

8. The resource reservation system according to claim 1, wherein the first circuitry of the information processing apparatus is further configured to: encrypt the communication information; and provide the encrypted communication information.

9. The resource reservation system according to claim 1, further comprising a plurality of information processing terminals including the information processing terminal, wherein the information processing apparatus is configured to count a number of the plurality of information processing terminals based on identification information of the information processing terminals when the reservation information is requested together with the identification information of the information processing terminals from the information processing terminals, wherein when the counted number of the information processing terminals is larger than a predetermined number, the information processing apparatus is configured to output particular information indicating that the number of the information processing terminals is larger than the predetermined number, and wherein the information processing apparatus is configured to accept settings for the predetermined number of the information processing terminals.

10. The resource reservation system according to claim 1, wherein the one or more resources comprises at least a meeting room, wherein the information processing apparatus is a meeting management server configured to manage reservation information of the meeting room, wherein the information processing terminal is a meeting room terminal comprising an application for acquiring the reservation information from the meeting management server, the meeting room terminal being provided for each meeting room, wherein the first circuitry of the information processing apparatus is further configured to generate the image code as the communication information necessary for obtaining the reservation information from the information processing apparatus, wherein the second circuitry of the information processing terminal is configured to cause the camera to capture the image code, which is displayed on the registration terminal, wherein the meeting room terminal is configured to capture the image code with the camera, decode the communication information necessary for obtaining the reservation information from the meeting management server based on the captured image code, and start sending an acquisition request for the reservation information to the meeting management server, wherein the acquisition request is continuously sent from the meeting room terminal to the meeting management server at predetermined time intervals, wherein the registration terminal, which is configured to display a first web page of the information processing apparatus, is a display terminal configured to display a second web page of the meeting management server, wherein the second web page displays, for each meeting room, a reception button for accepting the setting indicating the request for the management start of the meeting room, and wherein in response to receiving a press of the reception button and a start of the acquisition request for the reservation information by the meeting room terminal after capturing the image code, the meeting management server is configured to start processing for transmitting the reservation information to the meeting room terminal and cancel the reservation information when a use of the meeting room is not started for a predetermined time, as the management start.

11. The resource reservation system according to claim 1, wherein the first circuitry of the information processing apparatus is further configured to generate the communication information, which includes a connection destination uniform resource locator (URL) and a management identification (ID) for managing at least one resource of the one or more resources, and wherein the second circuitry of the information processing terminal is further configured to receive the connection destination URL and the management ID included in the communication information, and transmit the management ID to the connection destination URL, to acquire from the information processing apparatus, the communication information for acquiring the reservation information for the at least one resource of the one or more resources associated with the management ID.

12. The resource reservation system according to claim 11, wherein the first circuitry of the information processing apparatus is further configured to: accept a designation of at least one resource of the one or more resources for which the information processing terminal can acquire the reservation information; and provide, to the information processing terminal, a result URL used by the information processing terminal to notify one of success and failure of acquisition of the communication information, in accordance with the management ID transmitted to the connection destination URL, wherein the second circuitry of the information processing terminal is further configured to transmit one of the success and the failure of the acquisition of the communication information to the result URL, and wherein when the success of the acquisition of the communication information is notified, the first circuitry of the information processing apparatus is further configured to record a resource that has succeeded in acquiring the communication information, among the at least one resource of the one or more resources designated.

13. The resource reservation system according to claim 12, wherein in response to receiving the management ID for the connection destination URL, the first circuitry of the information processing apparatus is further configured to provide the communication information of a resource that does not record the success of acquiring the communication information among the at the least one resource of the one or more resources designated, wherein the first circuitry of the information processing apparatus is further configured to transmit, to the information processing terminal, information indicating that the resource that has succeeded in acquiring the communication information has been recorded, wherein, when the first circuitry of the information processing apparatus transmits, to the information processing terminal, the information indicating that the resource that has succeeded in acquiring the communication information has been recorded, the first circuitry of the information processing apparatus is further configured to transmit, to the information processing terminal, a number of resources that have not yet succeeded in acquiring the communication information, among the at least one resource of the one or more resources designated, wherein the information processing terminal comprises a terminal display configured to display the number of resources that have not succeeded in acquiring the communication information, wherein when the success of the acquisition of the communication information is recorded and the management ID for the connection destination URL is received, with respect to all of the at least one resources of the one or more resources designated, the first circuitry of the information processing apparatus is further configured to transmit to the information processing terminal, an indication that processing has completed, and wherein the terminal display displays information indicating that the processing has been completed.

14. The resource reservation system according to claim 11, wherein a web page, which the registration terminal acquires from the information processing apparatus and displays on the display, displays, for each meeting room, a reception button for accepting the setting indicating the request for the management start of the at least one resource of the one or more resources, and wherein in response to receiving a press of the reception button and a start of an acquisition request for the reservation information by the information processing terminal, the information processing apparatus is configured to start processing for transmitting the reservation information to the information processing terminal and cancel the reservation information when a use of the resource is not started for a predetermined time.

15. The resource reservation system according to claim 14, wherein the information processing apparatus is a meeting management server configured to manage the reservation information for a plurality of meeting rooms, wherein the information processing terminal is a reception terminal configured to acquire the reservation information from the meeting management server, display the acquired reservation information, and accept a start of use of a particular meeting room reserved with the acquired reservation information from a user of the meeting room, wherein the registration terminal is a user terminal communicable with the information processing apparatus and configured to display a setting screen for operating statuses of a plurality of information processing terminals corresponding to the plurality of meeting rooms, respectively, wherein the image code generated by the first circuitry of the information processing apparatus includes connection information for acquiring the reservation information from the meeting management server, wherein the information processing terminal is configured to start acquiring the reservation information from the meeting management server by using the connection information acquired by capturing the image code displayed on the registration terminal by using the camera, which is provided with the information processing terminal, and wherein the image code is a single image code, and the single image code is captured by each of the plurality of information processing terminals, so that the plurality of information processing terminals acquires the reservation information of the plurality of meeting rooms.

16. A terminal setting method performed by a resource reservation system comprising an information processing apparatus configured to manage reservation information of a resource and an information processing terminal configured to acquire the reservation information from the information processing apparatus, the method comprising: generating, by a first circuitry of the information processing apparatus, an image code including communication information necessary for obtaining the reservation information from the information processing apparatus, and causing the image code to be displayed on a display, in response to receiving, from a registration terminal, which is configured to receive a designation of the resource, a request for provision of the communication information of the resource; accepting, by the first circuitry of the information processing apparatus, a setting indicating a request for a management start of the resource from the registration terminal, permitting, by the first circuitry of the information processing apparatus, transmission of the reservation information to the information processing terminal based on the acceptance of the setting indicating the request for the management start of the resource; receiving, by a second circuitry of the information processing terminal, the communication information generated by the first circuitry of the information processing apparatus by causing the image code to be captured by a camera, and acquiring, by the information processing terminal, the reservation information from the information processing apparatus using the communication information received by the second circuitry of the information processing terminal, wherein the second circuitry of the information processing terminal is configured to receive the image code including the communication information displayed on the display, wherein said generating the image code by the first circuitry of the information processing apparatus includes converting the communication information into the image code to generate the image code.

17. An information processing apparatus communicably connected to, via a network, an information processing terminal, the information processing apparatus comprising: circuitry configured to generate an image code including communication information necessary for the information processing terminal to obtain reservation information of a resource from the information processing apparatus by causing the image code to be displayed on a display, wherein the information processing terminal receives the communication information generated by the circuitry of the information processing apparatus by causing the image code to be captured by a camera, wherein the information processing terminal is configured to acquire the reservation information using the received communication information, wherein the information processing terminal is configured to receive the image code including the communication information displayed on the display, wherein the circuitry of the information processing apparatus is further configured to convert the communication information into the image code and generate the image code, wherein the circuitry of the information processing apparatus is further configured to generate the image code converted from the communication information, in response to receiving, from a registration terminal, which is configured to receive a designation of the resource, a request for provision of the communication information of the resource, and wherein the circuitry of the information processing apparatus is further configured to: accept a setting indicating a request for a management start of at least one resource of the one or more resources from the registration terminal; and permit transmission of the reservation information to the information processing terminal when the first circuitry of the information processing apparatus accepts the setting indicating the request for the management start of the at least one resource of the one or more resources.

* * * * *